(12) United States Patent
Kim et al.

(10) Patent No.: US 12,501,006 B2
(45) Date of Patent: Dec. 16, 2025

(54) ELECTRONIC APPARATUS AND CONTROLLING METHOD THEREOF

(71) Applicant: SAMSUNG ELECTRONICS CO., LTD., Suwon-si (KR)

(72) Inventors: Hyungchul Kim, Suwon-si (KR); Hakjae Kim, Suwon-si (KR); Seunghyun Moon, Suwon-si (KR); Kihong Park, Suwon-si (KR); Sungho Chae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/524,066

(22) Filed: Nov. 11, 2021

(65) Prior Publication Data
US 2023/0048968 A1 Feb. 16, 2023

Related U.S. Application Data

(63) Continuation of application No. PCT/KR2021/014679, filed on Oct. 20, 2021.

(30) Foreign Application Priority Data

Aug. 10, 2021 (KR) .................. 10-2021-0105628

(51) Int. Cl.
H04N 9/31 (2006.01)
(52) U.S. Cl.
CPC ......... *H04N 9/3147* (2013.01); *H04N 9/3185* (2013.01)
(58) Field of Classification Search
CPC .. G06F 3/1454; G06F 3/0481; G06F 3/04817; H04N 21/43615; H04N 21/4622;
(Continued)

(56) References Cited

U.S. PATENT DOCUMENTS

| 8,687,019 B2 | 4/2014 | Kubota et al. |
| 9,519,452 B2 | 12/2016 | Woongchang et al. |

(Continued)

FOREIGN PATENT DOCUMENTS

| CN | 110557740 | 12/2019 |
| JP | 2015-002485 | 1/2015 |

(Continued)

OTHER PUBLICATIONS

Search Report and Written Opinion dated Apr. 29, 2022 in counterpart International Patent Application No. PCT/KR2021/014679 and English-language translation.

(Continued)

*Primary Examiner* — Michael E Teitelbaum
*Assistant Examiner* — Humam M Satti
(74) *Attorney, Agent, or Firm* — Nixon & Vanderhye P.C.

(57) ABSTRACT

An electronic apparatus includes: a memory, a communication interface comprising communication circuitry configured to communicate with a first external device and a second external device, a projection part configured to output an image to a projection surface, and a processor configured to: receive first data including a first image from the first external device, receive second data including a second image from the second external device, acquire first position information of the first external device and second position information of the second external device, acquire a projection image including the first image and the second image based on the first position information and the second position information, and control the projection part to output the projection image.

20 Claims, 36 Drawing Sheets

(58) Field of Classification Search
CPC .... H04N 7/147; H04N 21/4122; H04N 5/765; H04N 21/43637; H04N 7/15; H04N 21/4126; H04N 21/812; H04N 21/43635; H04N 21/2187; H04N 7/181; H04N 21/436; H04N 21/4402; H04N 7/18; H04N 5/445; H04N 21/43632; H04N 21/478; H04N 21/4782; H04N 5/45; H04N 21/44227; H04N 21/4363; H04N 21/44231; H04N 7/148; H04N 21/2365; H04N 21/2662; H04N 21/4858; H04N 5/2628; H04N 21/6405; H04N 7/0117; H04N 21/4113; H04N 5/46; H04N 7/0112; H04N 7/0122; H04N 7/0125; H04N 21/222; H04N 21/2221; H04N 21/2223; H04N 21/2225; H04N 21/632; H04N 21/633; H04N 21/6332; H04N 21/6338; H04N 9/3179; H04N 9/3185; H04N 9/3147; H04N 9/3188; H04N 9/3194; H04N 21/43607; H04N 21/41265; H04N 21/414; H04N 21/4143; H04N 21/43079; H04N 21/431–4318; H04N 2201/3201; H04N 21/218; H04N 21/4135; H04N 9/31; H04N 21/41; G09G 5/006; G09G 2370/12; G09G 2370/16; G09G 5/005; G09G 2370/22; G09G 2370/20; G09G 2356/00; G09G 2340/0464; G09G 2340/0492; G09G 2354/00; G09G 5/14; G03B 21/14; G03B 21/147

See application file for complete search history.

(56) References Cited

U.S. PATENT DOCUMENTS

| | | | |
|---|---|---|---|
| 10,057,632 B2* | 8/2018 | Seo | H04L 65/1094 |
| 10,250,857 B2 | 4/2019 | Kim et al. | |
| 10,592,714 B2 | 3/2020 | Jung et al. | |
| 10,893,245 B1 | 1/2021 | Choi et al. | |
| 2005/0187016 A1* | 8/2005 | Fukui | H04N 9/3179 |
| | | | 463/32 |
| 2008/0009324 A1 | 1/2008 | Patel | |
| 2008/0036971 A1* | 2/2008 | Hasegawa | G03B 21/26 |
| | | | 345/1.3 |
| 2011/0050857 A1 | 3/2011 | Lee et al. | |
| 2011/0283334 A1* | 11/2011 | Choi | H04L 67/148 |
| | | | 725/148 |
| 2011/0292080 A1* | 12/2011 | Oka | H04N 9/3147 |
| | | | 345/634 |
| 2012/0038678 A1* | 2/2012 | Hwang | G06F 3/1454 |
| | | | 345/667 |
| 2012/0050331 A1* | 3/2012 | Kanda | H04N 21/440263 |
| | | | 345/649 |
| 2014/0002471 A1* | 1/2014 | Yeo | H04H 20/08 |
| | | | 345/581 |
| 2014/0095761 A1* | 4/2014 | Fujiwara | G06F 13/4022 |
| | | | 710/316 |
| 2015/0009327 A1 | 1/2015 | Love | |
| 2015/0138077 A1 | 5/2015 | Yamaji et al. | |
| 2015/0195675 A1* | 7/2015 | Larkin | H04L 67/148 |
| | | | 455/456.3 |
| 2016/0277720 A1* | 9/2016 | Yukumoto | H04N 9/3147 |
| 2016/0277729 A1 | 9/2016 | Lee et al. | |
| 2016/0316230 A1* | 10/2016 | Zuo | H04N 21/8106 |
| 2017/0024031 A1* | 1/2017 | Ueda | G09G 5/003 |
| 2017/0097738 A1* | 4/2017 | Athavale | H04N 9/3147 |
| 2017/0171521 A1 | 6/2017 | Jung et al. | |
| 2017/0178693 A1* | 6/2017 | Austin | H04N 21/8456 |
| 2017/0214895 A1* | 7/2017 | Fujioka | H04N 9/3147 |
| 2017/0332134 A1* | 11/2017 | Iwami | H04N 21/43076 |
| 2021/0366324 A1 | 11/2021 | Mashitani et al. | |
| 2022/0139356 A1* | 5/2022 | Simmons | H04N 7/147 |
| | | | 345/635 |
| 2022/0283849 A1* | 9/2022 | Miller | G06F 9/4862 |
| 2022/0365606 A1* | 11/2022 | Hinckley | G06F 1/1684 |
| 2023/0040505 A1 | 2/2023 | Chae et al. | |

FOREIGN PATENT DOCUMENTS

| | | |
|---|---|---|
| JP | 5740826 | 7/2015 |
| JP | 2018-005243 | 1/2018 |
| JP | 2021-182374 A | 11/2021 |
| JP | 2023-000083 A | 1/2023 |
| KR | 10-1990-0018760 | 12/1990 |
| KR | 10-2011-0025083 | 3/2011 |
| KR | 10-2015-0058660 | 5/2015 |
| KR | 10-2016-0125853 | 11/2016 |
| KR | 10-2019-0040633 | 4/2019 |
| KR | 10-2160839 | 9/2020 |
| KR | 10-2163742 | 10/2020 |
| KR | 10-2336246 B1 | 12/2021 |
| KR | 10-2022-0015000 A | 2/2022 |

OTHER PUBLICATIONS

Extended European Search Report dated Jan. 24, 2025 for EP Application No. 21953551.5.
Partial European Search Report dated Sep. 23, 2024 for EP Application No. 21953551.5.
Korean Office Action dated Sep. 2, 2025 for KR Application No. 10-2021-0105628.

* cited by examiner

ELECTRONIC APPARATUS AND CONTROLLING METHOD THEREOF

CROSS-REFERENCE TO RELATED APPLICATIONS

This application is a continuation of International Application No. PCT/KR2021/014679 designating the United States, filed on Oct. 20, 2021, in the Korean Intellectual Property Receiving Office and claiming priority to Korean Patent Application No. 10-2021-0105628, filed on Aug. 10, 2021, in the Korean Intellectual Property Office, the disclosures of which are incorporated by reference herein in their entireties.

BACKGROUND

Field

The disclosure relates to an electronic apparatus and a controlling method thereof. For example, the disclosure relates to an electronic apparatus for receiving images from a plurality of external devices and outputting the received images and a controlling method thereof.

Description of Related Art

The electronic apparatus, paired with an external device, may output content received from the external device. The external device may transmit the content to the electronic apparatus in real time, and the electronic apparatus may directly output the received content. A process of receiving and outputting content in real time may be a mirroring operation.

The electronic apparatus including a projection part may output content by irradiating light corresponding to an image. The electronic apparatus may identify a plurality of external devices that may be connected for communication or that may be paired. When content is received from each of a plurality of external devices, it is necessary to determine from which external device content is to be output or how to output the plurality of received contents.

When a user has to directly input a control command, it may be inconvenient to learn a user operation method.

Therefore, there may be a need for a method of automatically combining a plurality of contents so that the user may output a projection image without inputting a separate control command or by inputting a minimum control command.

SUMMARY

Embodiments of the disclosure provide an electronic apparatus for combining images received respectively from a plurality of external devices and outputting a combined projection image based on a state of the plurality of external devices, and a controlling method thereof.

According to an example embodiment of the disclosure, an electronic apparatus includes: a memory; a communication interface comprising circuitry configured to communicate with a first external device and a second external device; a projection part configured to output an image to a projection surface; and a processor configured to: receive first data including a first image from the first external device, receive second data including a second image from the second external device, acquire first position information of the first external device and second position information of the second external device, acquire a projection image including the first image and the second image based on the first position information and the second position information, and control the projection part to output the projection image.

The processor may be configured to determine projection positions of the first image and the second image included in the projection image based on relative positions of the first external device and the second external device on the basis of a position of the electronic apparatus.

The processor may be configured to determine projection positions of the first image and the second image included in the projection image based on distances between the first external device and the second external device and the electronic apparatus, based on both the first external device and the second external device being positioned on the left or right based on the position of the electronic apparatus.

The processor may be configured to acquire the projection image based on the at least one position information, based on position information of at least one of the first position information and the second position information being changed.

The processor may be configured to control the projection part to output an icon corresponding to the third external device, based on the third external device being connected through the communication interface.

The processor may be configured to acquire position information of the third external device and identify at least one of a position, a shape, a size, or a color of an icon corresponding to a third external device based on a distance between the third external device and the electronic apparatus.

The processor may be configured to control the projection part to blink and output the icon corresponding to the third external device, based on the distance between the third external device and the electronic apparatus decreasing.

The processor may be configured to acquire first communication connection strength of the first external device and second communication connection strength of the second external device, identify an external device having communication connection strength less than a threshold value strength based on the first communication connection strength or the second communication connection strength being less than the threshold value strength, and acquire the projection image so that an image received from the identified external device is not included.

The processor may be configured to acquire the first communication connection strength of the first external device and a second communication connection strength of the second external device and identify a size of the first image and a size of the second image based on the first communication connection strength and the second communication connection strength.

The processor may be configured to acquire first rotation information of the first external device and second rotation information of the second external device and identify a size of the first image and a size of the second size based on the first rotation information and the second rotation information.

According to an example embodiment of the disclosure, a method of controlling an electronic apparatus, which may communicate with a first external device and a second external device and output an image on a projection surface, includes: receiving first data including a first image from the first external device and receiving second data including a second image from the second external device; acquiring first position information of the first external device and second position information of the second external device; acquiring a projection image including the first image and the second image based on the first position information and the second position information; and outputting the projection image.

The method may further include: determining projection positions of the first image and the second image included in the projection image based on relative positions of the first external device and the second external device based on a position of the electronic apparatus.

In the determining of the projection positions of the first image and the second image, projection positions of the first image and the second image included in the projection image may be determined based on distances between the first external device and the second external device and the electronic apparatus, based on both the first external device and the second external device being positioned on the left or right based on the position of the electronic apparatus.

In the acquiring of the projection image, the projection image may be acquired based on the at least one position information, based on position information of at least one of the first position information and the second position information being changed.

The method may further include: outputting an icon corresponding to a third external device, based on the third external device being connected through the communication interface.

The method may further include: acquiring position information of the third external device and identifying at least one of a position, a shape, a size, or a color of an icon corresponding to the third external device based on a distance between the third external device and the electronic apparatus.

The method may further include: blinking and outputting the icon corresponding to the third external device, based on the distance between the third external device and the electronic apparatus decreasing.

The method may further include: acquiring first communication connection strength of the first external device and second communication connection strength of the second external device and identifying an external device having communication connection strength less than a threshold value strength based on the first communication connection strength or the second communication connection strength being less than the threshold value strength, and, wherein, in the acquiring of the projection image, the projection image may be acquired so that an image received from the identified external device is not included.

The method may further include: acquiring a first communication connection strength of the first external device and a second communication connection strength of the second external device, wherein, in the acquiring of the projection image, a size of the first image and a size of the second image may be identified based on the first communication connection strength and the second communication connection strength.

The method may further include: acquiring first rotation information of the first external device and second rotation information of the second external device, wherein, in the acquiring of the projection image, a size of the first image and a size of the second size may be identified based on the first rotation information and the second rotation information.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, the disclosure will be described in greater detail with reference to the accompanying drawings.

The terms used in the example embodiments of the disclosure are general terms which are widely used now and selected considering the functions of the disclosure. However, the terms may vary depending on the intention of a person skilled in the art, a precedent, or the advent of new technology. In addition, various terms may be arbitrarily selected. In this case, the meaning of the term will be explained in the corresponding description. Therefore, terms used in the disclosure may be defined based on meanings of the terms and contents described in the disclosure, not simply based on names of the terms.

As used herein, the expression "have", "may have", "include", or "may include" refers to the existence of a corresponding feature (e.g., numeral, function, operation, or element such as component), and does not exclude one or more additional features.

The expression of "at least one of A and/or B" is to be understood as indicating any one of "A" or "B" or "A and B".

The expression "a first", "a second", "the first", or "the second" used in various example embodiments of the disclosure may modify various components regardless of their order and/or the importance but does not limit the corresponding components.

It should be understood that when an element (e.g., first element) is referred to as being (operatively or communicatively) "connected," or "coupled," to another element (e.g., second element), it may be directly connected or coupled to the other element or another element (e.g., third element) may be interposed between them.

A singular expression includes a plural expression as long as they are clearly distinguished in the context. In the application, it should be understood that the terms such as "comprising", "including" are intended to express that features, numbers, steps, operations, elements, part, or combinations thereof described in the specification are present and do not exclude existence or additions of one or more other features, numbers, steps, operations, elements, part, or combinations thereof.

In the description, the word "module" or "unit" refers to a software component, a hardware component, or a combination thereof, which is capable of carrying out at least one function or operation. A plurality of modules or units may be integrated into at least one module and implemented as at least one processor (not shown) except for those modules or units that need to be implemented in specific hardware.

In this disclosure, the term "user" may indicate a person who uses an electronic apparatus or a device (e.g., an artificial intelligence electronic apparatus) that uses an electronic apparatus.

An embodiment of the disclosure will be described in greater detail below with reference to the accompanying drawings.

Figure 1:
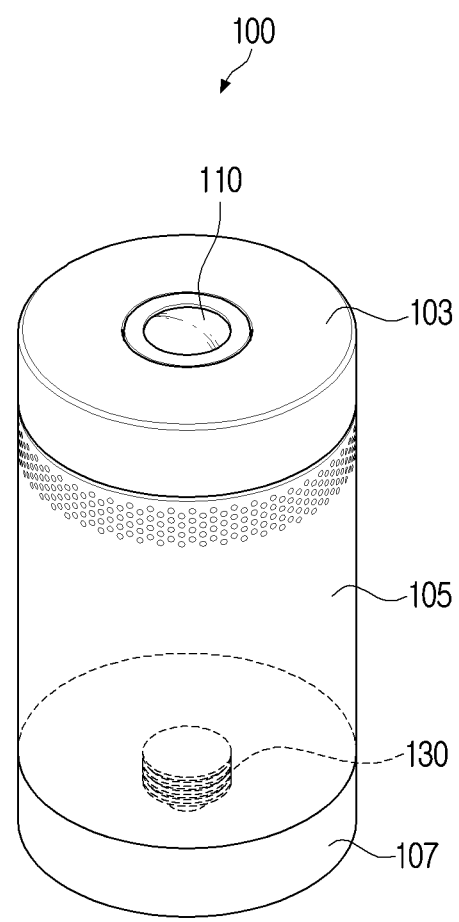
FIG. 1 is a perspective view illustrating an exterior of an electronic apparatus according to various embodiments.

FIG. 1 is a perspective view illustrating an exterior of an electronic apparatus 100 according to various embodiments.

Referring to FIG. 1, the electronic apparatus 100 may include a head 103, a main body 105, a projection lens 110, a connector 130, and/or a cover 107.

The electronic apparatus 100 may be devices in various forms. In particular, the electronic apparatus 100 may be a projector device that enlarges and projects an image to a wall or a screen, and the projector device may, for example, be an LCD projector, a digital light processing (DLP) type projector that uses a digital micromirror device (DMD), or the like.

The electronic apparatus 100 may be a display device for households or for an industrial use. The electronic apparatus 100 may be an illumination device used in everyday lives, or an audio device including an audio module, and it may be implemented as a portable communication device (e.g.: a smartphone), a computer device, a portable multimedia device, a wearable device, or a home appliance, etc. Meanwhile, the electronic apparatus 100 according to an embodiment of the disclosure is not limited to the aforementioned devices, and the electronic apparatus 100 may be implemented as an electronic apparatus 100 equipped with two or more functions of the aforementioned devices. For example, according to a manipulation of a processor, a projector function of the electronic apparatus 100 is turned off, and an illumination function or a speaker function is turned on, and the electronic apparatus 100 may be utilized as a display device, an illumination device, or an audio device. The electronic apparatus 100 may include a microphone or a communication device, and may be utilized as an AI speaker.

The main body 105 may include a housing configuring the exterior, and it may support or protect the components of the electronic apparatus 100 (e.g., the components illustrated in FIG. 2A and FIG. 2B) that are arranged inside the main body 105. The shape of the main body 105 may have a structure close to a cylindrical shape as illustrated in FIG. 1. However, the shape of the main body 105 is not limited thereto, and according to the various embodiments of the disclosure, the main body 105 may be implemented as various geometrical shapes such as a column, a cone, a sphere, etc. The main body 105 may have polygonal cross sections.

The size of the main body 105 may be a size that a user may grip or move with one hand, and the main body 105 may be implemented as a micro size so as to be easily carried, or it may be implemented as a size that may be held on a table or that may be coupled to an illumination device.

The material of the main body 105 may be implemented as a matt metallic or synthetic resin such that a user's fingerprint or dust does not smear it. The exterior of the main body 105 may include a slick glossy material.

In the main body 105, a friction region may be formed in a partial region of the exterior of the main body 105 such that a user may grip and move the main body 105. In the main body 105, a bent gripping part or a support 108a (refer to FIG. 3) that may be gripped by a user may be provided in at least a partial region.

The projection lens 110 is formed on one surface of the main body 105, and is formed to project a light that passed through a lens array to the outside of the main body 105. The projection lens 110 according to the various embodiments of the disclosure may be an optical lens which was low-dispersion coated for reducing chromatic aberration. The projection lens 110 may be a convex lens or a condensing lens, and the projection lens 110 according to an embodiment of the disclosure may adjust the focus by adjusting locations of a plurality of sub lenses.

The head 103 may be provided to be coupled to one surface of the main body 105, and it may support and protect the projection lens 110. The head 103 may be coupled to the main body 105 so as to be swiveled within a predetermined (e.g., specified) angle range based on one surface of the main body 105.

The head 103 may be automatically or manually swiveled by a user or the processor, and it may freely adjust a projection angle of the projection lens 110. Although not illustrated in the drawings, the head 103 may include a neck that is coupled to the main body 105 and that extends from the main body 105, and the head 103 may adjust a projection angle of the projection lens 110 as it is tipped or tilted.

The electronic apparatus 100 may project a light or an image to a desired position by adjusting an emission angle of the projection lens 110 while adjusting the direction of the head 103 in a state wherein the position and the angle of the main body 105 are fixed. The head 103 may include a handle that a user may grip after rotating in a desired direction.

On an outer circumferential surface of the main body 105, a plurality of openings may be formed. Through the plurality of openings, audio output from an audio output part may be output to the outside of the main body 105 of the electronic apparatus 100. The audio output part may include a speaker, and the speaker may be used for general uses such as reproduction of multimedia or reproduction of recording, output of a voice, etc.

According to an embodiment of the disclosure, a radiation fan (not shown) may be provided inside the main body 105, and when the radiation fan (not shown) is operated, air or heat inside the main body 105 may be discharged through the plurality of openings. Accordingly, the electronic apparatus 100 may discharge heat generated by the driving of the electronic apparatus 100 to the outside, and prevent and/or reduce overheating of the electronic apparatus 100.

The connector 130 may connect the electronic apparatus 100 with an external device and transmit or receive electronic signals, or it may be supplied with power from the outside. The connector 130 according to an embodiment of the disclosure may be physically connected with an external device. The connector 130 may include an input/output interface, and it may connect communication with an external device, or it may be supplied with power via wire or wirelessly. For example, the connector 130 may include an HDMI connection terminal, a USB connection terminal, an SD card accommodating groove, an audio connection terminal, or a power consent. The connector 130 may include a Bluetooth, Wi-Fi, or wireless charge connection module that is connected with an external device wirelessly.

The connector 130 may have a socket structure connected to an external illumination device, and it may be connected to a socket accommodating groove of an external illumination device and supplied with power. The size and specification of the connector 130 of a socket structure may be implemented in various ways in consideration of an accommodating structure of an external device that may be coupled. For example, according to the international standard E26, a diameter of a joining part of the connector 130 may be implemented as 26 mm, and in this case, the electronic apparatus 100 may be coupled to an external illumination device such as a stand in place of a light bulb that is generally used. Meanwhile, when coupled to a conventional socket located on a ceiling, the electronic apparatus 100 has a structure of being projected from up to down, and in case the electronic apparatus 100 does not rotate by socket-coupling, the screen cannot be rotated, either. Accordingly, in case power is supplied as the electronic apparatus 100 is socket-coupled, in order that the electronic apparatus 100 may rotate, the head 103 is swiveled on one surface of the main body 105 and adjusts an emission angle while the electronic apparatus 100 is socket-coupled to a stand on a ceiling, and accordingly, the screen may be emitted to a desired location, or the screen may be rotated.

The connector 130 may include a coupling sensor, and the coupling sensor may sense whether the connector 130 and an external device are coupled, a coupled state, or a subject for coupling, etc. and transmit the information to the processor, and the processor may control the driving of the electronic apparatus 100 based on the transmitted detection values.

The cover 107 may be coupled to or separated from the main body 105, and it may protect the connector 130 such that the connector 130 is not exposed to the outside at all times. The shape of the cover 107 may be a shape of being continued to the main body 105 as illustrated in FIG. 1. The shape may be implemented to correspond to the shape of the connector 130. Also, the cover 107 may support the electronic apparatus 100, and the electronic apparatus 100 may be coupled to the cover 107, and may be used while being coupled to or held on an external holder.

In the electronic apparatus 100 according to the various embodiments of the disclosure, a battery may be provided inside the cover 107. The battery may include, for example, a primary cell that cannot be recharged, a secondary cell that may be recharged, or a fuel cell.

Although not illustrated in the drawings, the electronic apparatus 100 may include a camera module, and the camera module may photograph still images and moving images. According to an embodiment of the disclosure, the camera module may include one or more lenses, an image sensor, an image signal processor, or a flash.

Although not illustrated in the drawings, the electronic apparatus 100 may include a protection case (not shown) such that the electronic apparatus 100 may be easily carried while being protected. Alternatively, the electronic apparatus 100 may include a stand (not shown) that supports or fixes the main body 105, and a bracket (not shown) that may be coupled to a wall surface or a partition.

In addition, the electronic apparatus 100 may be connected with various external devices using a socket structure, and provide various functions. As an example, the electronic apparatus 100 may be connected with an external camera device using a socket structure. The electronic apparatus 100 may provide an image stored in a connected camera device or an image that is currently being photographed using a projection part 111. As another example, the electronic apparatus 100 may be connected with a battery module using a socket structure, and supplied with power. Meanwhile, the electronic apparatus 100 may be connected with an external device using a socket structure, but this is merely an example, and the electronic apparatus 100 may be connected with an external device using another interface (e.g., a USB, etc.).

Figure 2A:
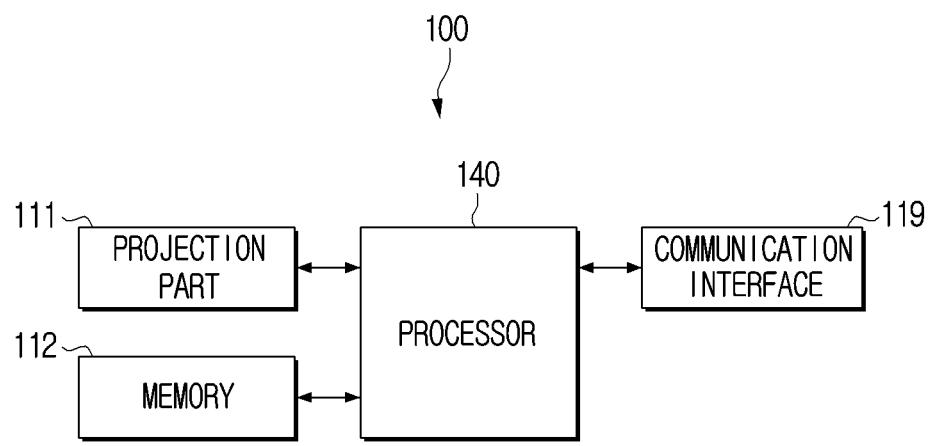
FIG. 2A is a block diagram illustrating an example configuration of an electronic apparatus according to various embodiments.

FIG. 2A is a block diagram illustrating an example configuration of an electronic apparatus 100 according to various embodiments.

Referring to FIG. 2A, the electronic apparatus 100 includes a projection part (e.g., a projector) 111, a memory 112, a communication interface (e.g., including communication circuitry) 119, and a processor (e.g., including processing circuitry) 114.

The projection part 111 may output an image to be output by the electronic apparatus 100 on a projection surface. The projection part 111 may include a projection lens 110.

The projection part 111 may perform a function of outputting an image to the projection surface. A detailed description related to the projection part 111 is described with reference to FIG. 2B. Although described as a projection part, the electronic apparatus 100 may project an image in various ways. The projection part 111 may include the projection lens 110. The projection surface may be a part of a physical space or a separate screen on which an image is output.

The memory 112 may store a first image and a second image output to the projection surface. Details of the memory 112 are described in FIG. 2B.

The communication interface 119 is a component including various communication circuitry for performing communication with various types of external devices according to various types of communication methods. For example, the communication interface 119 may include a Wi-Fi module, a Bluetooth module, an infrared communication module, and a wireless communication module. The Wi-Fi module and the Bluetooth module perform communication using a Wi-Fi method and a Bluetooth method, respectively. In addition to the communication methods described above, the wireless communication module may include at least one communication chip performing communication according to various wireless communication standards such as Zigbee, $3^{rd}$ generation (3G), $3^{rd}$ generation partnership project (3GPP), long term evolution (LTE), LTE advanced (LTE-A), $4^{th}$ generation (4G), $5^{th}$ generation (5G).

The processor 114 may include various processing circuitry and perform an overall control operation of the electronic apparatus 100. For example, the processor 114 functions to control the overall operation of the electronic apparatus 100.

The processor 114 may control the communication interface 119 to communicate with a first external device 201 and a second external device 202. The first external device 201 and the second external device 202 may maintain a communication session with the processor 114.

The processor 114 may receive first data including a first image from the first external device 201 and second data including a second image from the second external device 202, obtain first position information of the first external device 201 and second position information of the second external device 202, acquire a projection image including the first image and the second image based on the first position information and the second position information, and control the projection part 111 to output the projection image.

The processor 114 may receive first data including the first image from the first external device 201 through the communication interface 119. The processor 114 may receive second data including the second image from the second external device 202 through the communication interface 119. The first data may refer to content including at least one of the first image and first audio. Here, the second data may refer to content including at least one of the second image and a second audio.

As an example, the first image and the second image may be stored in a memory of each external device, and may refer to content that a user wants to output through the electronic apparatus 100, although not displayed in real time on each external device.

As another example, the first image and the second image may refer to content that the user wants to output through the electronic apparatus 100, while being displayed on an external device in real time. The processor 114 may output the first image and the second image using a mirroring function.

The processor 140 may acquire position information of each of the first external device 201 and the second external device 202. The first position information and the second position information may refer to information indicating where each external device is currently located. For example, the first position information and the second position information may include at least one of a two-dimensional coordinate value (information on x-axis and y-axis of a plane), a three-dimensional coordinate value (information on x-axis, y-axis, and z-axis in a stereoscopic space), or a relative distance. The relative distance may refer to a distance between the external device and the electronic apparatus 100.

According to an embodiment, the processor 140 may directly acquire the first position information of the first external device 201 and the second position information of the second external device 202 through the sensor part 113 of the electronic apparatus 100. For example, the processor 140 may identify a position of the first external device 201 and a position of the second external 202 device using at least one of an image sensor, a lidar sensor, and an infrared sensor included in the sensor part 113. In addition, the processor 140 may identify the position of the external device through analysis of a WiFi signal, analysis of an audio signal, use of Bluetooth low energy (BLE) communication, and the like.

According to an embodiment, the processor 140 may receive the first position information indicating the position of the first external device 201 from the first external device 201 and receive the second position information indicating the position of the second external device 202 from the second external device 202.

The processor 114 may receive the first position information from the first external device 201 through the communication interface 119. The processor 114 may receive the second position information from the second external device 202 through the communication interface 119.

The processor 114 determines where the first external device 201 and the second external device 202 are located on the basis of the electronic apparatus 100 based on the first position information and the second position information. In addition, the processor 114 may differently combine the first image and the second image according to the position of each external device. For example, the processor 114 may combine the first image and the second image based on the position of each external device.

The processor 114 may generate or acquire a projection image by combining the first image and the second image. In addition, the processor 114 may output the generated or acquired projection image to a projection surface 300 through the projection part 111.

The processor 114 may determine a projection position of the first image and the second image included in the projection image based on relative positions of the first external device 201 and the second external device 202 on the basis of the position of the electronic apparatus 100.

The processor 114 may generate the projection image by considering whether the external device exists on the left or right of the electronic apparatus 100 as a first priority. In addition, the processor 114 may generate the projection image by considering a distance between the external device and the electronic apparatus 100 as a second priority. The processor 114 may determine a method of combining the projection images according to the first priority. In addition, if it is identified that a combining method cannot be determined based on the first priority, the processor 114 may determine the combining method based on the second priority.

The processor 114 may generate a projection image based on whether the external device exists on the left or right with respect to the electronic apparatus 100. For example, when the external device is located on the left of the electronic apparatus 100, the processor 114 may generate a projection image such that the image is included at a left portion of the entire portion of the projection image. When the external device is located on the right of the electronic apparatus 100, the processor 114 may generate a projection image such that the image is included at a right portion of the entire portion of the projection image. It is assumed that the first external device 201 and the second external device 202 are simultaneously connected to the electronic apparatus 100 to receive second data including the first image and the second image.

For example, if it is identified that the first external device 201 is on the left of the electronic apparatus 100 and the second external device 202 is on the right of the electronic apparatus 100, the processor 114 may acquire a projection image in which the first image received from the first external device 201 is on the left portion and the second image received from the second external device 202 is on the right portion. This will be described in greater detail below with reference to FIG. 11.

As another example, if it is identified that the first external device 201 is on the right of the electronic apparatus 100 and the second external device 202 is on the left of the electronic apparatus 100, the processor 114 may acquire a projection image in which the first image received from the first external device 201 is at the right portion and the second image received from the second external device 202 is at the left portion.

There may be a situation in which the first external device 201 and the second external device 202 are both on the left or on the right the electronic apparatus 100. When it is identified that a plurality of connected devices are clustered on either side of the electronic apparatus 100, the processor 114 may determine a combining method based on a distance between the external device and the electronic apparatus 100.

When both the first external device 201 and the second external device 202 are located on the left or right based on the position of the electronic apparatus 100, the processor 114 may determine a projection position of the first image and the second image included in the projection image based on distances between the first external device 201 and the second external device 202 and the electronic apparatus 100.

When it is identified that both the first external device 201 and the second external device 202 are eccentric to the left or right of the electronic apparatus 100, the processor 114 may determine projection positions of the first image and the second image included in the projection image in consideration of the distances between the external devices and the electronic apparatus 100 in addition to the information indicating that the external devices are located on the left or right of the electronic apparatus 100.

The determining of the projection positions may refer to an operation of determining where the first image and the second image are to be located in the projection image.

For example, the processor 114 may acquire a first distance, which is a distance between the first external device 201 and the electronic apparatus 100, based on the acquired first position information. In addition, the processor 114 may acquire a second distance, which is a distance between the second external device 202 and the electronic apparatus 100, based on the acquired second position information.

The position information may include a direction and a distance.

The processor 114 may combine the first image and the second image using both the direction and the distance. The direction may be expressed as left or right, and the distance may be expressed as a distance value. The processor 114 may determine the position of the external device using data in the form of (direction, distance). For example, the processor 114 may determine the position of the external device in a format such as (left, 10 cm), (left, 20 cm), (right, 20 cm), (right, 30 cm), and the like.

If the direction of the first external device 201 and the direction of the second external device 202 are the same, the processor 114 may position an image received from an external device having a greater distance value in an identified direction and position an image received from an external device having a smaller distance value in a direction opposite to the identified direction, thereby obtaining a projection image.

As an example, it is assumed that the first position information of the first external device 201 is (left, 10 cm) and the second position information of the second external device 202 is (left, 20 cm). Here, since both the directions are the same as "left", the processor 114 may generate the projection image in consideration of the distance. For example, since the second distance (20 cm) of the second external device 202 has a larger value, the processor 114 may generate the projection image by positioning the second image received from the second external device 202 on the left and positioning the first image received from the first external device 201 on the right.

As another example, it is assumed that the first position information of the first external device 201 is (right, 20 cm) and the second position information of the second external device 202 is (right, 30 cm). Here, since both the directions are the same as "right", the processor 114 may generate the projection image in consideration of the distance. For example, since the second distance (30 cm) of the second external device 202 has a larger value, the processor 114 may generate the projection image by positioning the second image received from the second external device 202 on the right and positioning the first image received from the first external device 201 on the left.

The operation of generating the projection image in consideration of the direction and distance when the first external device 201 and the second external device 202 are positioned in one direction will be described in greater detail below with reference to FIGS. 12 and 13.

According to an implementation example, an operation of outputting a UI for guiding a user input when the first external device 201 and the second external device 202 are positioned in one direction will be described in greater detail below with reference to FIGS. 14 and 15.

When at least one of the first position information and the second position information is changed, the processor 114 may acquire a projection image based on the at least one of the position information.

An embodiment in which position information is changed will be described in greater detail below with reference to FIGS. 16 and 17.

When the third external device 203 is connected through the communication interface 119, the processor 114 may control the projection part 111 to output an icon corresponding to the third external device 203.

The processor 114 may determine in real time whether a new external device is identified in a state in which the first external device 201 and the second external device 202 are connected. Here, the third external device 203 may refer to a newly connected external device.

When it is identified that the third external device 203 is newly connected, the processor 114 may generate and output an icon corresponding to the new external device. According to an embodiment, the processor 114 may generate a projection image by additionally including an icon in the image in which the first image and the second image are combined. According to an embodiment, the processor 114 may additionally output an icon to the projection image in which the first image and the second image are combined.

The user may intuitively know that a new external device has been identified while viewing the output icon.

The processor 114 may acquire position information of the third external device 203 and may identify at least one of a position, a shape, a size, or a color of the icon corresponding to the third external device 203 based on the distance between the third external device 203 and the electronic apparatus 100.

According to an embodiment, the processor 140 may directly identify the position information of the third external device 203.

According to an embodiment, the processor 114 may receive position information of the third external device 203 through the communication interface 119.

In outputting the icon corresponding to the third external device 203, the processor 114 may determine an output method. Specifically, the processor 114 may determine at least one of a position, a shape, a size, or a color of the icon.

The processor 114 may acquire position information (third position information) of the third external device 203. In addition, the processor 114 may determine in which part of the projection image the icon is to be positioned based on the third position information. For example, if the third external device 203 is newly identified on the left of the electronic apparatus 100, the icon corresponding to the third external device 203 may also be included on the left of the projection image.

The processor 114 may determine the shape of the icon according to a type of the third external device 203. For example, if the third external device 203 is a TV, the processor 114 may output an icon corresponding to the TV, and if the third external device 203 is a smartphone, the processor 114 may display an icon corresponding to the smartphone. Also, if the third external device 203 is a previously registered device, the processor 114 may output an icon indicating the previously registered device.

The processor 114 may determine the size of the icon based on a distance between the third external device 203 and the electronic apparatus 100. The processor 114 may output (or generate) a smaller icon size as the distance between the third external device 203 and the electronic apparatus 100 decreases. The processor 114 may output (or generate) a larger icon size as the distance between the third external device 203 and the electronic apparatus 100 increases.

The processor 114 may determine a color of the icon based on strength of the communication connection between the third external device 203 and the electronic apparatus 100. The processor 114 may output (or generate) the icon in brighter colors as the strength of the communication connection between the third external device 203 and the electronic apparatus 100 increases. In addition, the processor 114 may output (or generate) the icon in darker colors as the strength of the communication connection between the third external device 203 and the electronic apparatus 100 decreases.

When the distance between the third external device 203 and the electronic apparatus 100 decreases, the processor 114 may control the projection part 111 to output the icon corresponding to the third external device 203 in a blinking manner.

The processor 114 may acquire third position information of the third external device 203 in real time. In addition, the processor 114 may acquire the distance between the third external device 203 and the electronic apparatus 100 in real time. The processor 114 may identify movement of the third external device 203 based on the obtained distance.

When the distance between the third external device 203 and the electronic apparatus 100 decreases, the processor 114 identifies that the third external device 203 is moved to approach the electronic apparatus 100. When the distance between the third external device 203 and the electronic apparatus 100 increases, the processor 114 may identify that the third external device 203 is moved away from the electronic apparatus 100.

When it is identified that the third external device 203 is moved to approach the electronic apparatus 100, the processor 114 may output the icon in a blinking manner.

The user may intuitively recognize that the third external device 203 currently approaches the electronic apparatus 100, while viewing the blinking icon.

An embodiment of outputting an icon in response to an operation of connecting a new external device will be described in greater detail below with reference to FIGS. 18 and 19.

The processor 114 may acquire first communication connection strength of the first external device 201 and second communication connection strength of the second external device 202. If the first communication connection strength or the second communication connection strength is less than a threshold value strength, the processor 114 may identify an external device having the communication connection strength less than the threshold value strength and may acquire a projection image so that an image received from the identified external device is not included.

An embodiment including only one of a plurality of images in the projection image according to the communication connection strength will be described in greater detail below with reference to FIGS. 22 and 23.

The processor 114 may acquire the first communication connection strength of the first external device 201 and the second communication connection strength of the second external device 202 and identify a size of the first image and a size of the second image based on the first communication connection strength and the second communication connection strength.

An embodiment changing the size of an image according to the communication connection strength will be described in greater detail below with reference to FIGS. 20 and 21.

The processor 114 may acquire first rotation information of the first external device 201 and second rotation information of the second external device 202, and a size of a first image and a size of a second image may be identified based on the first rotation information and the second rotation information.

The rotation information may be in a horizontal direction or a vertical direction. The external device may generally be rectangular rather than square. When the external device is in a state in which a horizontal length thereof is greater than a vertical length thereof, the rotation information may be in the horizontal direction. When the rotation information is in the horizontal direction, the external device may be in a state of operating in a horizontal mode. When the external device is in a state in which the vertical length thereof is greater than the horizontal length, the rotation information may be in the vertical direction. When the rotation information is in the vertical direction, the external device may be in a state of operating in a vertical mode.

The processor 140 may acquire a horizontal/vertical ratio of an image to be output. In addition, the processor 140 may output the largest image on a projection surface based on a horizontal/vertical ratio of the image to be output and a size of the projection surface.

According to an embodiment, the processor 140 may output the first image to a half region (a first area) of the entire region of the projection surface and output the second image to the other half region (a second area). Here, the processor 140 may identify a size of the output image based on the first rotation information of the first external device 201 and the second rotation information of the second external device 202. Here, the processor 140 may determine that the size of the first image is maximized in the predetermined first region and may determine that the size of the second image is maximized in the predetermined second region.

According to an embodiment, the processor 140 may determine a horizontal/vertical ratio of the first image based on the first rotation information and determine a horizontal/vertical ratio of the second image based on the second rotation information. In addition, the processor 140 may determine a size of the first image and a size of the second image so that the first image and the second image are output to be the largest in consideration of the horizontal/vertical ratio of the first image, the horizontal/vertical ratio of the second image, and the size of the projection surface. For example, the processor 140 may determine the sizes of the images in a state in which the horizontal/vertical ratio of the first image and the horizontal/vertical ratio of the second image are maintained. Accordingly, a size of a region of the projection surface in which the first image is displayed may be different from a size of a region of the projection surface in which the second image is displayed.

Figure 25:
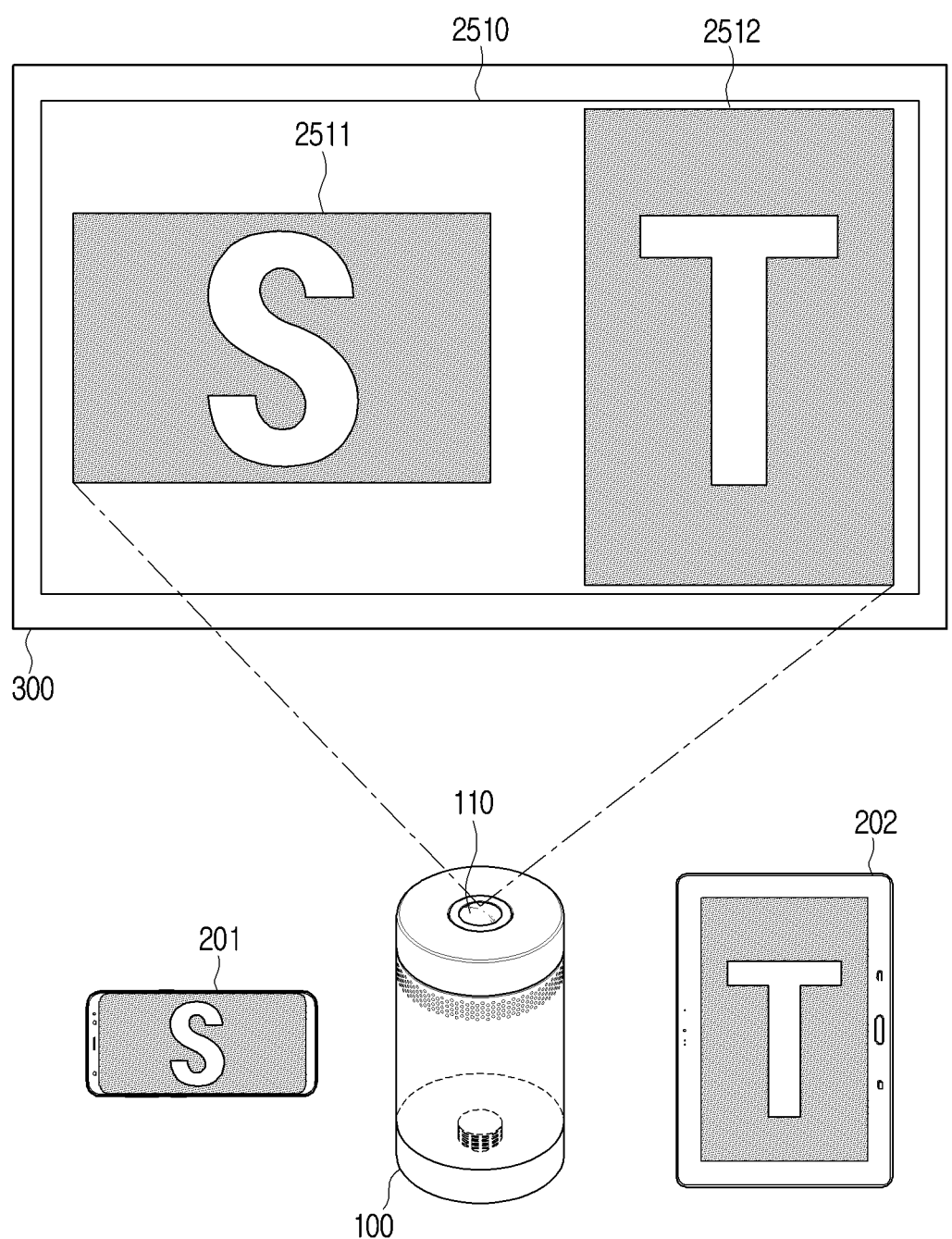
FIG. 25 is a diagram illustrating an example operation of outputting a projection image based on rotation information according to various embodiments.

For example, the external device whose rotation direction is a horizontal direction may be the first external device 201 of FIG. 25. Similarly, the external device whose rotation direction is a vertical direction may be the second external device 202 of FIG. 25.

An embodiment determining the direction of the image according to the rotation direction will be described in greater detail below with reference to FIGS. 24 and 25.

The electronic apparatus 100 according to various embodiments may combine images received from each of the plurality of external devices based on state information of the plurality of external devices connected for communication. For example, in that the electronic apparatus 100 according to various embodiments determines an arrangement method of an image received from an external device in response to information received from the external device, user convenience in operation may be increased.

The electronic apparatus 100 may determine a time point for keystone correction.

According to an embodiment, the electronic apparatus 100 may generate a projection image by combining a plurality of images and may perform keystone correction on the generated projection image.

According to an embodiment, the electronic apparatus 100 may perform keystone correction on each of a plurality of images and may combine the plurality of images after keystone correction is performed.

For example, the electronic apparatus 100 may perform keystone correction on the first image received from the first external device 201 and the second image received from the second external device 202, separately. In addition, the electronic apparatus 100 may generate a projection image by combining the first image and the second image on which the keystone correction has been completed.

The electronic apparatus 100 may acquire images from various sources in combining the projection images.

According to an embodiment, the electronic apparatus 100 may combine a plurality of images respectively received from the first external device 201 and the second external device connected to the electronic apparatus 100.

According to an embodiment, the electronic apparatus 100 may combine an image from an external device connected to the electronic apparatus 100 with a predetermined image stored in the memory 112 of the electronic apparatus 100. The predetermined image may be an image stored in the memory 112 and may be determined according to a user selection. According to an embodiment, the predetermined image may refer to a basic image selected without a user selection.

The electronic apparatus 100 may change a size of the projection image or change a position of the projection image. For example, the electronic apparatus 100 may change at least one of the size and the position of the projection image based on a user input. Here, the user input may refer to various operations of inputting a user command.

As an example, the user input may refer to a physical input received through the user interface 115.

As another example, the user input may refer to motion recognition recognized through the user's gaze. The motion recognition operation may refer to an operation of recognizing a user's motion through a camera (not shown) included in the electronic apparatus 100. The operation of recognizing the user's motion may refer to recognizing a state in which a part of the user's body moves or recognizing a state in which an external device is moved by the user. The electronic apparatus 100 may recognize a change in position of an external device by a camera (not shown) through the communication interface 119.

The electronic apparatus 100 may change the size of the projection image or the position of the projection image based on the user input.

The electronic apparatus 100 may control the first image and the second image included in the projection image, separately, based on motion recognition. The electronic apparatus 100 may change only the first image or only the second image based on motion recognition. The electronic apparatus 100 may differently control the first image and the second image based on motion recognition. The electronic apparatus 100 may track or identify the user's gaze and may identify an image to which the user's gaze is directed. In addition, the electronic apparatus 100 may control only the image to which the user's gaze is directed.

In the above, the operation related to how the electronic apparatus 100 receives images from a plurality of external devices and displays them has been described. Hereinafter, an operation related to how the electronic apparatus 100 receives audio from a plurality of external devices and outputs the audio will be described in greater detail.

The processor 140 may receive audio other than images from external devices. For example, the processor 140 may receive first audio from the first external device 201 and receive second audio from the second external device 202.

The processor 140 may output the received audio based on the position information of the external device. For example, the processor 140 may control the output of the first audio and the second audio based on the first position information of the first external device 201 and the second position information of the second external device 202.

The electronic apparatus 100 may include a plurality of speakers (e.g., a left speaker and a right speaker). The processor 140 may map a specific external device to each of the plurality of speakers based on the position information of the external device. For example, when the first external device 201 is located on the left of the electronic apparatus 100, the processor 140 may map the first external device 201 to the left speaker. When the second external device 202 is on the right of the electronic apparatus 100, the processor 140 may map the second external device 202 to the right speaker.

The processor 140 may map a specific speaker and a specific external device through user selection or menu control. The user selection may refer to a user input for mapping a specific speaker and a specific external device through a guide screen displayed on the display.

For example, it is assumed that the user maps the first external device 201 to the first speaker (e.g., the speaker included in the electronic apparatus 100) and maps the second external device 202 to the second speaker (e.g., an external speaker connected to the electronic apparatus 100). The processor 140 may output the first audio received from the first external device 201 through the first speaker and may output the second audio received from the second external device 202 through the second speaker.

The processor 140 may control a magnitude of power of audio based on the position of the first external device 201 and the position of the second external device 202. For example, the processor 140 may control the magnitude of power of audio based on a distance between the external device and the electronic apparatus 100. The processor 140 may output audio having a greater power as the external device is closer to the electronic apparatus 100.

For example, it is assumed that the first external device 201 is 1 m away from the electronic apparatus 100 and the second external device 202 is 2 m away from the electronic apparatus 100. The processor 140 may output audio at 20 db to a speaker (e.g., the left speaker) corresponding to the first external device 201 and may output audio at 10 db to a speaker (e.g., the right speaker) corresponding to the second external device 202.

The processor 140 may control the magnitude of power of the audio based on a relative distance between the first external device 201 and the second external device 202. When the position of the first external device 201 is closer to the electronic apparatus 100 than the second external device 202, the processor 140 may increase the magnitude of power of the audio output from the speaker corresponding to the first external device 201.

The processor 140 may independently output only one audio among a plurality of received audios. For example, the processor 140 may output only one audio based on a user selection, a predetermined priority, a relative distance, or a communication connection sensitivity. The user selection may be a user input for selecting one external device among a plurality of external devices. The predetermined priority may refer to giving a high priority to a specific external device or a specific type of external device. The relative distance may be used in an operation of outputting audio received from the nearest external device among the plurality of external devices. The communication connection sensitivity may be used in an operation of outputting audio received from an external device having the strongest communication connection sensitivity among the plurality of external devices.

The processor 140 may display a guide UI (e.g., an audio selection menu) for selecting one audio among a plurality of audios, while projecting the first image and the second image on the projection surface. The UI indicating whether audio is output may be a UI 1121 and a UI 1122 of FIG. 11.

The electronic apparatus 100 may determine a direction of the projection image based on rotation information (or a rotation state) of the external device. Determining of the direction of the projection image may refer to an operation of determining whether to output at a resolution having a longer horizontal length or a resolution having a longer vertical length. The user may easily change the rotation direction or resolution of the projection image output to the projection surface 300 by changing the rotation state of the external device without inputting a separate setting.

Figure 2B:
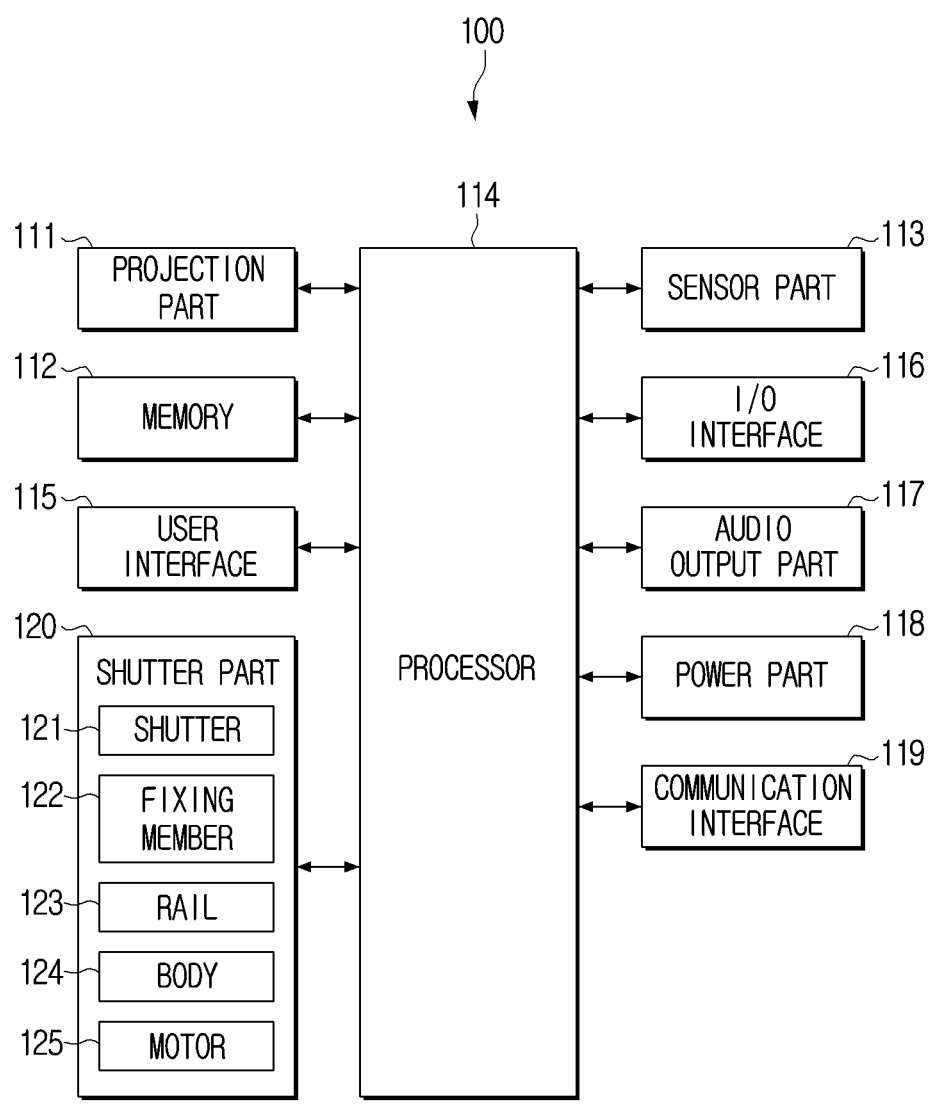
FIG. 2B is a block diagram illustrating an example configuration of the electronic apparatus of FIG. 2A according to various embodiments.

FIG. 2B is a block diagram illustrating an example configuration of the electronic apparatus of FIG. 2A according to various embodiments.

Referring to FIG. 2B, the electronic apparatus 100 may include a projection part (e.g., including a projector) 111, a memory 112, a sensor part (e.g., including a sensor) 113, a processor (e.g., including processing circuitry) 114, a user interface (e.g., including user interface circuitry) 115, an input/output interface (e.g., including input/output circuitry) 116, an audio output part (e.g., including audio output circuitry) 117, a power part (e.g., including a power supply) 118, a communication interface (e.g., including communication circuitry) 119, and a shutter part (e.g., comprising a shutter) 120. Meanwhile, the configuration illustrated in FIG. 2B is only an example, and some components may be omitted and a new component may be added.

The content already described in FIG. 2A may not be repeated here.

The projection part 111 is a component that projects an image to the outside. The projection part 111 according to an embodiment of the disclosure may include a projector and be implemented in various projection methods (e.g., a cathode-ray tube (CRT) method, a liquid crystal display (LCD) method, a digital light processing (DLP) method, a laser method, etc.). As an example, the CRT method has basically the same principle as the principle of a CRT monitor. In the CRT method, an image is enlarged with a lens in front of a cathode-ray tube (CRT), and the image is displayed on a screen. According to the number of cathode-ray tubes, the CRT method is divided into a one-tube method and a three-tube method, and in case of the three-tube method, it may be implemented while cathode-ray tubes of red, green, and blue are divided separately.

As another example, the LCD method is a method of displaying an image by making a light emitted from a light source pass through a liquid crystal. The LCD method is divided into a single-plate method and a three-plate method, and in case of the three-plate method, a light emitted from a light source may be separated into red, green, and blue at a dichroic mirror (a mirror that reflects only a light in a specific color and makes the remaining lights pass through), and then pass through a liquid crystal, and then the light may be collected into one place again.

As still another example, the DLP method is a method of displaying an image using a digital micromirror device (DMD) chip. A projection part by the DLP method may include a light source, a color wheel, a DMD chip, a projection lens, etc. A light emitted from a light source may have a color as it passes through a rotating color wheel. The light that passed through the color wheel is input into a DMD chip. The DMD chip includes numerous micromirrors, and reflects the light input into the DMD chip. A projection lens may perform a role of enlarging the light reflected from the DMD chip to an image size.

As still another example, the laser method includes a diode pumped solid state (DPSS) laser and a galvanometer. As a laser outputting various colors, a laser wherein three DPSS lasers were installed for each of RGB colors, and then the optical axes were overlapped using a special mirror is used. The galvanometer includes a mirror and a motor of a high output, and moves the mirror at a fast speed. For example, the galvanometer may rotate the mirror at 40 KHz/sec at the maximum. The galvanometer is mounted according to a scanning direction, and in general, a projector performs planar scanning, and thus the galvanometer may also be arranged by being divided into x and y axes.

The projection part 111 may include light sources in various types. For example, the projection part 111 may include at least one light source among a lamp, an LED, and a laser.

The projection part 111 may output images in a 4:3 screen ratio, a 5:4 screen ratio, and a 16:9 wide screen ratio according to the use of the electronic apparatus 100 or a user's setting, etc., and it may output images in various resolutions such as WVGA(854*480), SVGA(800*600), XGA(1024*768), WXGA(1280*720), WXGA(1280*800), SXGA(1280*1024), UXGA(1600*1200), Full HD(1920*1080), etc. according to screen ratios.

The projection part 111 may perform various functions for adjusting an output image by control of the processor 114. For example, the projection part 111 may perform functions such as zoom, keystone, quick corner (4 corner) keystone, lens shift, etc.

For example, the projection part 111 may enlarge or reduce an image according to a distance (a projection distance) to the screen. That is, a zoom function may be performed according to a distance to the screen. The zoom function may include a hardware method of adjusting the size of the screen by moving a lens and a software method of adjusting the size of the screen by cropping an image, etc. When the zoom function is performed, adjustment of a focus of an image is needed. For example, methods of adjusting a focus include a manual focus method, an electric method, etc. The manual focus method may refer, for example, to a method of manually adjusting a focus, and the electric method may refer, for example, to a method wherein the projector automatically adjusts a focus using a built-in motor when the zoom function is performed. When performing the zoom function, the projection part 111 may provide a digital zoom function through software, and it may also provide an optical zoom function of performing the zoom function by moving a lens through the driving part.

The projection part 111 may perform a keystone function. When the height does not fit in case of front surface scanning, the screen may be distorted in an upper direction or a lower direction. The keystone function may refer, for example, to a function of correcting a distorted screen. For example, if distortion occurs in left and right directions of the screen, the screen may be corrected using a horizontal keystone, and if distortion occurs in upper and lower directions, the screen may be corrected using a vertical keystone. The quick corner (4 corner) keystone function is a function of correcting the screen in case the central region of the screen is normal, but the balance of the corner areas is not appropriate. The lens shift function is a function of moving the screen as it is in case the screen is outside the screen region.

The projection part 111 may automatically analyze the surrounding environment and the projection environment without a user input, and perform zoom/keystone/focus functions. Specifically, the projection part 111 may automatically provide zoom/keystone/focus functions based on the distance between the electronic apparatus 100 and the screen, information on the space wherein the electronic apparatus 100 is currently located, information on the light amount in the surroundings, etc. that were sensed through sensors (a depth camera, a distance sensor, an infrared sensor, an illumination sensor, etc.).

The projection part 111 may provide an illumination function using a light source. For example, the projection part 111 may provide an illumination function by outputting a light source using an LED. According to an embodiment of the disclosure, the projection part 111 may include an LED, and according to an embodiment of the disclosure, the electronic apparatus may include a plurality of LEDs. The projection part 111 may output a light source using a surface-emitting LED depending on implementation examples. Here, the surface-emitting LED may refer to an LED that has a structure wherein an optical sheet is arranged on the upper side of the LED such that a light source is output while being evenly dispersed. Specifically, when a light source is output through the LED, the light source may be evenly dispersed through the optical sheet, and the light source dispersed through the optical sheet may be introduced into a display panel.

The projection part 111 may provide a dimming function for adjusting the strength of a light source to a user. For example, if a user input for adjusting the strength of a light source is received from a user through a user interface 115 (e.g., a touch display button or a dial), the projection part 111 may control the LED to output the strength of a light source corresponding to the received user input.

The projection part 111 may provide the dimming function based on a content analyzed by the processor 114 without a user input. Specifically, the projection part 111 may control the LED to output the strength of a light source based on information on a content that is currently provided (e.g., the type of the content, the brightness of the content, etc.).

The projection part 111 may control a color temperature by control of the processor 114. The processor 114 may control a color temperature based on a content. For example, if it is identified that a content is going to be output, the processor 114 may acquire color information for each frame of the content which was determined to be output. The processor 114 may control the color temperature based on the acquired color information for each frame. The processor 114 may acquire at least one main color of the frames based on the color information for each frame. Then, the processor 114 may adjust the color temperature based on the acquired at least one main color. For example, a color temperature that the processor 114 may adjust may be divided into a warm type or a cold type. It is assumed that a frame to be output (referred to as an output frame hereinafter) includes a scene wherein fire occurred. The processor 114 may identify (or acquire) that the main color is red based on color information currently included in the output frame. Then, the processor 114 may identify a color temperature corresponding to the identified main color (red). The color temperature corresponding to red may be a warm type. The processor 114 may use an artificial intelligence model for acquiring color information or a main color of a frame. According to an embodiment of the disclosure, the artificial intelligence model may be stored in the electronic apparatus 100 (e.g., the memory 112). According to an embodiment of the disclosure, the artificial intelligence model may be stored in an external server that may communicate with the electronic apparatus 100.

The electronic apparatus 100 may be interlocked with an external device and control the illumination function. For example, the electronic apparatus 100 may receive illumination information from an external device. The illumination information may include at least one of brightness information or color temperature information set in the external device. The external device may refer to a device connected to the same network as the electronic apparatus 100 (e.g., an IoT device included in the same home/company network) or a device which is not connected to the same network as the electronic apparatus 100, but which may communicate with the electronic apparatus (e.g., a remote control server). For example, it is assumed that an external illumination device included in the same network as the electronic apparatus 100 (an IoT device) is outputting a red illumination at the brightness of 50. The external illumination device (an IoT device) may directly or indirectly transmit illumination information (e.g., information indicating that a red illumination is being output at the brightness of 50) to the electronic apparatus. The electronic apparatus 100 may control the output of a light source based on the illumination information received from the external illumination device. For example, if the illumination information received from the external illumination device includes information indicating that a red illumination is being output at the brightness of 50, the electronic apparatus 100 may output the red illumination at the brightness of 50.

The electronic apparatus 100 may control the illumination function based on bio-information. For example, the processor 114 may acquire bio-information of a user. The bio-information may include at least one of the body temperature, the heart rate, the blood pressure, the breath, or the electrocardiogram of the user. Here, the bio-information may include various information other than the aforementioned information. As an example, the electronic apparatus may include a sensor for measuring bio-information. The processor 114 may acquire bio-information of a user through the sensor, and control the output of a light source based on the acquired bio-information. As another example, the processor 114 may receive bio-information from an external device through the input/output interface 116. The external device may refer to a portable communication device of a user (e.g., a smartphone or a wearable device). The processor 114 may acquire bio-information of a user from the external device, and control the output of a light source based on the acquired bio-information. Depending on implementation examples, the electronic apparatus may identify whether a user is sleeping, and if it is identified that a user is sleeping (or preparing to sleep), the processor 114 may control the output of a light source based on the bio-information of the user.

The memory 112 may store at least one instruction regarding the electronic apparatus 100. In the memory 112, an operating system (O/S) for driving the electronic apparatus 100 may be stored. In addition, in the memory 112, various software programs or applications for the electronic apparatus 100 to operate according to the various embodiments of the disclosure may be stored. Further, the memory 112 may include a semiconductor memory such as a flash memory or a magnetic storage medium such as a hard disk.

For example, in the memory 112, various kinds of software modules for the electronic apparatus 100 to operate according to the various embodiments of the disclosure may be stored, and the processor 114 may control the operations of the electronic apparatus 100 by executing the various kinds of software modules stored in the memory 112. That is, the memory 112 may be accessed by the processor 114, and reading/recording/correcting/deleting/updating, etc. Of data by the processor 114 may be performed.

In the disclosure, the term memory 112 may be used as meaning including the memory 112, a ROM (not shown) and a RAM (not shown) inside the processor 114, or a memory card (not shown) installed on the electronic apparatus 100 (e.g., a micro SD card, a memory stick).

The sensor part 113 may include at least one sensor. For example, the sensor part 113 may include at least one of a tilt sensor sensing a tilt of the electronic apparatus 100 and an image sensor capturing an image. The tilt sensor may be an acceleration sensor or a gyro sensor, and the image sensor may refer to a camera or a depth camera. The sensor part 113 may include various sensors in addition to the tilt sensor or the image sensor. For example, the sensor part 113 may include an illuminance sensor and a distance sensor. The sensor part 113 may include a lidar sensor.

The user interface 115 may include various user interface circuitry and/or input devices in various types. For example, the user interface 115 may include a physical button. The physical button may include a function key, direction keys (e.g., four direction keys), or a dial button. According to an embodiment of the disclosure, the physical button may be implemented as a plurality of keys. According to an embodiment of the disclosure, the physical button may be implemented as one key. In case the physical button is implemented as one key, the electronic apparatus 100 may receive a user input by which one key is pushed for equal to or longer than a threshold value time. If a user input by which one key is pushed for equal to or longer than a threshold value time is received, the processor 114 may perform a function corresponding to the user input. For example, the processor 114 may provide the illumination function based on the user input.

The user interface 115 may receive a user input using a non-contact method. In case of receiving a user input through a contact method, physical force should be transmitted to the electronic apparatus. Accordingly, a method for controlling the electronic apparatus regardless of physical force may be needed. For example, the user interface 115 may receive a user gesture, and perform an operation corresponding to the received user gesture. The user interface 115 may receive a gesture of a user through a sensor (e.g., an image sensor or an infrared sensor).

In addition, the user interface 115 may receive a user input using a touch method. For example, the user interface 115 may receive a user input through a touch sensor. According to an embodiment of the disclosure, a touch method may be implemented as a non-contact method. For example, the touch sensor may determine whether a user's body approached within a threshold value distance. The touch sensor may identify a user input even when a user does not contact the touch sensor. According to a different implementation example, the touch sensor may identify a user input by which a user contacts the touch sensor.

The electronic apparatus 100 may receive user inputs by various methods other than the aforementioned user interface. As an example, the electronic apparatus 100 may receive a user input through an external remote control device. Here, the external remote control device may be a remote control device corresponding to the electronic apparatus 100 (e.g., a control device dedicated to the electronic apparatus) or a portable communication device of a user (e.g., a smartphone or a wearable device). In the portable communication device of a user, an application for controlling the electronic apparatus may be stored. The portable communication device may acquire a user input through the stored application, and transmit the acquired user input to the electronic apparatus 100. The electronic apparatus 100 may receive the user input from the portable communication device, and perform an operation corresponding to the user's control command.

The electronic apparatus 100 may receive a user input using voice recognition. According to an embodiment of the disclosure, the electronic apparatus 100 may receive a user voice through the microphone included in the electronic apparatus. According to an embodiment of the disclosure, the electronic apparatus 100 may receive a user voice from the microphone or an external device. For example, an external device may acquire a user voice through a microphone of the external device, and transmit the acquired user voice to the electronic apparatus 100. The user voice transmitted from the external device may be audio data or digital data converted from audio data (e.g., audio data converted to a frequency domain, etc.). The electronic apparatus 100 may perform an operation corresponding to the received user voice. For example, the electronic apparatus 100 may receive audio data corresponding to the user voice through the microphone. The electronic apparatus 100 may convert the received audio data into digital data. The electronic apparatus 100 may convert the converted digital data into text data using a speech to text (STT) function. According to an embodiment of the disclosure, the speech to text (STT) function may be directly performed at the electronic apparatus 100.

According to an embodiment of the disclosure, the speech to text (STT) function may be performed at an external server. The electronic apparatus 100 may transmit digital data to the external server. The external server may convert the digital data into text data, and acquire control command data based on the converted text data. The external server may transmit the control command data (here, the text data may also be included) to the electronic apparatus 100. The electronic apparatus 100 may perform an operation corresponding to the user voice based on the acquired control command data.

The electronic apparatus 100 may provide a voice recognition function using one assistance (or an artificial intelligence agent, e.g., Bixby™, etc.), but this is merely an example, and the electronic apparatus 100 may provide a voice recognition function through a plurality of assistances. The electronic apparatus 100 may provide the voice recognition function by selecting one of the plurality of assistances based on a trigger word corresponding to the assistance or a specific key that exists on the remote control.

The electronic apparatus 100 may receive a user input using a screen interaction. The screen interaction may refer to a function of the electronic apparatus of identifying whether a predetermined event occurs through an image projected on a screen (or a projection surface), and acquiring a user input based on the predetermined event. The predetermined event may refer to an event wherein a predetermined object is identified in a specific position (e.g., a position wherein a UI for receiving a user input was projected). The predetermined object may include at least one of a body part of a user (e.g., a finger), a pointer, or a laser point. If the predetermined object is identified in a position corresponding to the projected UI, the electronic apparatus 100 may identify that a user input selecting the projected UI was received. For example, the electronic apparatus 100 may project a guide image so that the UI is displayed on the screen. The electronic apparatus 100 may identify whether the user selects the projected UI. For example, if the predetermined event is identified in the position of the projected UI, the electronic apparatus 100 may identify that the user selected the projected UI. The projected UI may include at least one item. The electronic apparatus 100 may perform spatial analysis for identifying whether the predetermined event is in the position of the projected UI. The electronic apparatus 100 may perform spatial analysis through a sensor (e.g., an image sensor, an infrared sensor, a depth camera, a distance sensor, etc.). By performing spatial analysis, the electronic apparatus 100 may identify whether the predetermined event occurs in the specific position (the position wherein the UI was projected). If it is identified that the predetermined event occurs in the specific position (the position wherein the UI was projected), the electronic apparatus 100 may identify that a user input for selecting the UI corresponding to the specific position was received.

The input/output interface 116 is a component for inputting or outputting at least one of an audio signal or an image signal. The input/output interface 116 may include various input/output circuitry and receive input of at least one of an audio signal or an image signal from an external device, and output a control command to the external device.

The input/output interface 116 according to an embodiment of the disclosure may be implemented as a wired input/output interface of at least one of a high definition multimedia interface (HDMI), a mobile high-definition link (MHL), a universal serial bus (USB), a USB C-type, a display port (DP), a Thunderbolt, a video graphics array (VGA) port, an RGB port, a Dsubminiature (D-SUB), or a digital visual interface (DVI). According to an embodiment of the disclosure, the wired input/output interface may be implemented as an interface inputting or outputting only audio signals and an interface inputting or outputting only image signals, or implemented as one interface inputting or outputting both audio signals and image signals.

The electronic apparatus 100 may receive data through the wired input/output interface, but this is merely an example, and the electronic apparatus 100 may be supplied with power through the wired input/output interface. For example, the electronic apparatus 100 may be supplied with power from an external battery through a USB C-type, or supplied with power from a consent through a power adapter. As another example, the electronic apparatus may be supplied with power from an external device (e.g., a laptop computer or a monitor, etc.) through a DP.

The input/output interface 116 according to an embodiment of the disclosure may be implemented as a wireless input/output interface that performs communication by at least one communication method among the communication methods of Wi-Fi, Wi-Fi Direct, Bluetooth, Zigbee, 3rd Generation (3G), 3rd Generation Partnership Project (3GPP), and Long Term Evolution (LTE). Depending on implementation examples, the wireless input/output interface may be implemented as an interface inputting or outputting only audio signals and an interface inputting or outputting only image signals, or implemented as one interface inputting or outputting both audio signals and image signals.

The electronic apparatus 100 may be implemented such that an audio signal is input through a wired input/output interface, and an image signal is input through a wireless input/output interface. The electronic apparatus 100 may be implemented such that an audio signal is input through a wireless input/output interface, and an image signal is input through a wired input/output interface.

The audio output part 117 is a component that outputs audio signals. For example, the audio output part 117 may include various audio output circuitry including, for example, an audio output mixer, an audio signal processor, and an audio output module. The audio output mixer may mix a plurality of audios signals to be output as at least one audio signal. For example, the audio output mixer may mix an analog audio signal and another analog audio signal (e.g.: an analog audio signal received from the outside) as at least one analog audio signal. The audio output module may include a speaker or an output terminal. According to an embodiment of the disclosure, the audio output module may include a plurality of speakers, and in this case, the audio output module may be arranged inside the main body, and audio that is emitted while covering at least a part of a vibration plate of the audio output module may be transmitted to the outside of the main body after passing through a waveguide. The audio output module may include a plurality of audios output parts, and the plurality of audio output parts may be symmetrically arranged on the exterior of the main body, and accordingly, audio may be emitted to all directions, i.e., all directions in 360 degrees.

The power part 118 may include a power supply and be supplied with power from the outside and supply the power to various components of the electronic apparatus 100. The power part 118 according to an embodiment of the disclosure may be supplied with power through various methods. As an example, the power part 118 may be supplied with power using the connector 130 as illustrated in FIG. 1. The power part 118 may be supplied with power using a DC power code of 220V. However, the disclosure is not limited thereto, and the electronic apparatus may be supplied with power using a USB power code or supplied with power using a wireless charging method.

The power part 118 may be supplied with power using an internal battery or an external battery. The power part 118 according to an embodiment of the disclosure may be supplied with power through an internal battery. As an example, the power part 118 may charge power of the internal battery using at least one of a DC power code of 220V, a USB power code, or a USB C-type power code, and may be supplied with power through the charged internal battery. The power part 118 according to an embodiment of the disclosure may be supplied with power through an external battery. As an example, if connection between the electronic apparatus and an external battery is performed through various wired communication methods such as a USB power code, a USB C-type power code, a socket groove, etc., the power part 118 may be supplied with power through the external battery. That is, the power part 118 may be directly supplied with power from an external battery, or charge an internal battery through an external battery, and supplied with power from the charged internal battery.

The power part 118 according to the disclosure may be supplied with power using at least one of the aforementioned plurality of power supplying methods.

Meanwhile, regarding power consumption, the electronic apparatus 100 may have power consumption of equal to or smaller than a predetermined value (e.g., 43 W) for the reason of a form of a socket or other standards, etc. The electronic apparatus 100 may vary the power consumption such that the power consumption may be reduced when using a battery. That is, the electronic apparatus 100 may vary the power consumption based on the power supplying method and the use amount of power, etc.

The electronic apparatus 100 according to an embodiment of the disclosure may provide various smart functions.

For example, the electronic apparatus 100 may be connected with a portable terminal device for controlling the electronic apparatus 100, and the screen output at the electronic apparatus 100 may be controlled through a user input that is input at the portable terminal device. As an example, the portable terminal device may be implemented as a smartphone including a touch display, and the electronic apparatus 100 may receive screen data provided at the portable terminal device from the portable terminal device and output the data, and the screen output at the electronic apparatus 100 may be controlled according to a user input that is input at the portable terminal device.

The electronic apparatus 100 may perform connection with the portable terminal device through various communication methods such as Miracast, Airplay, wireless DEX, a remote PC method, etc., and share contents or music provided at the portable terminal device.

Connection between the portable terminal device and the electronic apparatus 100 may be performed by various connection methods. As an example, the electronic apparatus 100 may be searched at the portable terminal device and wireless connection may be performed, or the portable terminal device may be searched at the electronic apparatus 100 and wireless connection may be performed. The electronic apparatus 100 may output contents provided at the portable terminal device.

As an example, in a state wherein a specific content or music is being output at the portable terminal device, if the portable terminal device is located around the electronic apparatus, and a predetermined gesture (e.g., a motion tap view) is detected through a display of the portable terminal device, the electronic apparatus 100 may output the content or music that is being output at the portable terminal device.

As an example, in a state wherein a specific content or music is being output at the portable terminal device, if the portable terminal device becomes close to the electronic apparatus 100 by equal to or less than a predetermined distance (e.g., a non-contact tap view), or the portable terminal device contacts the electronic apparatus 100 two times at a short interval (e.g., a contact tap view), the electronic apparatus 100 may output the content or music that is being output at the portable terminal device.

In the aforementioned example, it was described that the same screen as the screen that is being provided at the portable terminal device is provided at the electronic apparatus 100, but the disclosure is not limited thereto. That is, if connection between the portable terminal device and the electronic apparatus 100 is constructed, a first screen provided at the portable terminal device may be output at the portable terminal device, and a second screen provided at the portable terminal device that is different from the first screen may be output at the electronic apparatus 100. As an example, the first screen may be a screen provided by a first application installed on the portable terminal device, and the second screen may be a screen provided by a second application installed on the portable terminal device. As an example, the first screen and the second screen may be different screens from each other that are provided by one application installed on the portable terminal device. As an example, the first screen may be a screen including a UI in a remote control form for controlling the second screen.

The electronic apparatus 100 according to the disclosure may output a standby screen. As an example, in case connection between the electronic apparatus 100 and an external device was not performed or in case there is no input received from an external device during a predetermined time, the electronic apparatus 100 may output a standby screen. Conditions for the electronic apparatus 100 to output a standby screen are not limited to the aforementioned example, and a standby screen may be output by various conditions.

The electronic apparatus 100 may output a standby screen in the form of a blue screen, but the disclosure is not limited thereto. As an example, the electronic apparatus 100 may extract only a shape of a specific object from data received from an external device and acquire an atypical object, and output a standby screen including the acquired atypical object.

The shutter part 120 may include at least one of a shutter 121, a fixing member 122, a rail 123, a body 124, or a motor 125.

The shutter 121 may block light output from the projection part 111. The fixing member 122 may fix a position of the shutter 121. The rail 123 may provide a path for moving the shutter 121 and the fixing member 122. The body 124 may be configured to include the shutter 121 and the fixing member 122. The motor 125 may be a component generating driving power to move the shutter part 120 (e.g., movement of the body 124) or rotation of a component (e.g., rotation of the shutter 121).

Figure 3:
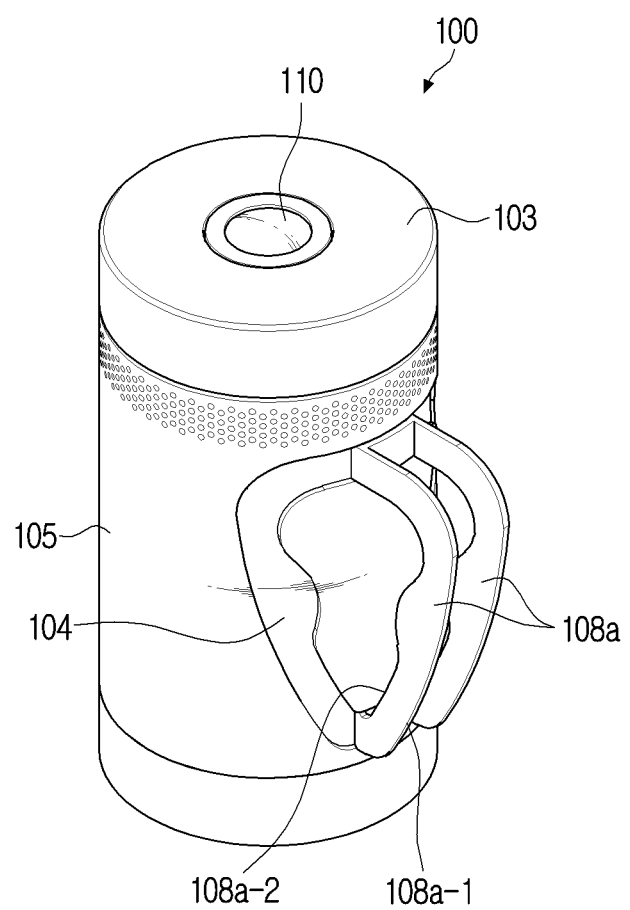
FIG. 3 is a perspective view illustrating an exterior of an electronic apparatus according to various embodiments.

FIG. 3 is a perspective view illustrating the exterior of the electronic apparatus 100 according to various embodiments.

Referring to FIG. 3, the electronic apparatus 100 may include a support (or, it may be referred to as "a handle") 108a.

The support 108a according to the various embodiments of the disclosure may be a handle or a ring that is provided for a user to grip or move the electronic apparatus 100. The support 108a may be a stand that supports the main body 105 while the main body 105 is laid down in the direction of the side surface.

The support 108a may be connected in a hinge structure such that it is coupled to or separated from the outer circumferential surface of the main body 105 as illustrated in FIG. 3, and it may be selectively separated from or fixed to the outer circumferential surface of the main body 105 according to a user's need. The number, shape, or arrangement structure of the support 108a may be implemented in various ways without restriction. Although not illustrated in the drawings, the support 108a may be housed inside the main body 105, and it may be taken out and used by a user depending on needs. The support 108a may be implemented as a separate accessory, and it may be attached to or detached from the electronic apparatus 100.

The support 108a may include a first support surface 108a-1 and a second support surface 108a-2. The first support surface 108a-1 may be a surface that faces the outer direction of the main body 105 while the support 108a is separated from the outer circumferential surface of the main body 105, and the second support surface 108a-2 may be a surface that faces the inner direction of the main body 105 while the support 108a is separated from the outer circumferential surface of the main body 105.

The first support surface 108a-1 may proceed toward the upper part of the main body 105 from the lower part of the main body 105 and get far from the main body 105, and the first support surface 108a-1 may have a shape that is flat or uniformly curved. In case the electronic apparatus 100 is held such that the outer side surface of the main body 105 contacts the bottom surface, e.g., in case the electronic apparatus 100 is arranged such that the projection lens 110 is toward the front surface direction, the first support surface 108a-1 may support the main body 105. In an embodiment including two or more supports 108a, the emission angle of the head 103 and the projection lens 110 may be adjusted by adjusting the interval or the hinge opening angle of the two supports 108a.

The second support surface 108a-2 is a surface that contacts a user or an external holding structure when the support 108a is supported by the user or the external holding structure, and it may have a shape corresponding to the gripping structure of the user's hand or the external holding structure such that the electronic apparatus 100 does not slip in case the electronic apparatus 100 is supported or moved. The user may make the projection lens 110 face toward the front surface direction, and fix the head 103 and hold the support 108a, and move the electronic apparatus 100, and use the electronic apparatus 100 like a flashlight.

The support groove 104 may include a groove structure that is provided on the main body 105 and wherein the support 108a may be accommodated when it is not used, and as illustrated in FIG. 3, the support groove 104 may be implemented as a groove structure corresponding to the shape of the support 108a on the outer circumferential surface of the main body 105. Through the support groove 104, the support 108a may be kept on the outer circumferential surface of the main body 105 when the support 108a is not used, and the outer circumferential surface of the main body 105 may be maintained to be slick.

In a situation wherein the support 108a is kept inside the main body 105 and the support 108a is needed, the electronic apparatus 100 may have a structure wherein the support 108a is taken out to the outside of the main body 105. In this case, the support groove 104 may be a structure that is led into the inside of the main body 105 so as to accommodate the support 108a, and the second support surface 108a-2 may include a door (not shown) that adheres to the outer circumferential surface of the main body 105 or opens or closes the separate support groove 104.

Although not illustrated in the drawings, the electronic apparatus 100 may include various kinds of accessories that are helpful in using or keeping the electronic apparatus 100. For example, the electronic apparatus 100 may include a protection case (not shown) such that the electronic apparatus 100 may be easily carried while being protected. The electronic apparatus 100 may include a tripod (not shown) that supports or fixes the main body 105, and a bracket (not shown) that may be coupled to an outer surface and fix the electronic apparatus 100.

Figure 4:
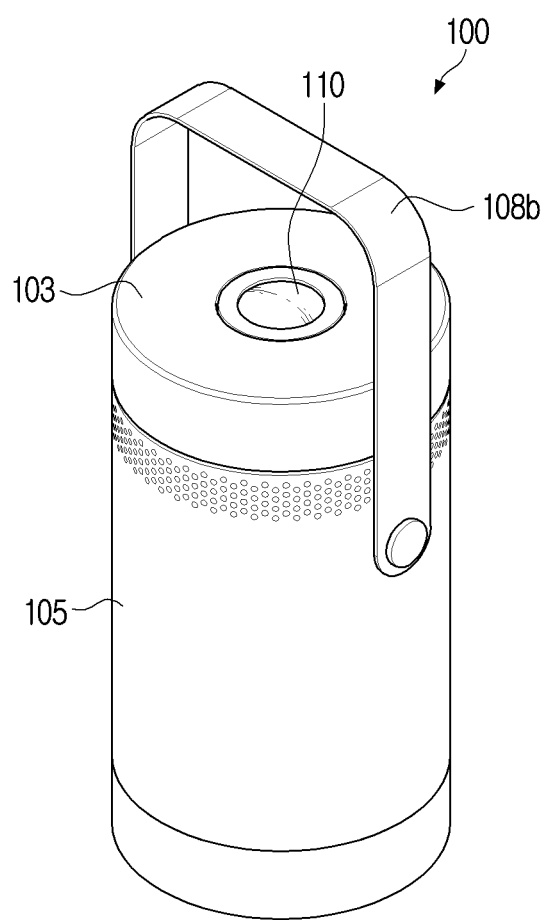
FIG. 4 is a perspective view illustrating an exterior of an electronic apparatus according to various embodiments.

FIG. 4 is a perspective view illustrating the exterior of the electronic apparatus 100 according to various embodiments.

Referring to FIG. 4, the electronic apparatus 100 may include a support (or, it may be referred to as "a handle") 108b.

The support 108b according to the various embodiments of the disclosure may be a handle or a ring that is provided for a user to grip or move the electronic apparatus 100. The support 108b may be a stand that supports the main body 105 so that the main body 105 may be toward a random angle while the main body 105 is laid down in the direction of the side surface.

For example, as illustrated in FIG. 4, the support 108b may be connected with the main body 105 at a predetermined point (e.g., a ⅔-¾ point of the height of the main body) of the main body 105. When the support 108b is rotated in the direction of the main body, the main body 105 may be supported such that the main body 105 may be toward a random angle while the main body 105 is laid down in the direction of the side surface.

Figure 5:
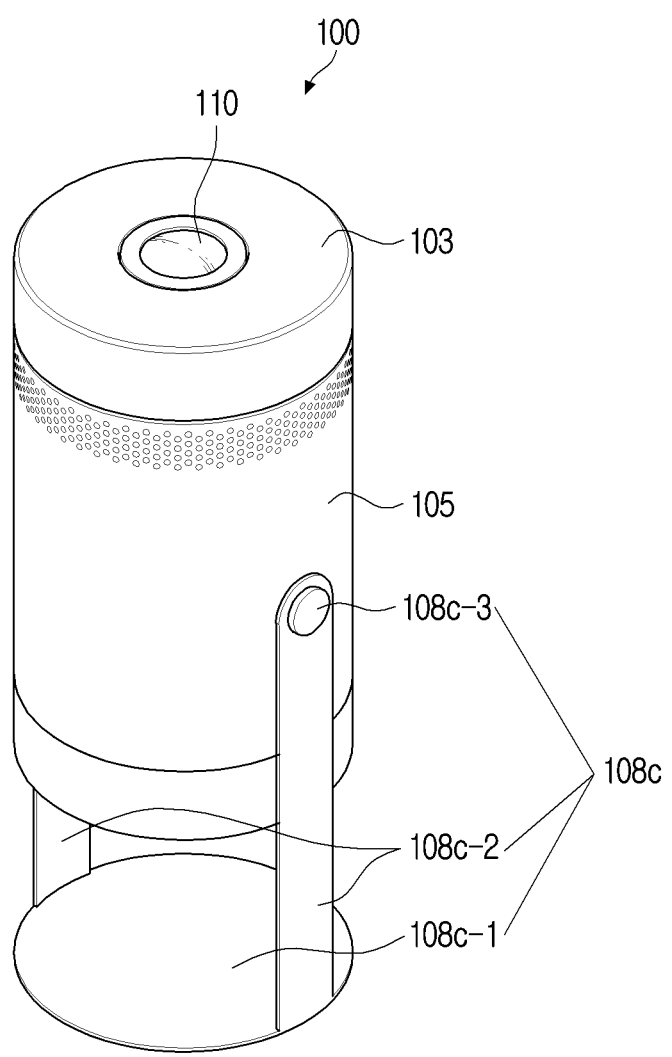
FIG. 5 is a perspective view illustrating an exterior of an electronic apparatus according to various embodiments.

FIG. 5 is a perspective view illustrating the exterior of the electronic apparatus 100 according to various embodiments.

Referring to FIG. 5, the electronic apparatus 100 may include a support (or, it may be referred to as "a prop") 108c. The support 108c according to the various embodiments of the disclosure may include a base plate 108c-1 that is provided to support the electronic apparatus 100 on the ground and two support members 108c-2 connecting the base plate 108c-1 and the main body 105.

According to an embodiment of the disclosure, the heights of the two support members 108c-2 are identical, and thus each one cross section of the two support members 108c-2 may be coupled or separated by a groove and a hinge member 108c-3 provided on one outer circumferential surface of the main body 105.

The two support members may be hinge-coupled to the main body 105 at a predetermined point (e.g., a ⅓-¾ point of the height of the main body) of the main body 105.

When the two support members and the main body are coupled by the hinge member 108c-3, the main body 105 is rotated based on a virtual horizontal axis formed by the two hinge members 108c-3, and accordingly, the emission angle of the projection lens 110 may be adjusted.

Figure 6A:
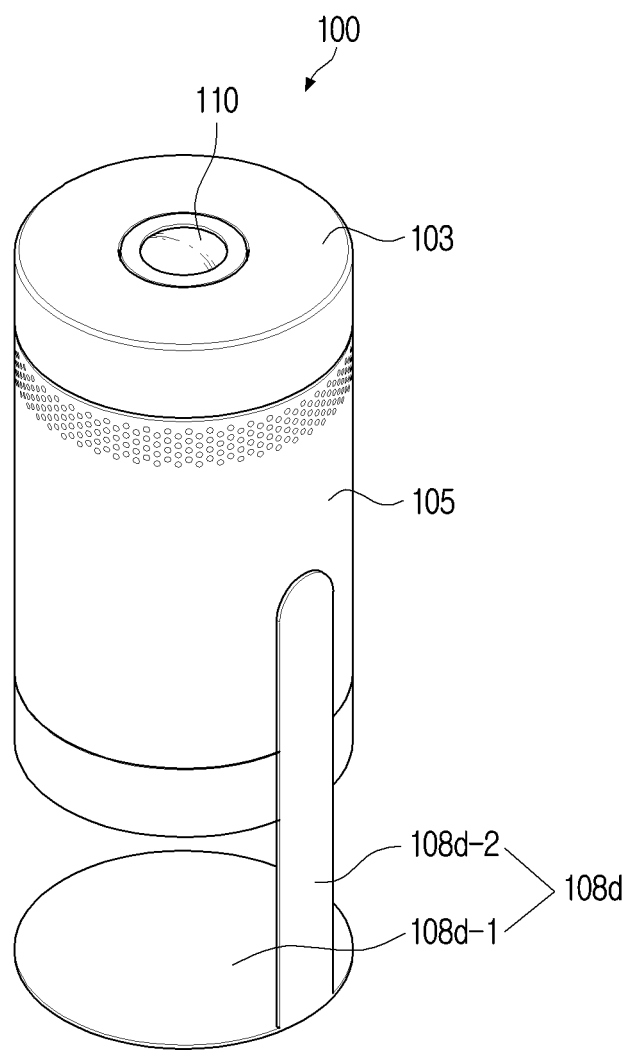
FIG. 6A is a perspective view illustrating an exterior of an electronic apparatus according to various embodiments.
Figure 6B:
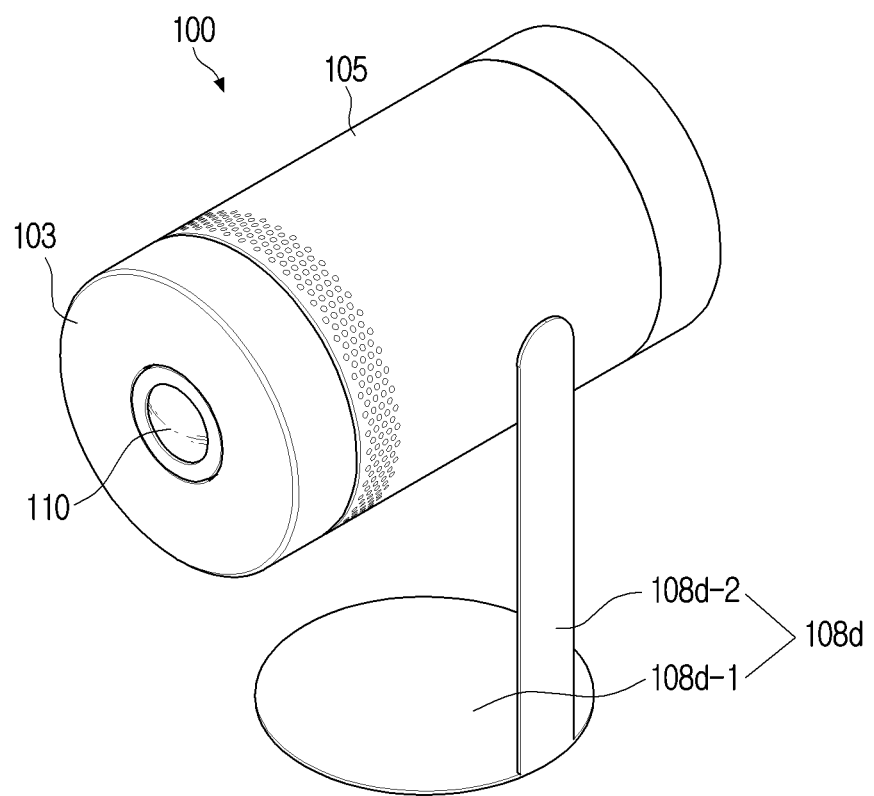
FIG. 6B is a perspective view illustrating a state in which the electronic apparatus of FIG. 6A is rotated according to various embodiments.

FIG. 5 illustrates an embodiment wherein the two support members 108c-2 are connected with the main body 105, but the disclosure is not limited thereto, and as illustrated, for example, in FIG. 6A and FIG. 6B, one support member and the main body 105 may be connected by one hinge member.

FIG. 6A is a perspective view illustrating the exterior of the electronic apparatus 100 according to various embodiments.

FIG. 6B is a perspective view illustrating a state wherein the electronic apparatus 100 in FIG. 6A is rotated according to various embodiments.

Referring to FIG. 6A and FIG. 6B, the support 108d according to the various embodiments of the disclosure may include a base plate 108d-1 that is provided to support the electronic apparatus 100 on the ground and one support member 108d-2 connecting the base plate 108d-1 and the main body 105.

The cross section of the one support member 108d-2 may be coupled or separated by a groove and a hinge member (not shown) provided on one outer circumferential surface of the main body 105.

When the one support member 108d-2 and the main body 105 are coupled by one hinge member (not shown), the main body 105 may be rotated based on a virtual horizontal axis formed by the one hinger member (not shown), as in FIG. 6B.

The supports illustrated in FIGS. 3, 4, 5, 6A, and 6B are merely examples, and the electronic apparatus 100 may include supports in various locations or forms.

Figure 7:
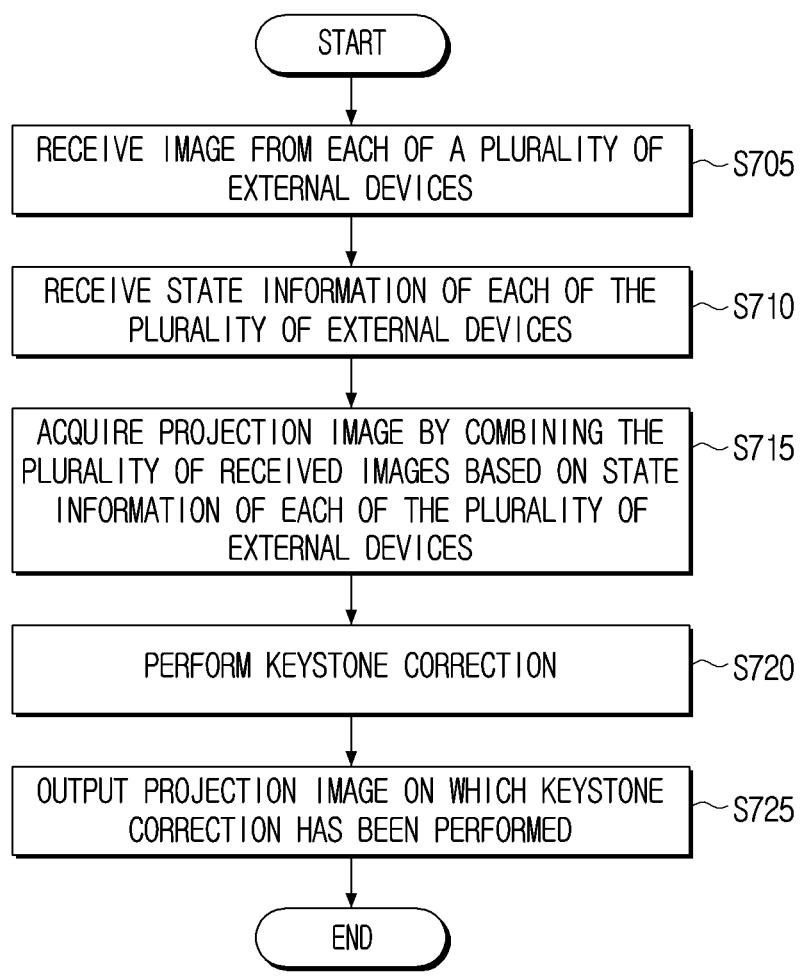
FIG. 7 is a flowchart illustrating an example operation of outputting a projection image according to various embodiments.

FIG. 7 is a flowchart illustrating an example operation of outputting a projection image according to various embodiments.

Referring to FIG. 7, the electronic apparatus 100 may receive an image from each of a plurality of external devices (S705). In addition, the electronic apparatus 100 may receive state information of each of the plurality of external devices (S710). The state information may include at least one of position information, rotation information, or communication connection strength information.

The electronic apparatus 100 may acquire a projection image by combining a plurality of received images based on the state information of each of the plurality of external devices (S715).

The electronic apparatus 100 may perform keystone correction on the acquired projection image (S720). The electronic apparatus 100 may output the projection image on which the keystone correction has been performed (S725).

In relation to position information, the electronic apparatus 100 may directly identify a position of an external device to acquire position information.

Figure 8:
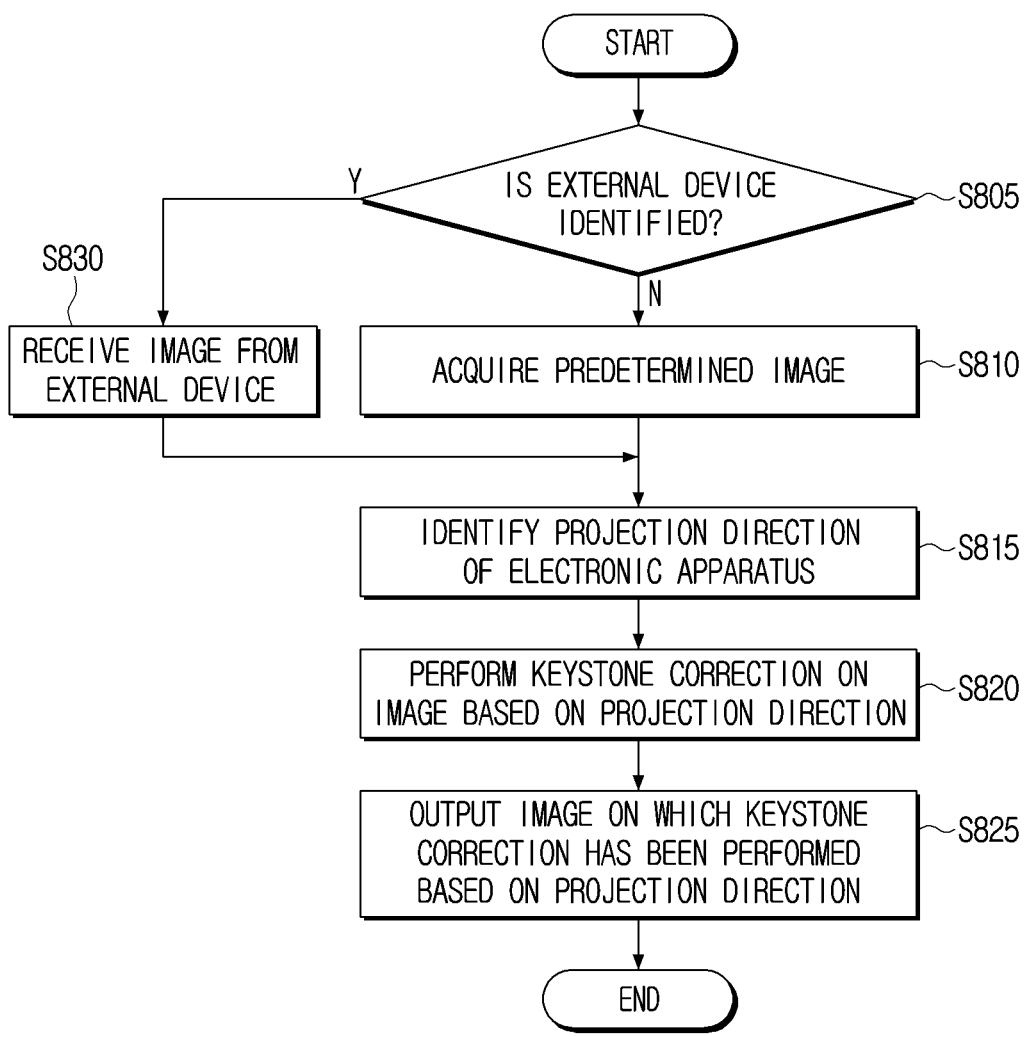
FIG. 8 is a flowchart illustrating an example operation according to whether an external device is identified according to various embodiments.

FIG. 8 is a flowchart illustrating an example operation based on whether the external devices 201 and 202 are identified according to various embodiments.

Referring to FIG. 8, the electronic apparatus 100 may determine whether an external device is identified (S805). For example, the electronic apparatus 100 may identify whether an external device is connected through the communication interface 119.

If the external device is not identified (S805—N), the electronic apparatus 100 may acquire a predetermined image (S810). The predetermined image may refer to an image related to content previously stored in the memory 112 of the electronic apparatus 100. The electronic apparatus 100 may identify a projection direction of the electronic apparatus 100 (S815). The electronic apparatus 100 may perform keystone correction on the image based on the projection direction (S820). The image may be the predetermined image obtained in operation S810. The electronic apparatus 100 may output a keystone-corrected image based on the projection direction (S825).

When an external device is identified (S805—Y), the electronic apparatus 100 may receive an image from the external device. The electronic apparatus 100 may perform operations S815, S820, and S825. In operation S820, the electronic apparatus 100 may keystone-correct the image received from the external device.

Figure 9:
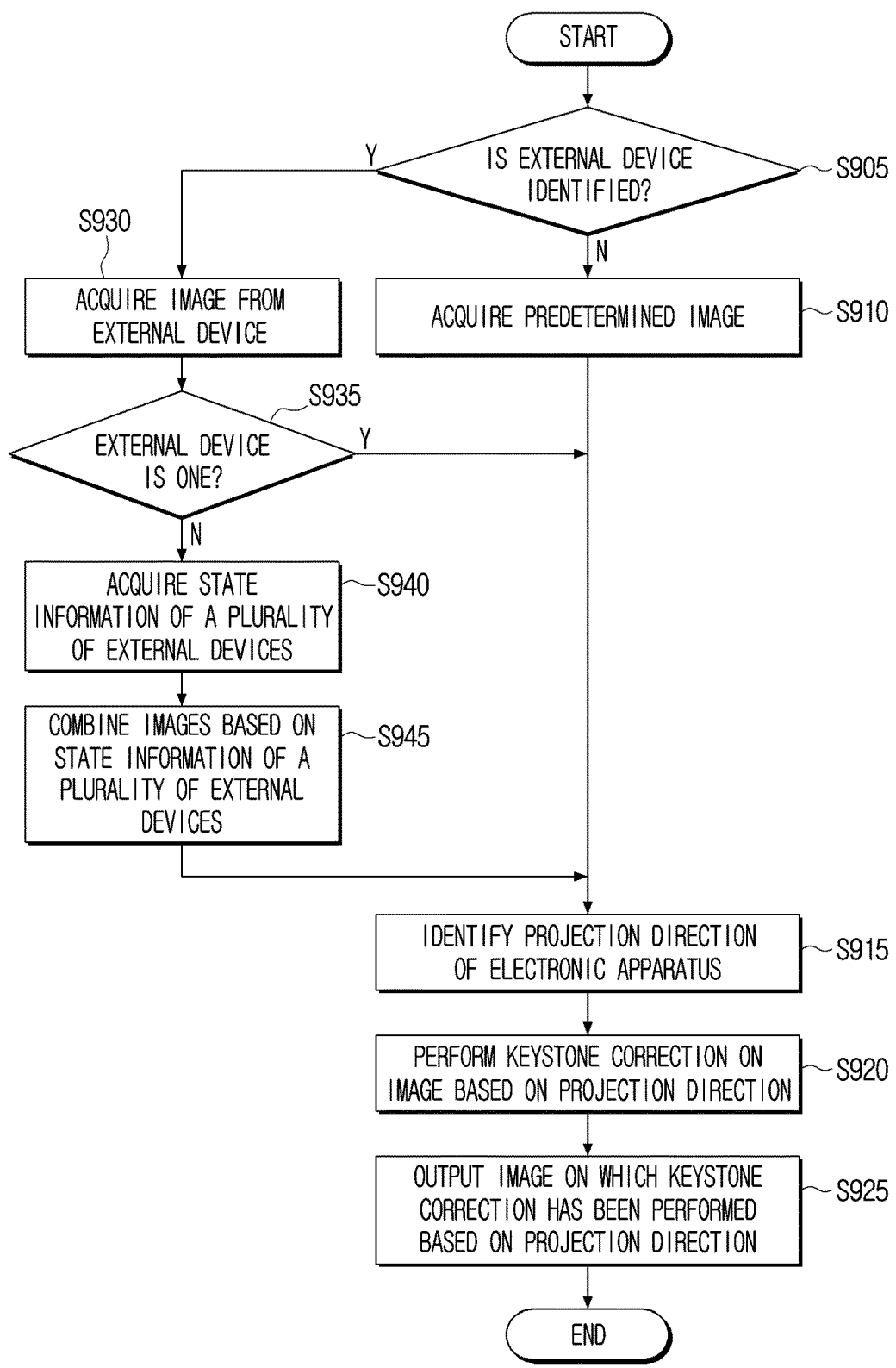
FIG. 9 is a flowchart illustrating an example operation in which a plurality of external devices are identified according to various embodiments.

FIG. 9 is a flowchart illustrating an example operation in which a plurality of external devices 201 and 202 are identified according to various embodiments.

Referring to FIG. 9, operations S905, S910, S915, S920, S925, and S930 may correspond to operations S805, S810, S815, S820, S825, and S830 of FIG. 8. Therefore, redundant description may not be repeated here.

After performing operation S930, the electronic apparatus 100 may identify whether there is one connected external device (S935). If there is one external device connected to the electronic apparatus 100 (S935-Y), the electronic apparatus 100 may identify a projection direction of the electronic apparatus 100 (S915), perform keystone correction based on the projection direction operation (S920), and output an image on which keystone correction has been performed (S925).

If the connected external device is not one device (S935—N), the electronic apparatus 100 may acquire state information of a plurality of external devices (S940). The electronic apparatus 100 may combine the images based on the state information of the external device (S945). The combined image may refer to a projection image. Also, the electronic apparatus 100 may perform an operation of identifying a projection direction of the electronic apparatus 100 (S915), an operation of performing keystone correction based on the projection direction (S920), and an operation of outputting an image on which the keystone correction has been performed (S925).

In relation to position information, the electronic apparatus 100 may directly identify a position of an external device to obtain position information.

Figure 10:
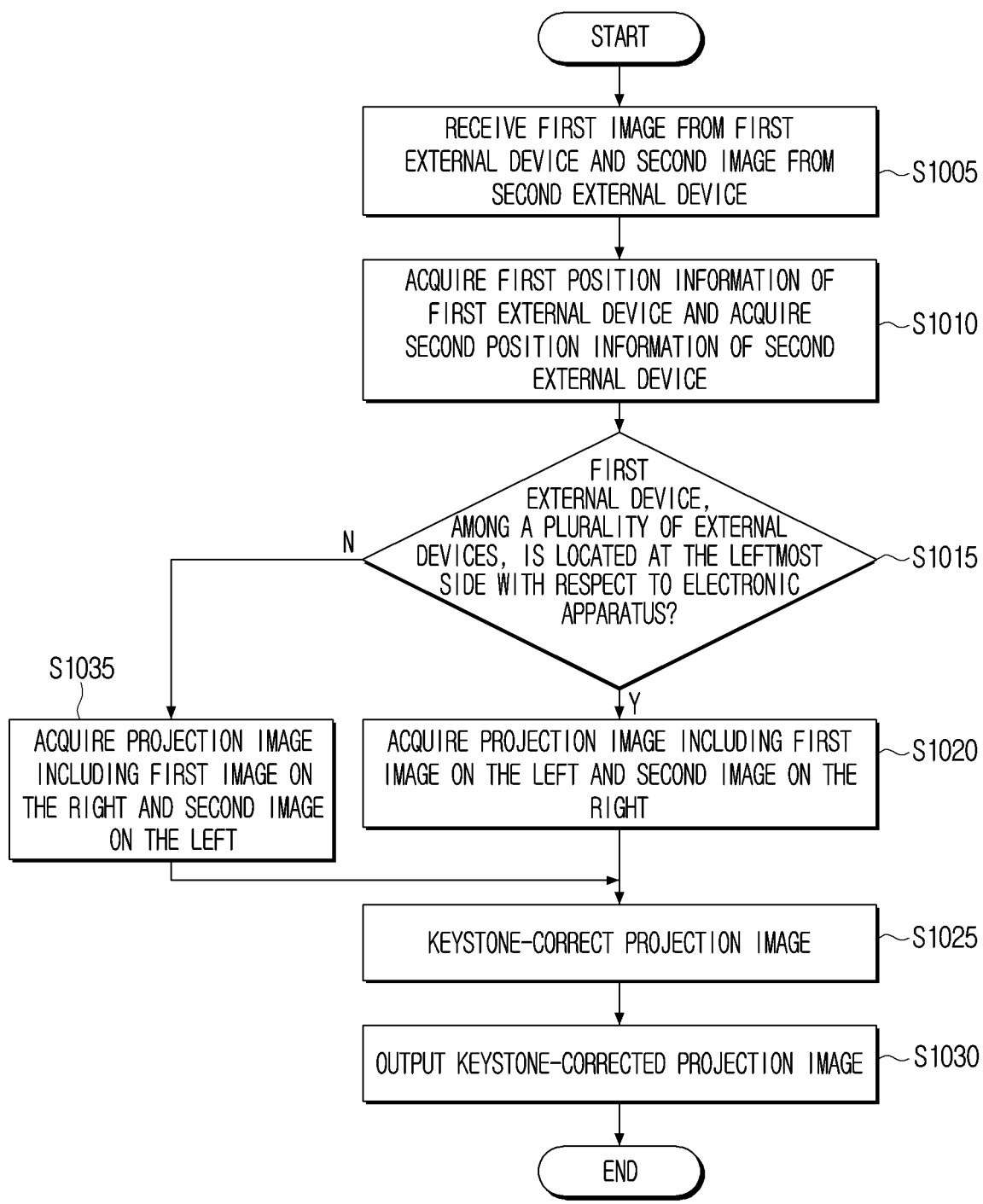
FIG. 10 is a flowchart illustrating an example operation of outputting a projection image according to a position of an external device according to various embodiments.

FIG. 10 is a flowchart illustrating an example operation of outputting a projection image according to the positions of the external devices 201 and 202 according to various embodiments.

Referring to FIG. 10, the electronic apparatus 100 may receive first data including a first image from the first external device 201 and receive second data including a second image from the second external device 202 (S1005). The electronic apparatus 100 may acquire first position information from the first external device 201 and second position information from the second external device 202 (S1010).

The electronic apparatus 100 may identify whether the first external device 201 among the plurality of external devices is located at the leftmost side with respect to the electronic apparatus 100 (S1015).

If the first external device 201 among the plurality of external devices is located on the leftmost side with respect to the electronic apparatus 100 (S1015—Y), the electronic apparatus 100 may acquire (or generate) a projection image including the first image on the left and the second image on the right (S1020).

The electronic apparatus 100 may keystone-correct the projection image (S1025). The electronic apparatus 100 may output an image on which keystone correction has been performed (S1030).

If the first external device 201 among the plurality of external devices is not located on the leftmost side with respect to the electronic apparatus 100 (S1015—N), the electronic apparatus 100 may acquire a projection image including the first image on the right and the second image on the left.

The electronic apparatus 100 may perform an operation of keystone-correcting the projection image (S1025) and an operation of outputting the projection image on which the keystone correction has been performed (S1030).

Figure 11:
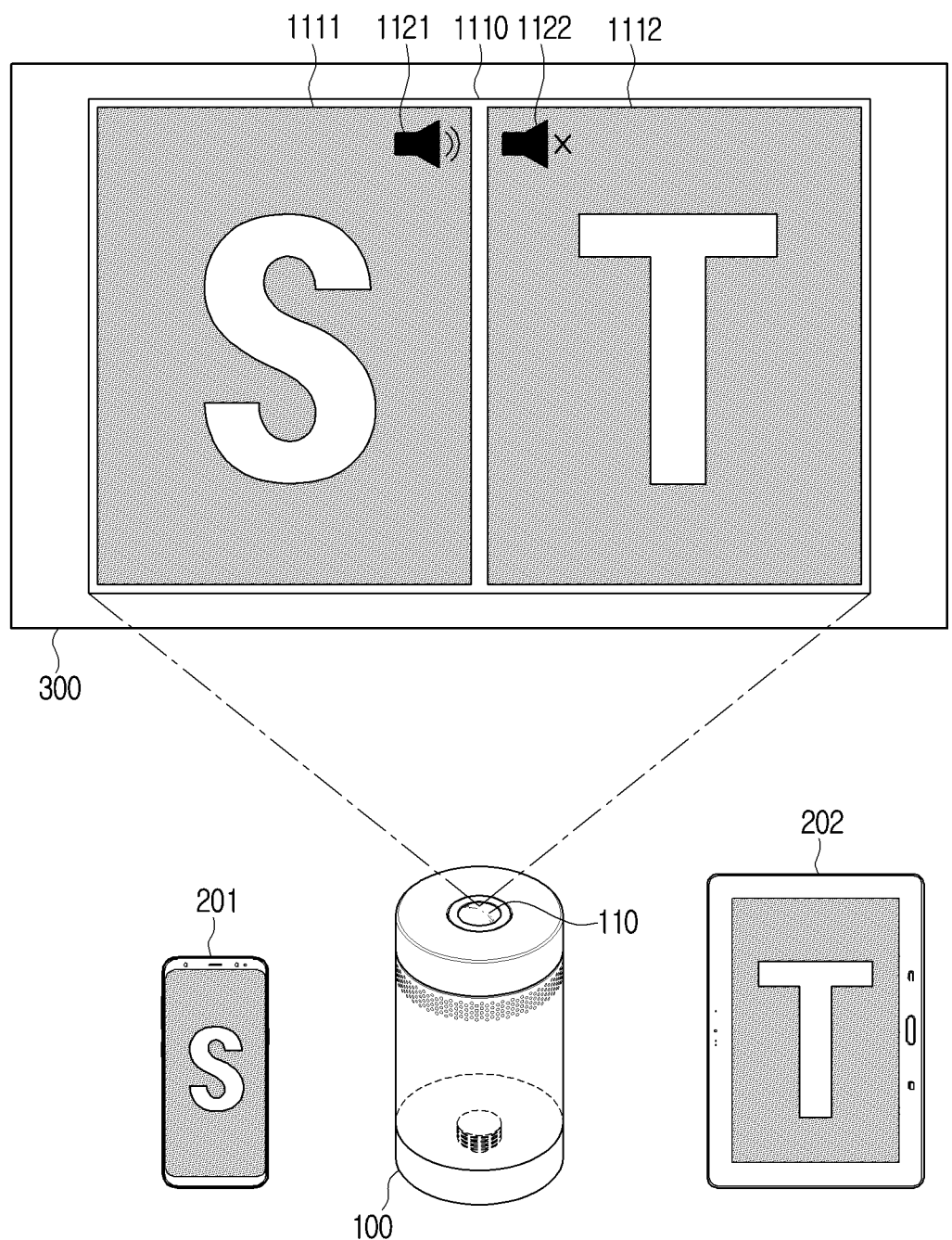
FIG. 11 is a diagram illustrating an example operation of outputting a projection image corresponding to a position of an external device according to various embodiments.

FIG. 11 is a diagram illustrating an example operation of outputting a projection image corresponding to positions of the external devices 201 and 202, according to various embodiments.

Referring to FIG. 11, an embodiment in which the first external device 201 is positioned on the left of the electronic apparatus 100 and the second external device 202 is positioned on the right of the electronic apparatus 100 will be described.

The electronic apparatus 100 may acquire a projection image 1110 based on the first position information of the first external device 201 and the second position information of the second external device 202. Here, the first position information may be information indicating that the first external device 201 is located on the left of the electronic apparatus 100. The second position information may be information indicating that the second external device 202 is located on the right of the electronic apparatus 100.

The electronic apparatus 100 may acquire the projection image 1110 in which a first image 1111 is included at the left portion of the projection image 1110 and a second image 1112 is included at the right portion of the projection image 1110. In addition, the electronic apparatus 100 may output the projection image 1110 on the projection surface 300.

The electronic apparatus 100 may output a UI 1121 indicating whether to output first audio received from the first external device 201 through the speaker and a UI 1122 indicating whether to output second audio received from the second external device 202 through the speaker on the projection surface. The UI 1121 may be an icon indicating that audio is being output, and the UI 1122 may be an icon indicating that audio is not being output.

According to an embodiment, the electronic apparatus 100 may output only one of the first audio and the second audio. When a user input for selecting the UI 1121 is received, the electronic apparatus 100 may not output the first audio received from the first external device 201 any longer and output the second audio received from the second external device 202. In addition, when a user input for selecting the UI 1122 is received, the electronic apparatus 100 may output the second audio received from the second external device 202 and may not output the first audio received from the first external device 201 any longer.

According to an embodiment, the electronic apparatus 100 may output both the first audio and the second audio. Here, the electronic apparatus 100 may include a plurality of speakers (a first speaker and a second speaker) and may output the first audio to the first speaker and output the second audio to the second speaker.

Figure 12:
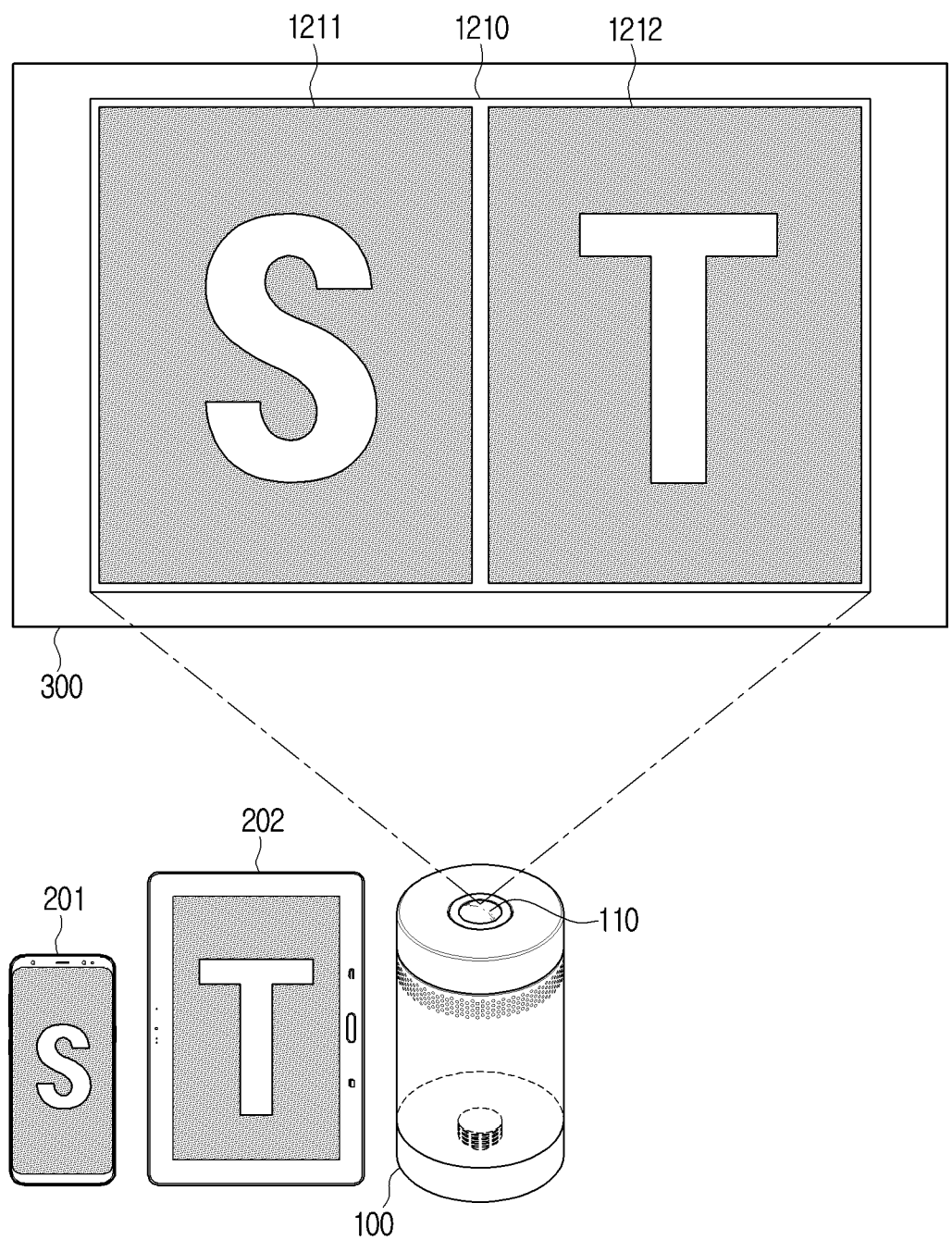
FIG. 12 is a diagram illustrating an example operation of outputting a projection image corresponding to a position of an external device according to various embodiments.

FIG. 12 is a diagram illustrating an example operation of outputting a projection image corresponding to positions of the external devices 201 and 202 according to various embodiments.

Referring to FIG. 12, an embodiment in which the first external device 201 is located on the left of the electronic apparatus 100 and the second external device 202 is also located on the left of the electronic apparatus 100 will be described.

The electronic apparatus 100 may acquire a projection image 1210 based on the first position information of the first external device 201 and the second position information of the second external device 202. The first position information may be information indicating that the first external device 201 is located on the left of the electronic apparatus 100 by a first distance (e.g., 100 cm). The second position information may be information indicating that the second external device 202 is located on the left of the electronic apparatus 100 by a second distance (e.g., 50 cm).

The electronic apparatus 100 may acquire the projection image 1210 including the first image 1211 on a left portion and the second image 1212 at a right portion. In addition, the electronic apparatus 100 may output the projection image 1210 on the projection surface 300.

Figure 13:
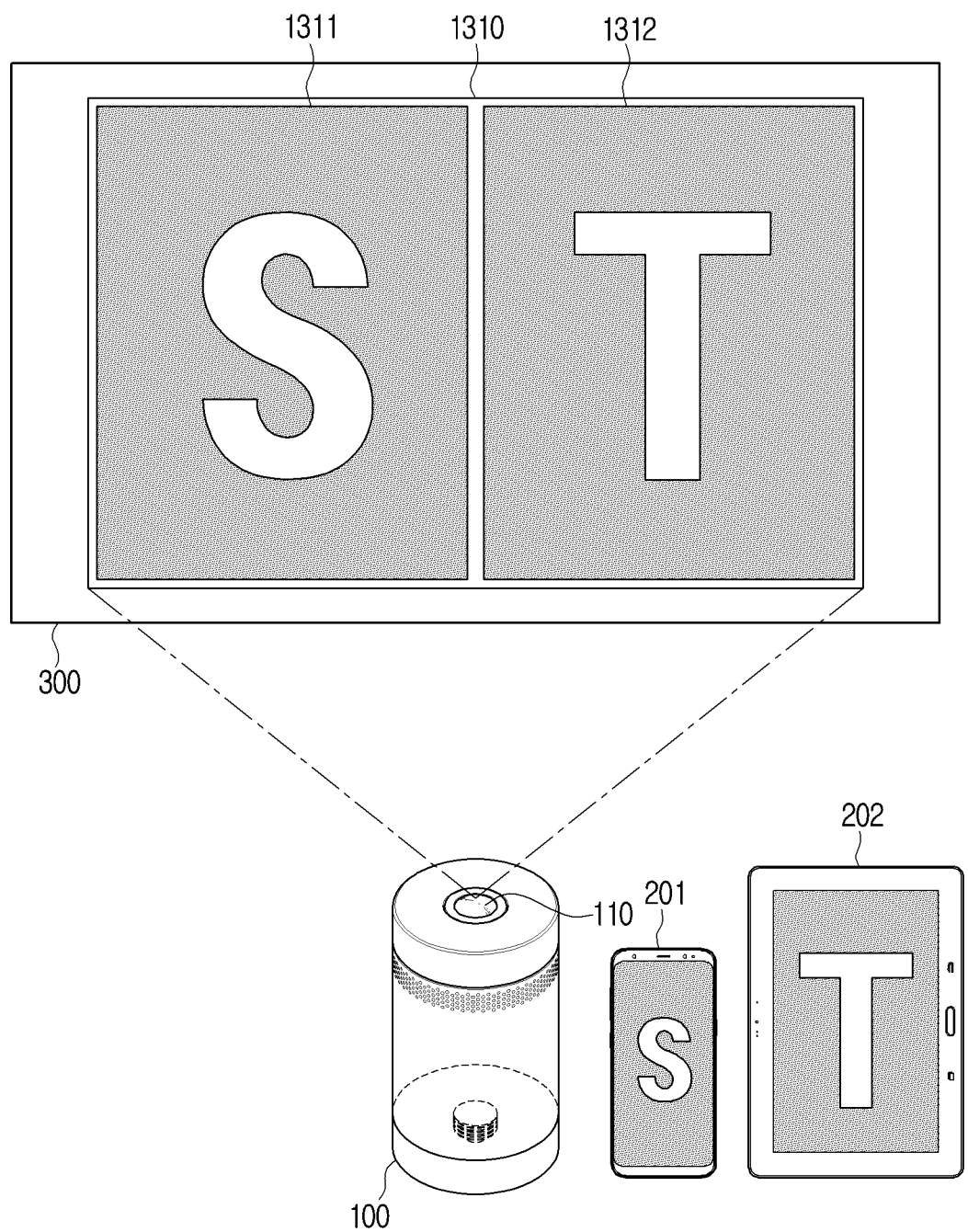
FIG. 13 is a diagram illustrating an example operation of outputting a projection image corresponding to a position of an external device according to various embodiments.

FIG. 13 is a diagram illustrating an operation of outputting a projection image corresponding to positions of the external devices 201 and 202 according to various embodiments.

Referring to FIG. 13, an embodiment in which the first external device 201 is located on the right of the electronic apparatus 100 and the second external device 202 is also located on the right of the electronic apparatus 100 will be described.

The electronic apparatus 100 may acquire a projection image 1310 based on the first position information of the first external device 201 and the second position information of the second external device 202. The first position information may be information indicating that the first external device 201 is located on the right of the electronic apparatus 100 by a first distance (e.g., 50 cm). The second position information may be information indicating that the second external device 202 is located on the right of the electronic apparatus 100 by a second distance (e.g., 100 cm).

The electronic apparatus 100 may acquire the projection image 1310 including a first image 1311 included at a left portion and a second image 1312 included at a right portion of the projection image 1310. In addition, the electronic apparatus 100 may output the projection image 1310 on a projection surface 300.

Figure 14:
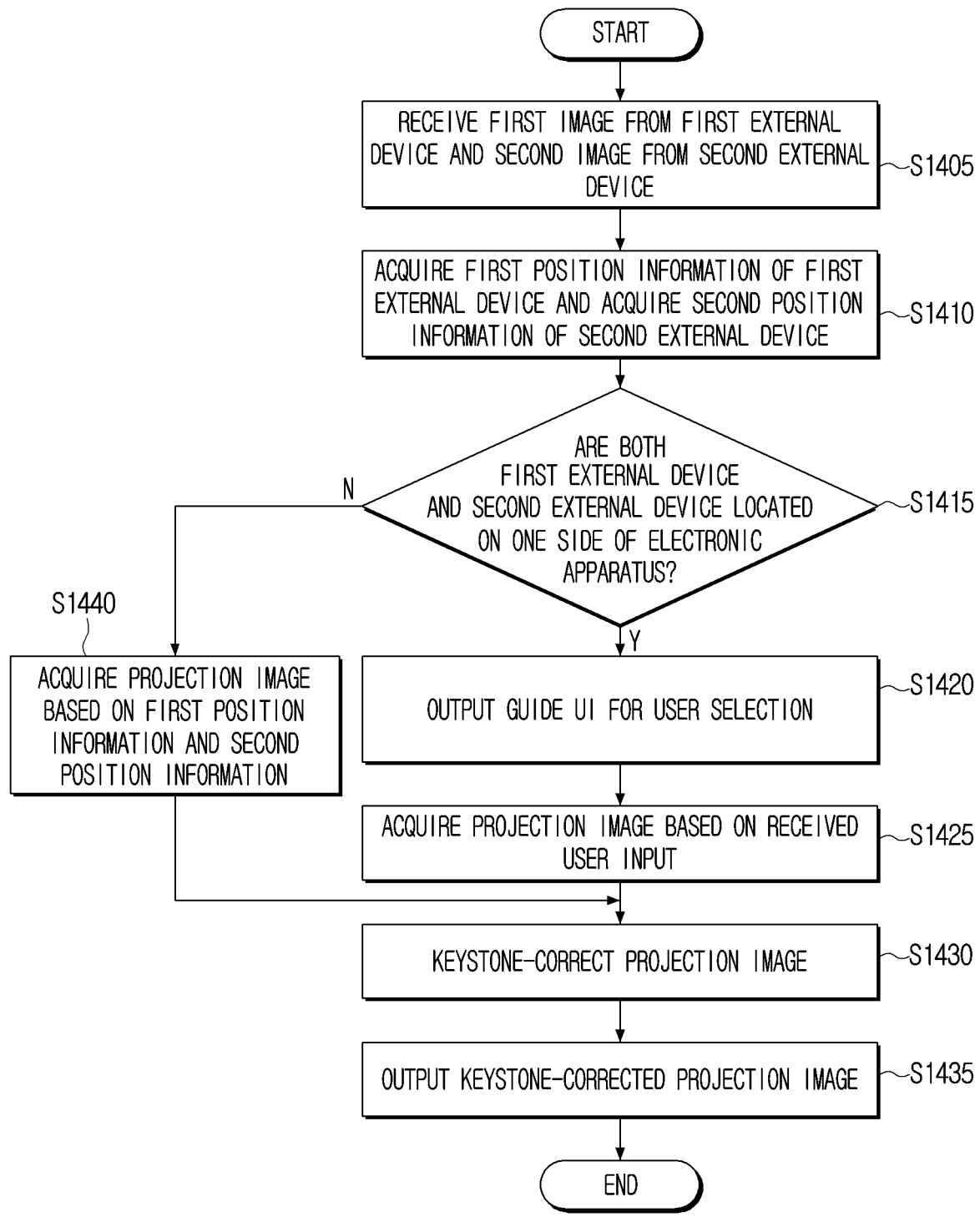
FIG. 14 is a flowchart illustrating an example operation of outputting a guide UI according to a position of an external device according to various embodiments.

FIG. 14 is a flowchart illustrating an example operation of outputting a guide UI based on the positions of the external devices 201 and 202 according to various embodiments.

Referring to FIG. 14, the electronic apparatus 100 may receive first data including a first image from the first external device 201 and second data including a second image from the second external device 202 (S1405). The electronic apparatus 100 may acquire first position information from the first external device 201 and second position information from the second external device 202 (S1410).

The electronic apparatus 100 may identify whether both the first external device 201 and the second external device 202 are located on one side of the electronic apparatus 100 (S1415). An example in which the first external device 201 and the second external device 202 are located on one side may be the embodiment illustrated in FIGS. 12 and 13.

When both the first external device 201 and the second external device 202 are located on one side of the electronic apparatus 100 (S1415-Y), the electronic apparatus 100 may output a guide UI for user selection (S1420). In addition, the electronic apparatus 100 may receive a user input after the guide UI is output. The electronic apparatus 100 may acquire a projection image based on the received user input (S1425). Details of the guide UI will be described in greater detail below with reference to FIG. 15.

The electronic apparatus 100 may keystone-correct the projection image (S1430). Then, the electronic apparatus 100 may output a projection image on which the keystone correction has been performed (S1435).

If neither the first external device 201 nor the second external device 202 is located on one side of the electronic apparatus 100 (S1415-N), the electronic apparatus 100 may acquire a projection image based on the first position information of the first external device 201 and the second position information of the second external device 202 (S1440). Then, the electronic apparatus 100 may perform a keystone correction operation (S1430) and an operation of outputting a projection image on which the keystone correction has been performed (S1435).

Figure 15:
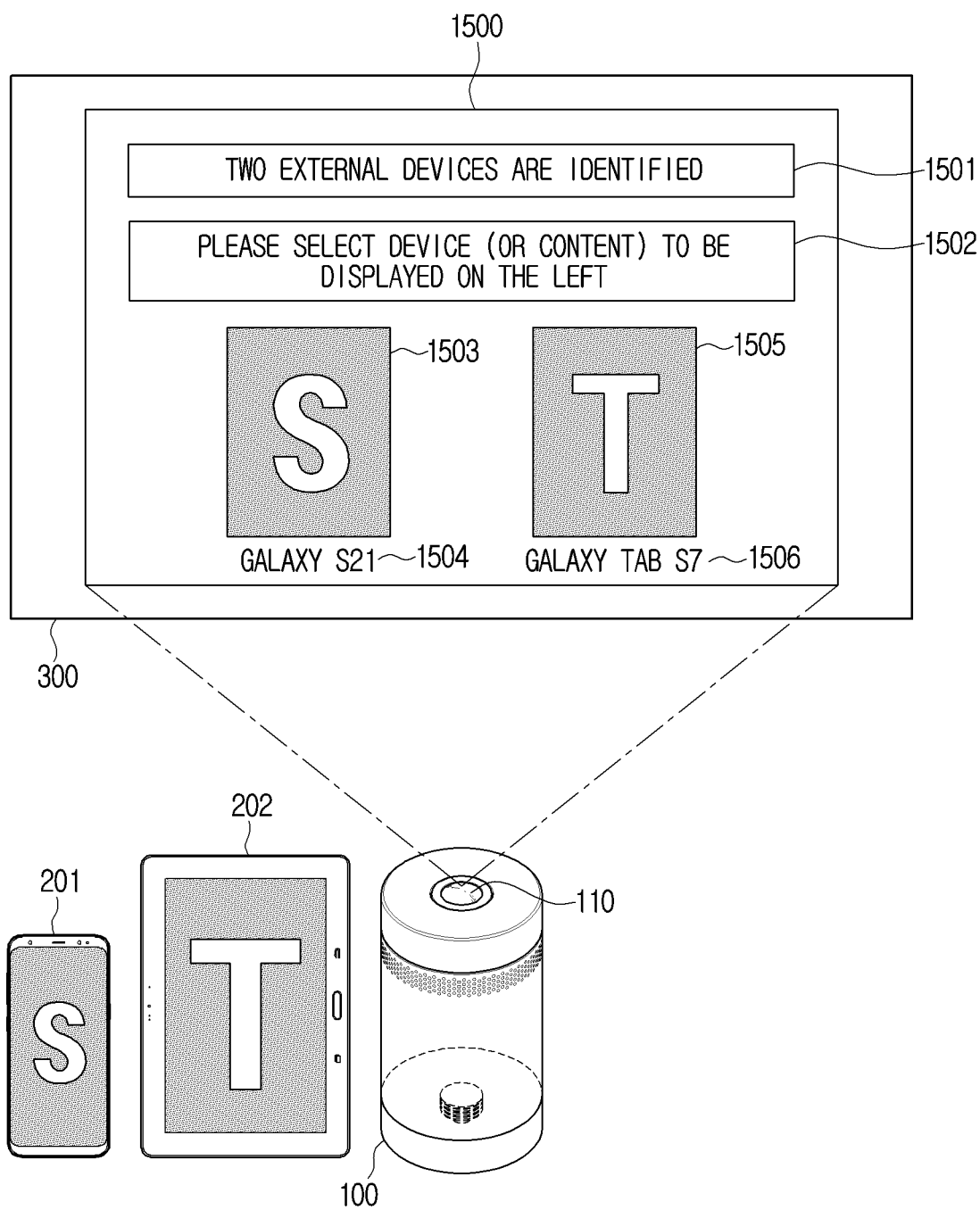
FIG. 15 is a diagram illustrating a guide UI output according to a position of an external device according to various embodiments.

FIG. 15 is a diagram illustrating an example guide UI output based on positions of the external devices 201 and 202 according to various embodiments.

Referring to FIG. 15, both the first external device 201 and the second external device 202 are located on the left of the electronic apparatus 100. Since both external devices are located on the left of the electronic apparatus 100, the electronic apparatus 100 may determine that the position of the first external device 201 and the position of the second external device 202 are not clearly distinguished from each other. Accordingly, the electronic apparatus 100 may output a guide UI 1501 to the projection surface 300 to receive a user input.

The guide UI 1500 may include at least one of a UI 1501 including information indicating that a plurality of external devices have been identified, a UI 1502 including information for guiding a user selection, a thumbnail image 1503 of a first image corresponding to the first external device 201, a UI 1504 including model name information of the first external device 201, a thumbnail image 1505 of a second image corresponding to the second external device 202, or a UI 1506 including model name information of the second external device 202.

Figure 16:
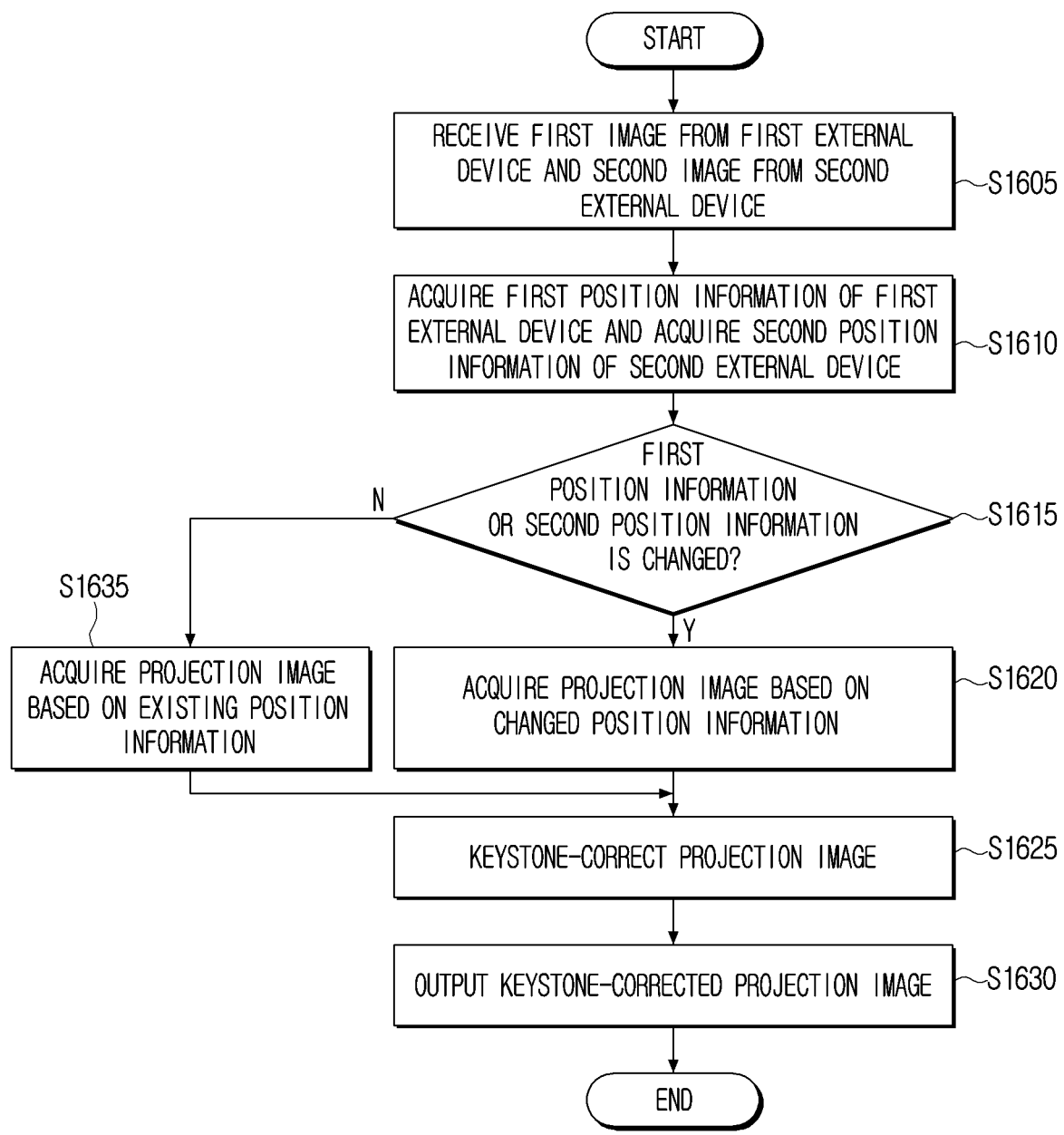
FIG. 16 is a flowchart illustrating an example operation in which a position of an external device is changed according to various embodiments.

FIG. 16 is a flowchart illustrating an example operation in which the positions of the external devices 201 and 202 are changed according to various embodiments.

Referring to FIG. 16, the electronic apparatus 100 may receive first data including the first image from the first external device 201 and receive second data including the second image from the second external device 202 (S1605). The electronic apparatus 100 may acquire first position information of the first external device 201 and second position information from the second external device 202 (S1610).

The electronic apparatus 100 may identify whether the first position information of the first external device 201 or the second position information of the second external device 202 is changed (S1615).

If at least one of the first position information and the second position information is changed (S1615-Y), the electronic apparatus 100 may acquire a projection image based on the changed position information (S1620). The electronic apparatus 100 may perform keystone correction on the projection image (S1625). The electronic apparatus 100 may output a projection image on which keystone correction has been performed (S1630).

If at least one of the first position information and the second position information is not changed (S1615-N), the electronic apparatus 100 may acquire a projection image based on the existing position information (S1635). The electronic apparatus 100 may perform keystone correction on the projection image (S1625). The electronic apparatus 100 may output a projection image on which keystone correction has been performed (S1630).

Figure 17:
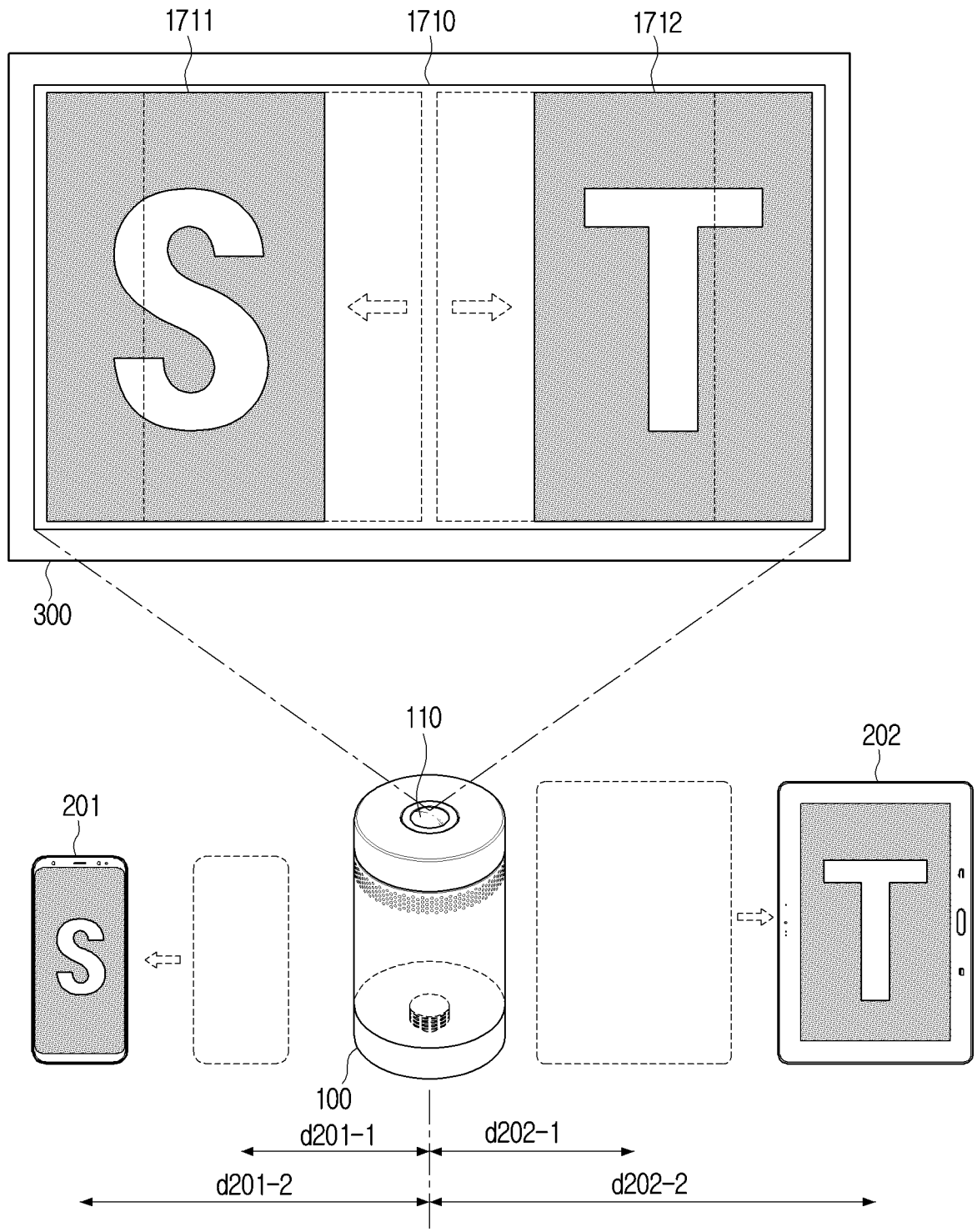
FIG. 17 is a diagram illustrating an example operation in which a position of an external device is changed according to various embodiments.

FIG. 17 is a diagram illustrating an example in which the positions of the external devices 201 and 202 are changed.

Referring to FIG. 17, the positions of the first external device 201 and the second external device 202 may be changed. For example, the first external device 201, which is currently away from the electronic apparatus 100 by a distance d201-1, may be moved to a position away from the electronic apparatus 100 by a distance d201-2. In addition, the second external device 202, which is currently away from the electronic apparatus 100 by a distance d202-1, may be moved to a position away from the electronic apparatus 100 by a distance d202-2.

The electronic apparatus 100 may output a projection image based on the movement of the first external device 201 or the movement of the second external device 202. For example, the electronic apparatus 100 may generate a projection image 1710 by changing the position of the first image 1711 or the second image 1712 based on the position movement.

According to the position movement of the first external device 201 or the second external device 202, a distance between the first image 1711 and the second image 1712 may be longer than that of the projection image 1110 of FIG. 11.

Figure 18:
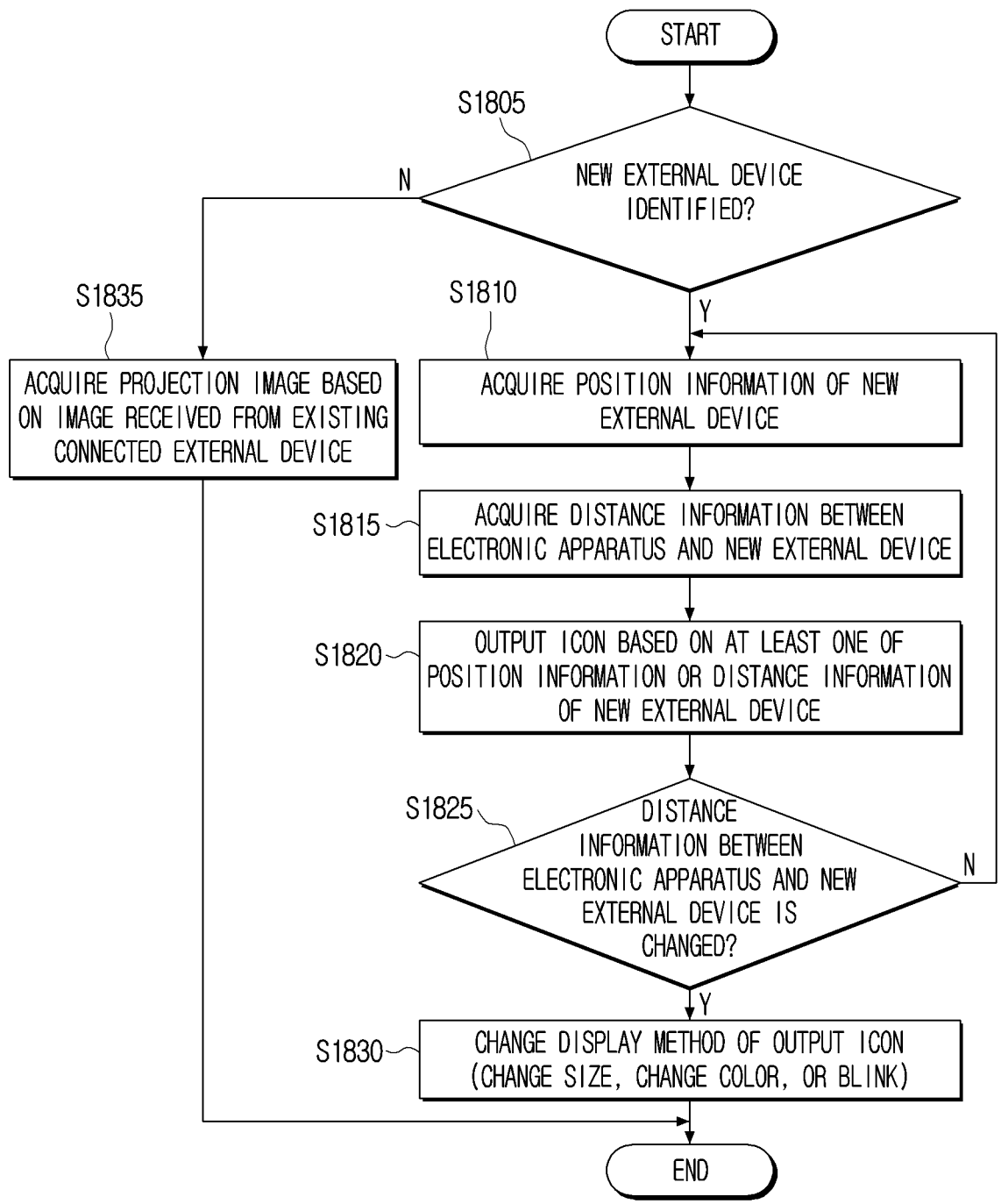
FIG. 18 is a flowchart illustrating an example operation of outputting an icon based on a position of an external device according to various embodiments.

FIG. 18 is a flowchart illustrating an example operation of outputting an icon based on the positions of the external devices 201 and 202 according to various embodiments.

Referring to FIG. 18, the electronic apparatus 100 may identify whether a new external device is connected (S1805). When it is identified that a new external device (e.g., a third external device) is connected (S1805-Y), the electronic apparatus 100 may acquire position information from the new external device (S1810). If a new external device is not identified (S1805-N), the electronic apparatus 100 may acquire a projection image based on an image received from the existing connected external device(s) (S1835).

The electronic apparatus 100 may acquire distance information between the electronic apparatus 100 and the new external device based on the position information of the new external device (S1815).

The electronic apparatus 100 may output an icon based on at least one of position information of the new external device or distance information (distance information between the electronic apparatus 100 and the new external device) (S1820).

The electronic apparatus 100 may identify whether the distance between the electronic apparatus 100 and the new external device is changed (S1825). If the distance information is not changed (S1825-N), the electronic apparatus 100 may repeatedly perform steps S1810, S1815, S1820, and S1825.

When the distance information is changed (S1825-Y), a display method of the output icon may be changed (S1830). Specifically, when the distance information is changed, the electronic apparatus 100 may perform at least one of an operation of changing a size of an icon, an operation of changing a color, an operation of changing brightness, or a blinking operation.

For example, when the distance between the electronic apparatus 100 and the new external device increases, the electronic apparatus 100 may change the size of the icon to be smaller or change the color of the icon to be blurred.

As another example, when the distance between the first external device 201 and the new external device decreases, the electronic apparatus 100 may change the size of the icon to be larger, change the color of the icon to be sharp, or make the icon blink.

Figure 19:
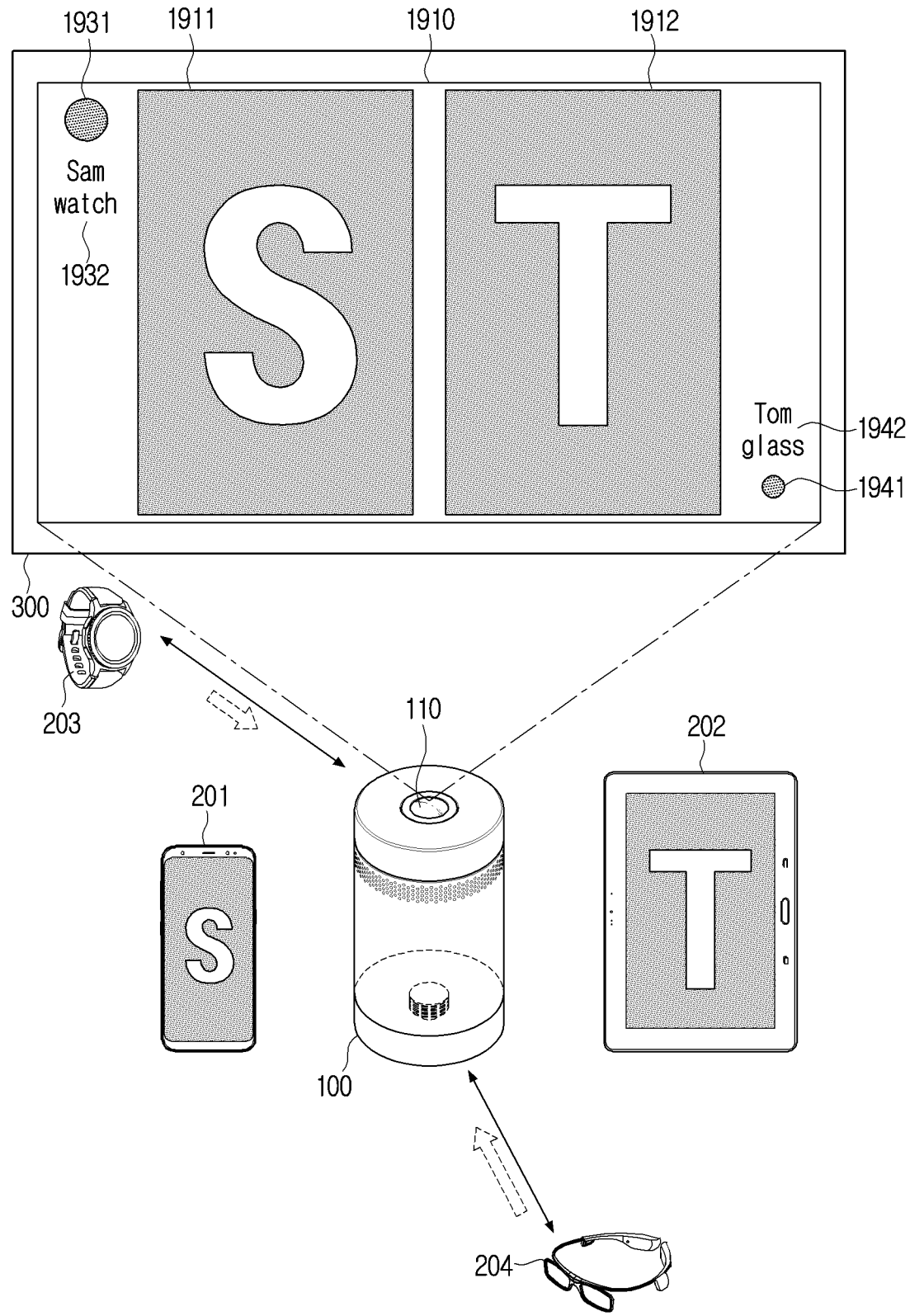
FIG. 19 is a diagram illustrating an icon output based on a position of an external device according to various embodiments.

FIG. 19 is a diagram illustrating an example operation of outputting an icon based on the positions of the external devices 201 and 202 according to various embodiments.

Referring to FIG. 19, the electronic apparatus 100 may identify that new external devices 203 and 204 other than the first external device 201 and the second external device 202 are connected. The new external devices may be a third external device 203 and a fourth external device 204.

The electronic apparatus 100 may output a projection image 1910 including a first image 1911 received from the first external device 201 and a second image 1912 received from the second external device 202.

When it is identified that the third external device 203 is newly connected, the electronic apparatus 100 may acquire and output an icon 1931 corresponding to the third external device 203 or a UI 1932 including text corresponding to the third external device 203.

When it is identified that the fourth external device 204 is newly connected, the electronic apparatus 100 may acquire and output an icon 1941 corresponding to the fourth external device 204 or a UI 1942 including text corresponding to the fourth external device 204.

The text may refer to a model name, a pre-stored name, or the like of an external device.

Figure 20:
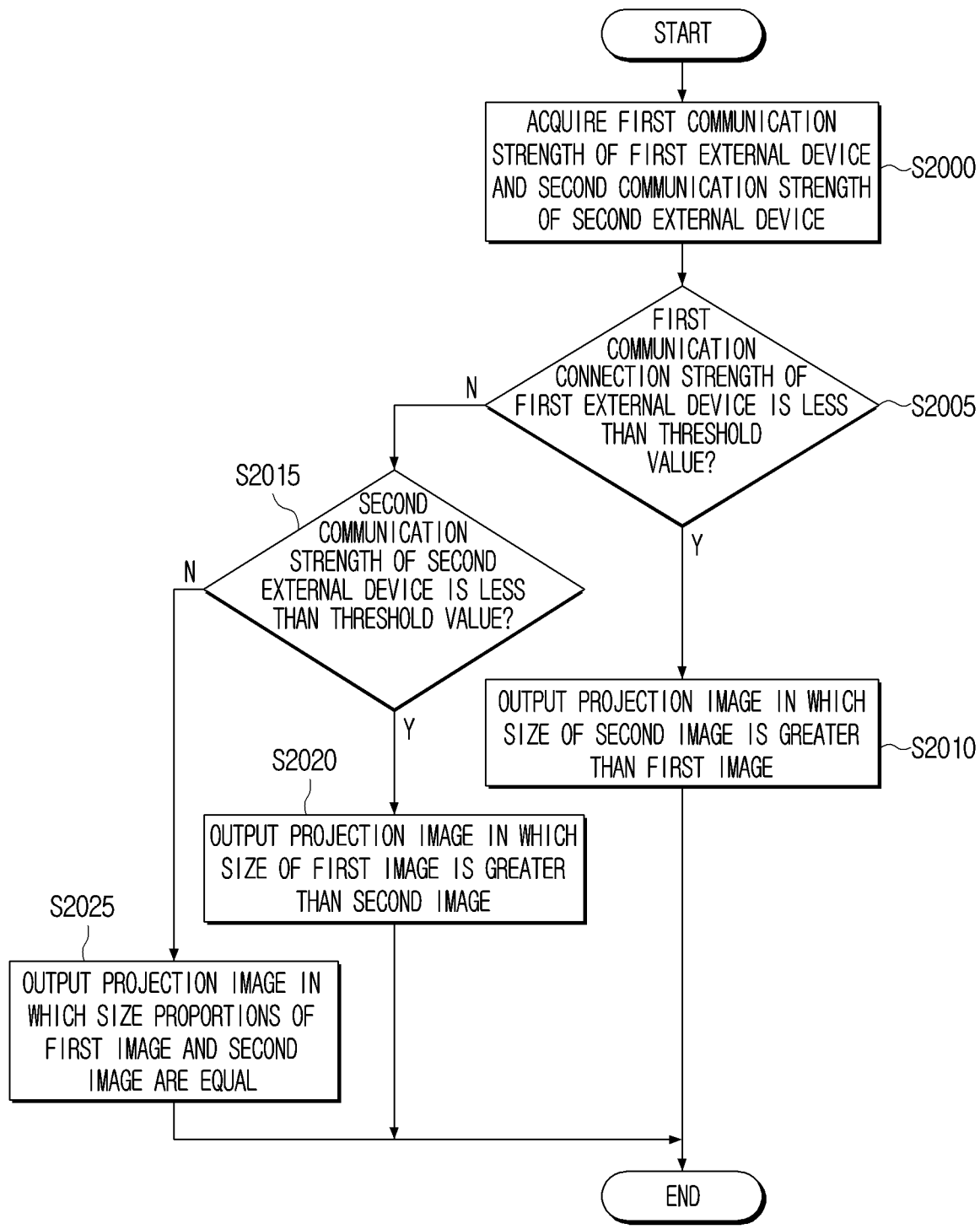
FIG. 20 is a flowchart illustrating an example operation of outputting a projection image corresponding to communication connection strength according to various embodiments.

FIG. 20 is a flowchart illustrating an example operation of outputting a projection image corresponding to communication connection strength according to various embodiments.

Referring to FIG. 20, the electronic apparatus 100 may acquire a first communication connection strength of the first external device 201 and a second communication connection strength of the second external device 202 (S2000). The electronic apparatus 100 may identify whether the first communication connection strength of the first external device 201 is less than a threshold value (S2005).

If the first communication connection strength of the first external device 201 is less than the threshold value (S2005-Y), the electronic apparatus 100 may output a projection image in which a size of the second image received from the second external device 202 is greater (e.g., larger) than that of the first image received from the first external device 201 (S2010).

If the first communication connection strength of the first external device 201 is equal to or greater than the threshold value (S2005-N), the electronic apparatus 100 may identify whether the second communication connection strength of the second external device 202 is less than the threshold value (S2015).

If the second communication connection strength of the second external device 202 is less than the threshold value (S2015-Y), the electronic apparatus 100 may acquire and output a projection image in which the size of the first image received from the first external device 201 is greater (e.g., larger) than that of the second image received from the second external device 202 (S2020).

If the second communication connection strength of the second external device 202 is equal to or greater than the threshold value (S2015-N), the electronic apparatus 100 may output a projection in which size proportions of the first image and the second image are equal (S2025).

Figure 21:
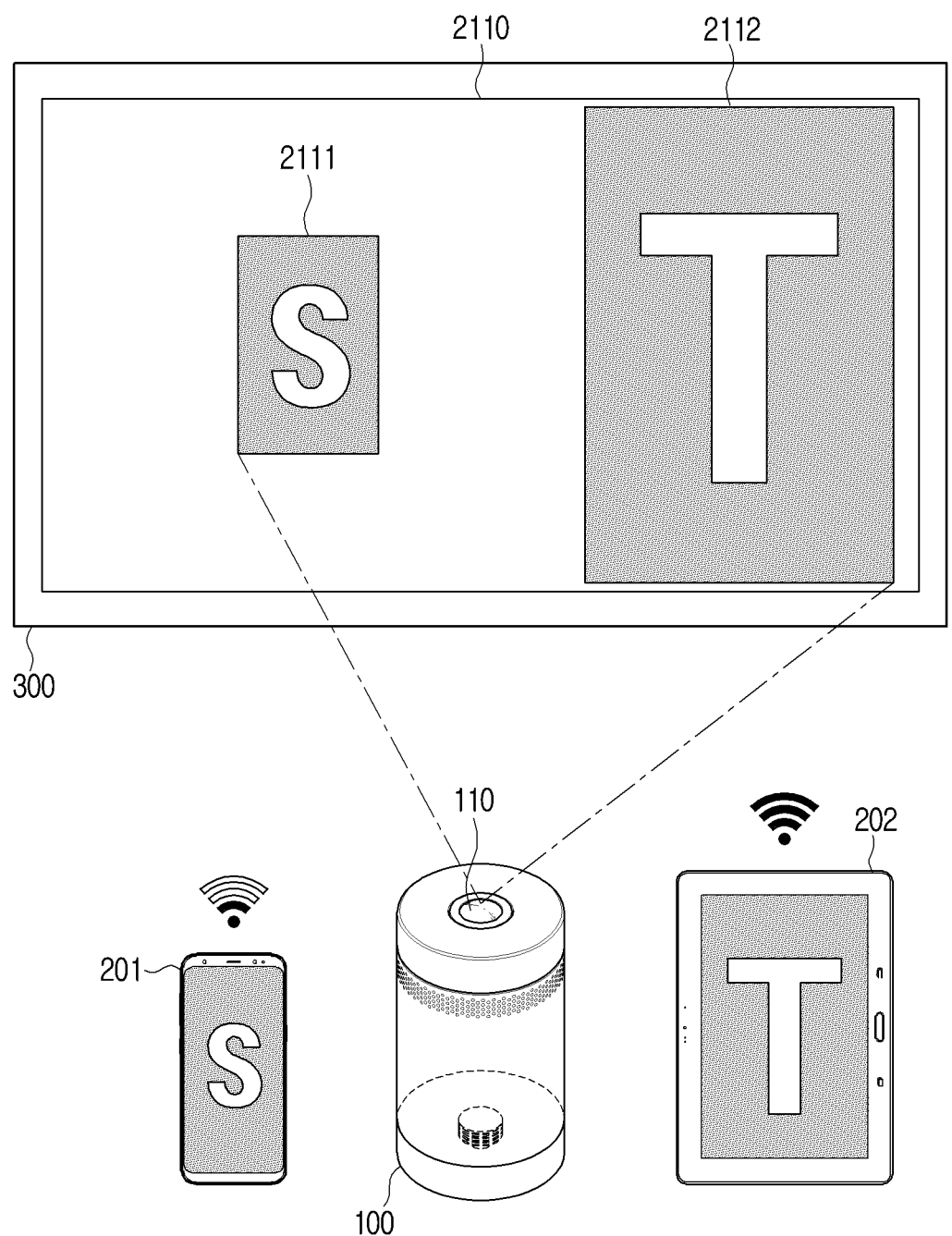
FIG. 21 is a diagram illustrating an example operation of outputting a projection image corresponding to communication connection strength according to various embodiments.

FIG. 21 is a diagram illustrating an example operation of outputting a projection image corresponding to communication connection strength according to various embodiments.

Referring to FIG. 21, the electronic apparatus 100 may receive a first image 2111 from the first external device 201 having a weak communication connection strength and a second image 2112 from the second external device 202 having a strong communication connection strength.

The electronic apparatus 100 may change a size of the image based on the communication connection strength. For example, if the communication connection strength of the first external device 201 is weak, a projection image 2110 may be acquired by reducing the size of the first image 2111 received from the first external device 201 in the projection image 2110. Conversely, if the communication connection strength of the first external device 201 is strong, the projection image 2110 may be acquired by increasing the size of the first image 2111 received from the first external device 201 in the projection image 2110. Although described as an operation for the first external device 201, an operation related to the second external device 202 may be equally applied.

The embodiment of FIG. 21 describes a situation in which the first communication connection strength of the first external device 201 is weak and the second communication connection strength of the second external device 202 is strong. If it is identified that the communication connection strength of the first external device 201 is weak, the electronic apparatus 100 may acquire the projection image 2110 by reducing the size of the first image 2111 and output the acquired projection image 2110 to the projection surface 300.

Figure 22:
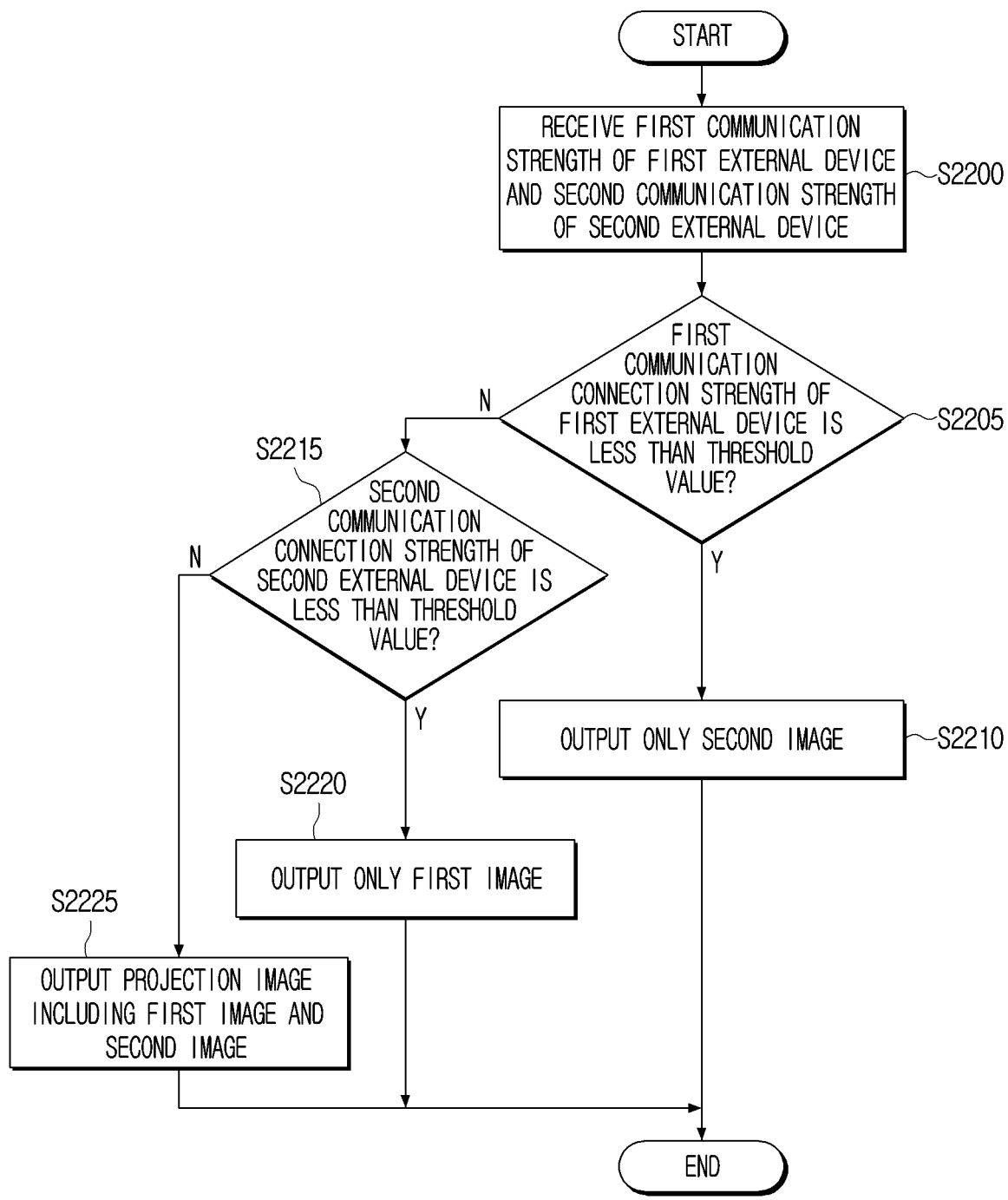
FIG. 22 is a flowchart illustrating an example operation of outputting a projection image corresponding to communication connection strength according to various embodiments

FIG. 22 is a flowchart illustrating an operation of outputting a projection image corresponding to communication connection strength according to an embodiment.

Referring to FIG. 22, the electronic apparatus 100 may acquire a first communication connection strength of the first external device 201 and a second communication connection strength of the second external device 202 (S2200). The electronic apparatus 100 may identify whether the first communication connection strength of the first external device 201 is less than a threshold value (S2205).

If the first communication connection strength of the first external device 201 is less than the threshold value (S2205-Y), the electronic apparatus 100 may output only the second image received from the second external device 202 without the first image received from the first external device 201 (S2210).

If the first communication connection strength of the first external device 201 is equal to or greater than the threshold value (S2205-N), the electronic apparatus 100 may identify whether the second communication connection strength of the second external device 202 is less than the threshold value (S2215).

If the second communication connection strength of the second external device 202 is less than the threshold value (S2215-Y), the electronic apparatus 100 may output only the first image received from the first eternal device 201 without the second image received from the second external device 202 (S2220).

If the second communication connection strength of the second external device 202 is equal to or greater than the threshold value (S2215-N), the electronic apparatus 100 may output a projection image including the first image and the second image (S2225).

Figure 23:
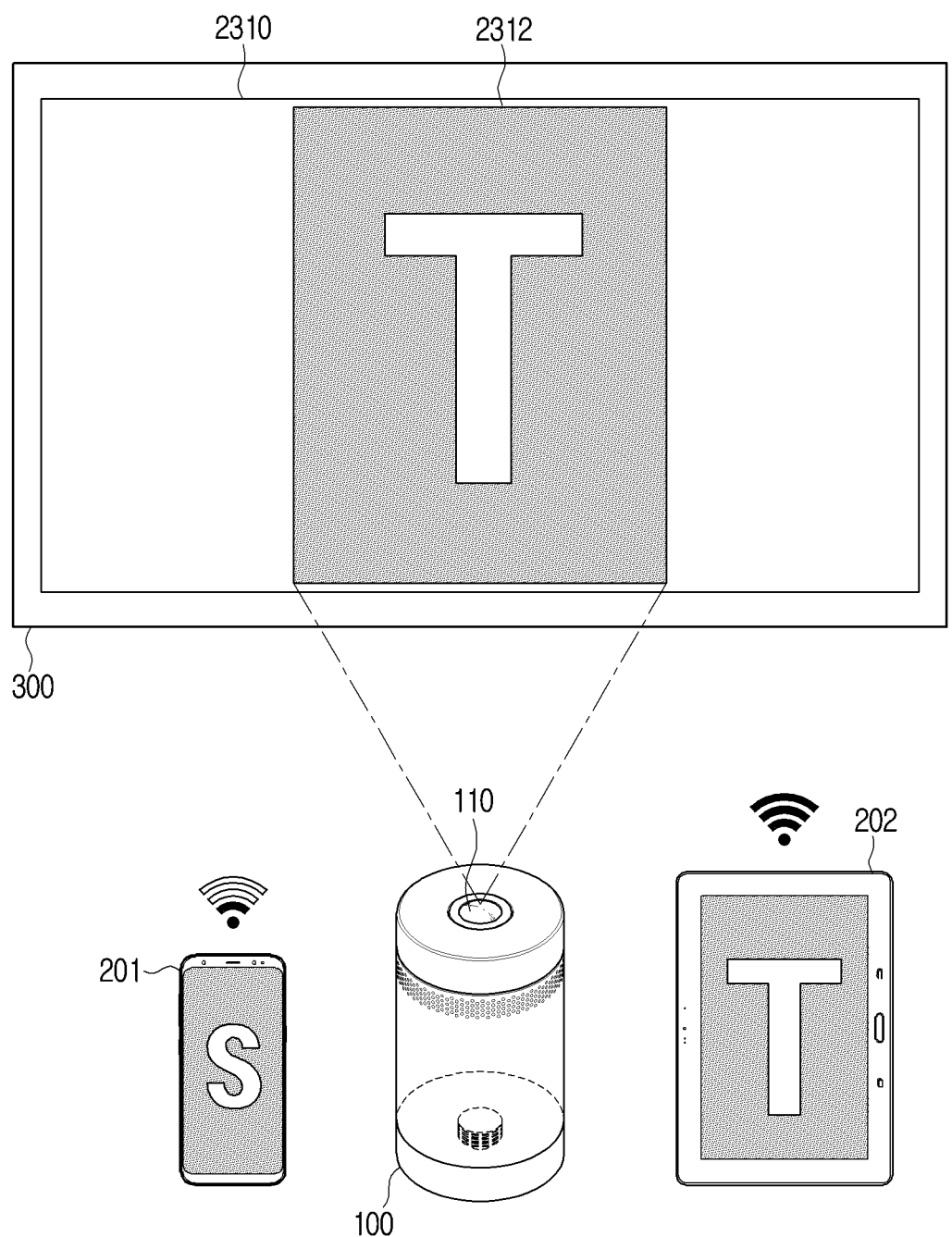
FIG. 23 is a diagram illustrating an example operation of outputting a projection image corresponding to communication connection strength according to various embodiments.

FIG. 23 is a diagram illustrating an example operation of outputting a projection image corresponding to communication connection strength according to various embodiments.

Referring to FIG. 23, the electronic apparatus 100 may receive the first image 2111 from the first external device 201 having a weak communication connection strength and the second image 2112 from the second external device 202 having a strong communication connection strength.

If the communication connection strength is less than the threshold value, the electronic apparatus 100 may not output an image received from the corresponding external device.

The embodiment of FIG. 23 describes a situation in which the first communication connection strength of the first external device 201 is weak and the second communication connection strength of the second external device 202 is strong. The electronic apparatus 100 may acquire a projection image 2310 including only the second image 2312 received from the second external device 202 having a strong communication connection strength, without the first image (not shown) received from the first external device 201 having a weak communication connection strength. In addition, the electronic apparatus 100 may output the acquired projection image 2310 on the projection surface 300.

Figure 24:
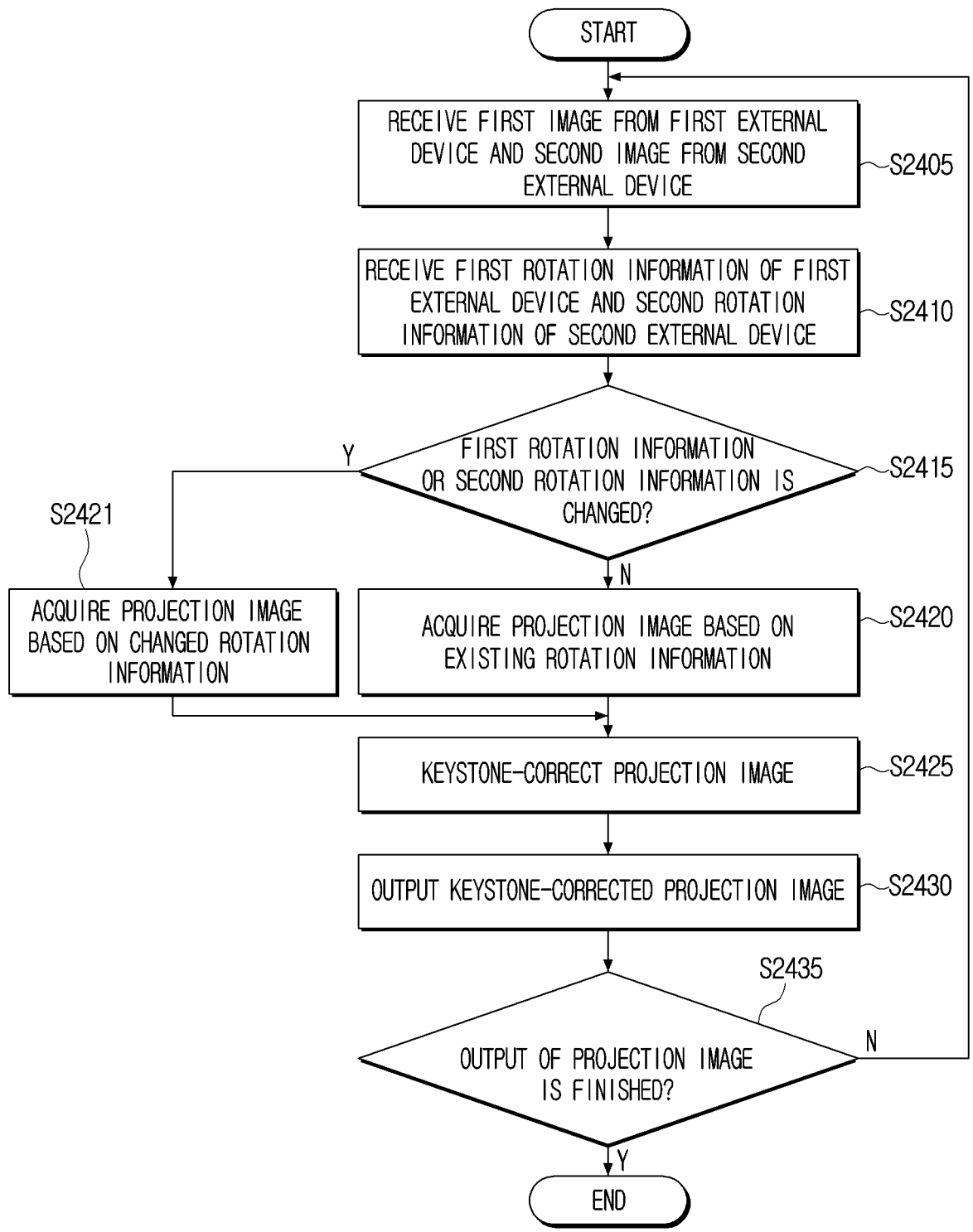
FIG. 24 is a flowchart illustrating an example operation of outputting a projection image based on rotation information according to various embodiments.

FIG. 24 is a flowchart illustrating an example operation of outputting a projection image based on rotation information according to various embodiments.

Referring to FIG. 24, the electronic apparatus 100 may receive first data including a first image from the first external device 201 and receive second data including a second image from the second external device 202 (S2405). The electronic apparatus 100 may receive first rotation information of the first external device 201 from the first external device 201 and second rotation information of the second external device 202 from the second external device 202 (S2410). The rotation information may refer to a rotation direction of the external device. For example, if the external device is in a vertical direction, the rotation information of the external device may be in the vertical direction. When the external device is in a horizontal direction, the rotation information of the external device may be in the horizontal direction.

The electronic apparatus 100 may identify whether the first rotation information or the second rotation information is changed (S2415). If the electronic apparatus 100 receives the first rotation information or the second rotation information for the first time, operation S2415 may be omitted.

If the first rotation information or the second rotation information is not changed (S2415-N), the electronic apparatus 100 may acquire a projection image based on the existing rotation information (or the first received rotation information) (S2420). Here, when the first rotation information or the second rotation information is changed (S2415-Y), the electronic apparatus 100 may acquire a projection image based on the changed rotation information (S2421).

The electronic apparatus 100 may perform a keystone correction operation on the projection image (S2425) and an operation of outputting the projection image on which the keystone correction has been performed (S2430).

The electronic apparatus 100 may identify whether the output of the projection image is finished (S2435). When the output of the projection image is finished (S2435-Y), the electronic apparatus 100 may no longer output the projection image. If the output of the projection image is not finished (S2435-N), operations S2405 to S2435 may be repeatedly performed.

FIG. 25 is a diagram illustrating an example operation of outputting a projection image based on rotation information according to various embodiments.

Referring to FIG. 25, an embodiment in which the first external device 201 is positioned in a horizontal direction and the second external device 202 is positioned in a vertical direction based on the electronic apparatus 100 will be described.

The electronic apparatus 100 may acquire a projection image 2510 based on the rotation information (e.g., horizontal direction) of the first external device 201 and rotation information (e.g., vertical direction) of the second external device 202.

Since the first external device 201 is in a horizontal direction, the first image 2511 may be horizontally included in the projection image 2510 so that it is also output in the horizontal direction. In addition, since the second external device 202 is in a vertical direction, the second image 2512 may also be vertically included in the projection image 2510 so that it is also output in the vertical direction.

As a result, the electronic apparatus 100 may acquire a projection image 2510 including a first image 2511 in the horizontal direction and a second image 2512 in the vertical direction, and output the acquired projection image 2510 to the projection surface 300.

The horizontal image may be described as an image having a horizontal length greater than a vertical length. The vertical image may be described as an image having a vertical length greater than a horizontal length.

Figure 26:
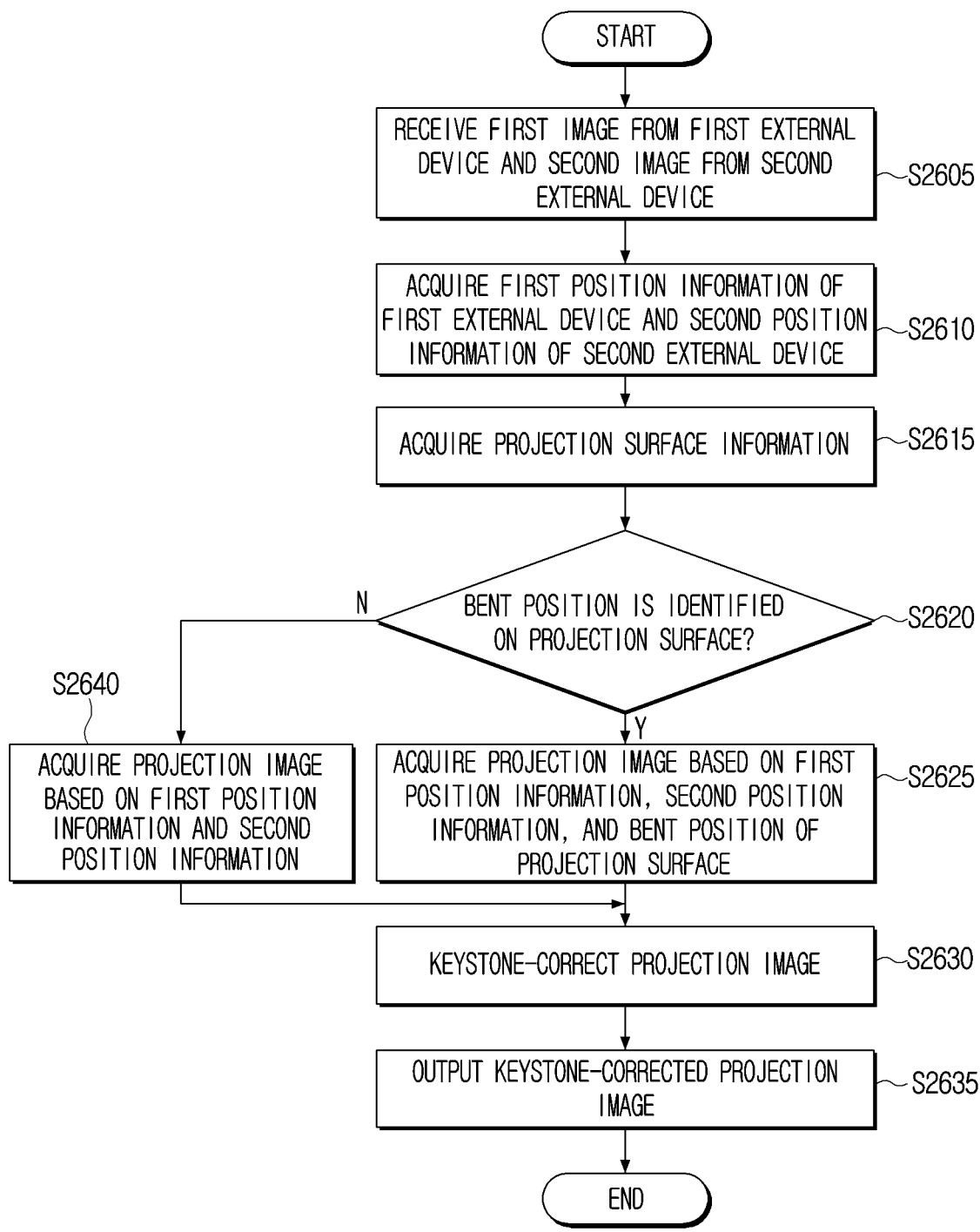
FIG. 26 is a flowchart illustrating an example operation of outputting a projection image based on a bent position of a projection surface according to various embodiments.

FIG. 26 is a flowchart illustrating an example operation of outputting a projection image based on a bent position of the projection surface according to various embodiments.

Referring to FIG. 26, the electronic apparatus 100 may receive first data including a first image from the first external device 201 and receive second data including a second image from the second external device 202 (S2605). In addition, the electronic apparatus 100 may acquire first position information of the first external device 201 and second position information of the second external device 202 (S2610).

The electronic apparatus 100 may acquire projection surface information (S2615). Here, the electronic apparatus 100 may acquire projection surface information through the sensor part 113. The sensor part 113 may refer to an image sensor (e.g., a camera).

The electronic apparatus 100 may identify whether there is a bent position on the projection surface based on the projection surface information (S2620). When a bent position is identified on the projection surface (S2620-Y), the electronic apparatus 100 may acquire a projection image based on the first position information, the second position information, and the bent position of the projection surface (S2625).

The electronic apparatus 100 may keystone-correct the projection image (S2630). The electronic apparatus 100 may output a projection image on which keystone correction has been performed (S2635).

If a bent position is not identified on the projection surface (S2620-N), the electronic apparatus 100 may acquire a projection image based on the first position information and the second position information (S2640). Also, the electronic apparatus 100 may perform a keystone correction operation on the projection image (S2630) and an operation of outputting the projection image on which the keystone correction has been performed (S2635).

Figure 27:
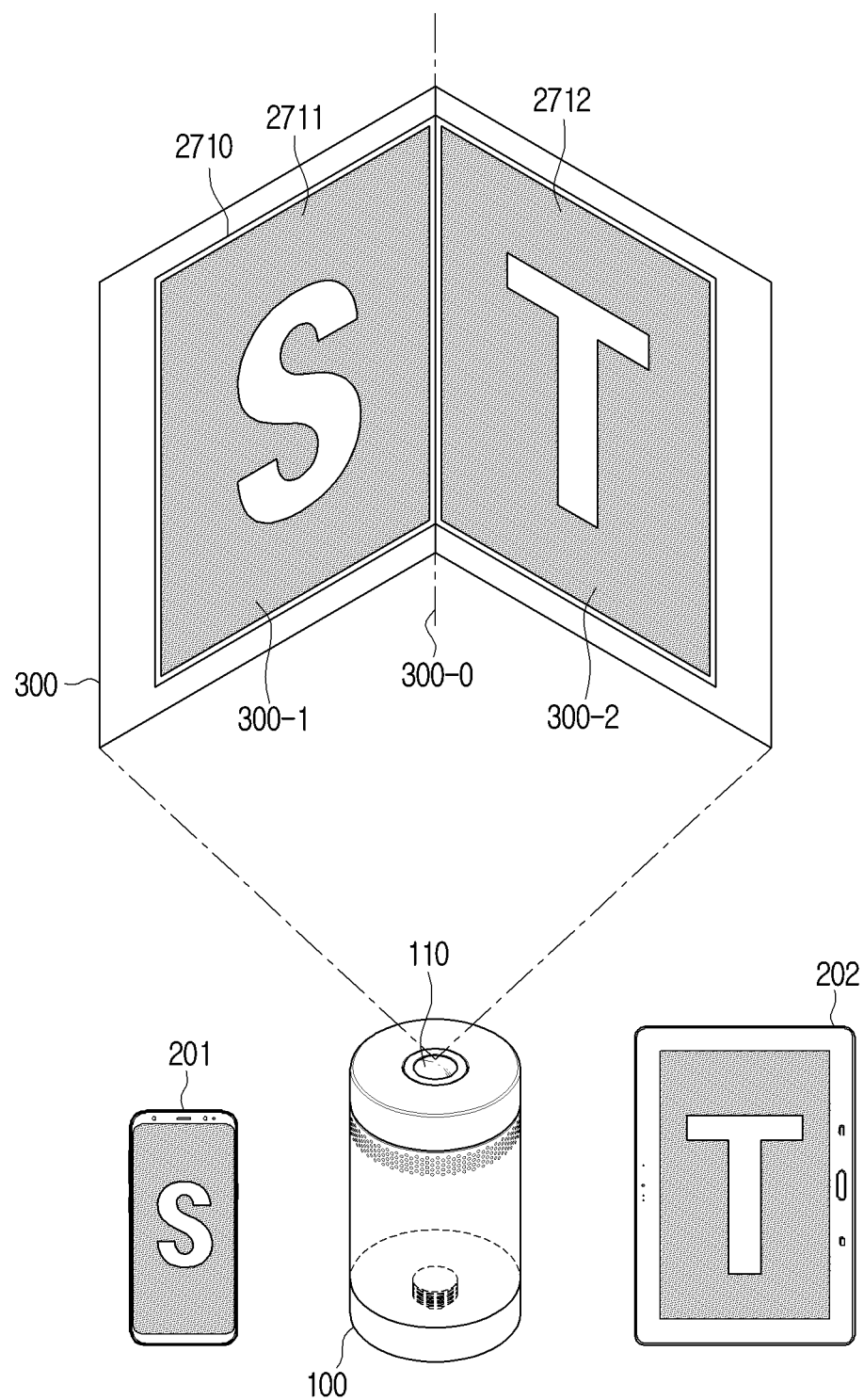
FIG. 27 is a diagram illustrating an example operation of outputting a projection image based on a bent position of a projection surface according to various embodiments.

FIG. 27 is a diagram illustrating an example operation of outputting a projection image based on a bent position of a projection surface according to various embodiments.

Referring to FIG. 27, the electronic apparatus 100 may acquire information on the projection surface 300. It may be identified whether the projection surface 300 has a bent position 300-0. The bent position may be described as a bent surface, a bent line, a bent edge, or the like. According to an embodiment, the electronic apparatus 100 may divide the projection surface 300 into a plurality of regions according to relative positions of the first external device 201 and the second external device 202 even if a bent position is not identified.

The electronic apparatus 100 may divide the projection surface 300 into a first projection surface 300-1 and a second projection surface 300-2 according to the bent position 300-0. Also, the electronic apparatus 100 may acquire a projection image 2710 so that the first image 2711 is output on the first projection surface 300-1 and the second image 2712 is output on the second projection surface 300-2.

The electronic apparatus 100 may perform keystone correction based on projection surface information (a bent position or a bent degree).

Figure 28:
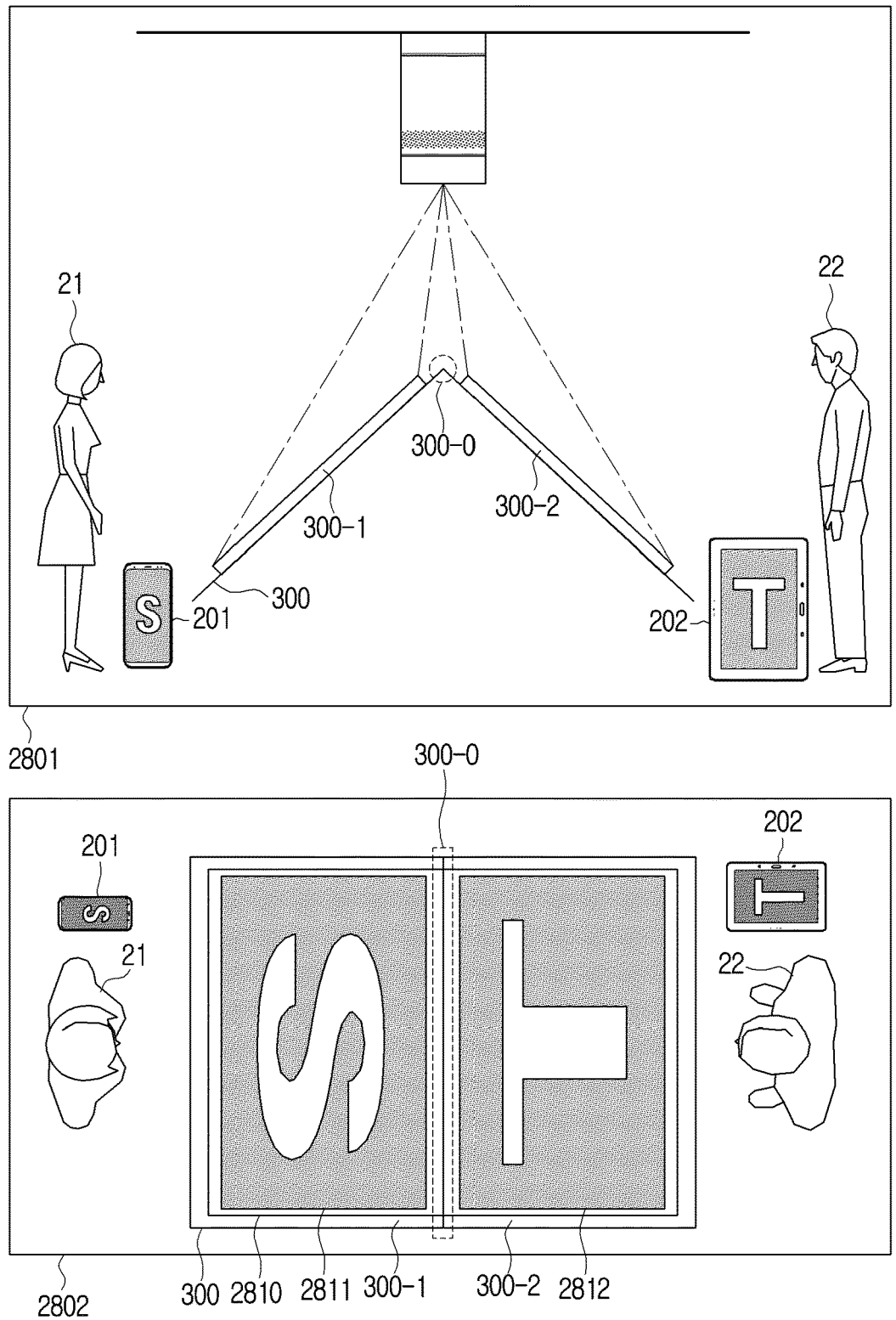
FIG. 28 is a diagram illustrating an example operation of outputting a projection image downward according to various embodiments.

FIG. 28 is a diagram illustrating an example operation of outputting a projection image downward according to various embodiments.

Referring to FIG. 28, an example 2801 describes a situation in which a first user 21 carrying the first external device 201 and a second user 22 carrying the second external device 202 stand on a projection surface having a plurality of surfaces.

Here, the projection surface 300 may be divided into a first projection surface 300-1 and a second projection surface 300-2 based on the bent position 300-0. The first user 21 and the first external device 201 may be located near the first projection surface 300-1, and the second user 22 and the second external device 202 may be located near the second projection surface 300-2. In addition, the electronic apparatus 100 may output a projection image 2810 downward. FIG. 28 shows that the first projection surface 300-1 and the second projection surface 300-2 are inclined, but according to an embodiment, the first projection surface 300-1 and the second projection surface 300-2 may be flat.

The electronic apparatus 100 may acquire first position information of the first external device 201, second position information of the second external device 202, and projection surface information.

The electronic apparatus 100 may divide the projection surface 300 in consideration of the first position information, the second position information, and the projection surface information. It may be determined whether to process the projection surface as a plurality of regions or as one region based on a distance difference between the first position information and the second position information.

An example 2802 describes a situation in which the situation of embodiment 2801 is viewed from a ceiling to a floor. The electronic apparatus 100 may divide the bent position 300-0 in consideration of the first position information, the second position information, and the projection surface information. In addition, the electronic apparatus 100 may divide the projection surface 300 into a first projection surface 300-1 and a second projection surface 300-2 based on the bent position 300-0. The electronic apparatus 100 may acquire a projection image 2810 in which the first image 2811 is rotated clockwise (or counterclockwise) on the first projection surface 300-1 and the second image 2812 is rotated counterclockwise (or clockwise). The electronic apparatus 100 may output the projection image 2810 to the projection surface 300.

As a result, the first user 21 may view the first image 2811 output to the first projection surface 300-1 straight ahead, and the second user 22 opposite to the first user 21 may view the second image 2812 output on the second projection surface 300-2 straight ahead.

The first image 2811 and the second image 2812 described in FIG. 28 may have opposite rotation directions.

Figure 29:
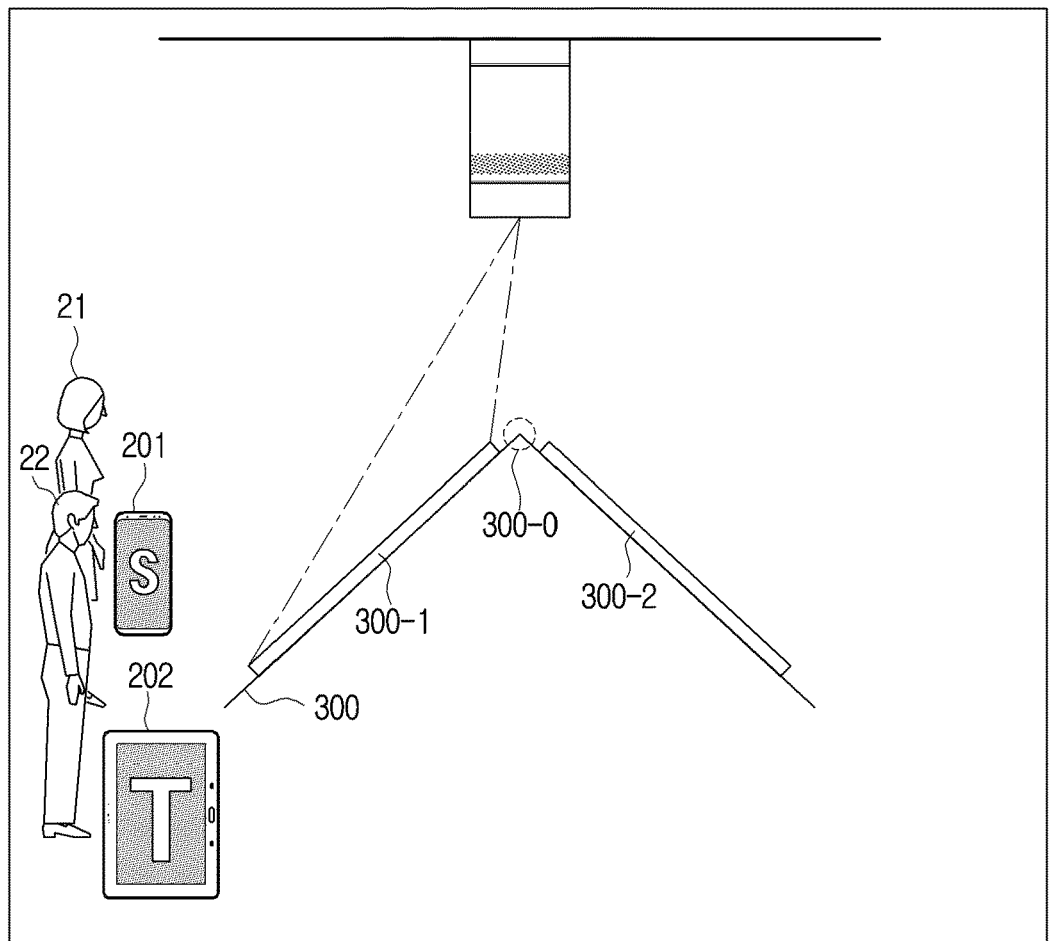
FIG. 29 is a diagram illustrating an example operation of outputting a projection image downward according to various embodiments.
Figure 29:
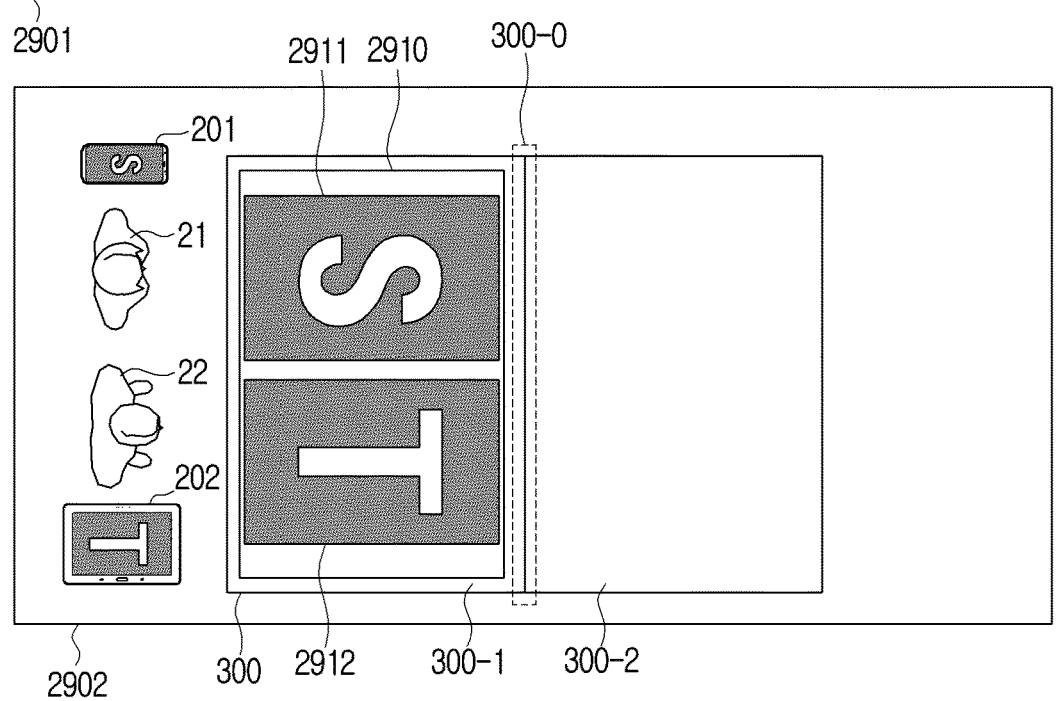

FIG. 29 is a diagram illustrating an example operation of outputting a projection image downward according to various embodiments.

Referring to FIG. 29, an example 2901 describes a situation in which both the first user 21 and the second user 22 are positioned on one side with respect to the projection surface 300. In FIG. 28, the first user 21 and the second user 22 are positioned on the first projection surface 300-1 and the second projection surface 300-2, respectively, but in FIG. 29, both the users 21 and 22 are located on one projection surface (e.g., 300-1).

The electronic apparatus 100 may divide the first projection surface 300-1 and the second projection surface 300-2 and output a first image 2911 and a second image 2912 on any one projection image based on the position of the user or the position of the external device.

An example 2902 describes a situation in which the situation of embodiment 2901 is viewed from the ceiling to the floor. The electronic apparatus 100 may divide the bent position 300-0 in consideration of the first position information, the second position information, and the projection surface information. The electronic apparatus 100 may divide the projection surface 300 into a first projection surface 300-1 and a second projection surface 300-2 based on the bent position 300-0.

The electronic apparatus 100 may identify that both the first user 21 and the second user 22 are located on one projection surface (e.g., the first projection surface 300-1) based on the first position information and the second position information. In addition, the electronic apparatus 100 may acquire the projection image 2910 so that both the first image 2911 and the second image 2912 are output to the one identified projection surface. Here, a size of the projection image 2910 may correspond to a size of the first projection surface 300-1. The electronic apparatus 100 may determine the size of the projection image 2910 in consideration of the size of the first projection surface 300-1. The electronic apparatus 100 may acquire the projection image 2910 so that both the first image 2911 and the second image 2912 are included in the size of the projection image 2910.

Figure 30:
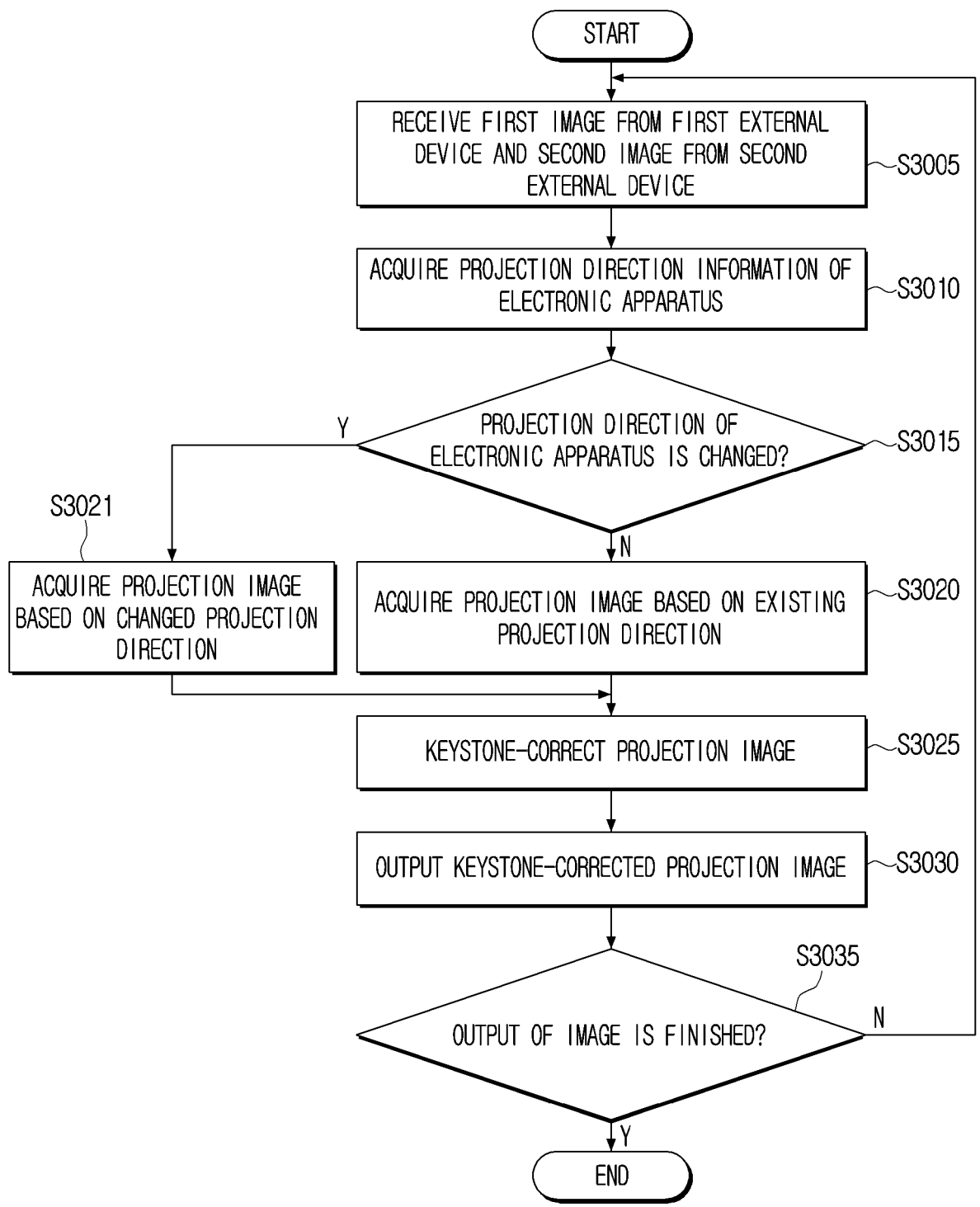
FIG. 30 is a flowchart illustrating an example operation of outputting a projection image based on a projection direction of an electronic apparatus according to various embodiments.

FIG. 30 is a flowchart illustrating an example operation of outputting a projection image based on a projection direction of the electronic apparatus 100 according to various embodiments.

Referring to FIG. 30, the electronic apparatus 100 may receive the first data including the first image from the first external device 201 and receive the second data including the second image from the second external device 202 (S3005). The electronic apparatus 100 may acquire projection direction information of the electronic apparatus 100 (S3010). The electronic apparatus 100 may identify whether a projection direction of the electronic apparatus 100 is changed (S3015). If the projection direction of the electronic apparatus 100 is not changed (S3015-N), the electronic apparatus 100 may acquire a projection image based on the existing projection direction (or the initially acquired projection direction) (S3020). When the projection direction of the electronic apparatus 100 is changed (S3015-Y), the electronic apparatus 100 may acquire a projection image based on the changed projection direction (S3021).

The electronic apparatus 100 may perform a keystone correction operation of the projection image (S3025) and an operation of outputting the projection image on which the keystone correction has been performed (S3030).

The electronic apparatus 100 may identify whether the output of the projection image is terminated (S3035). When the output of the projection image is finished (S3035-Y), the electronic apparatus 100 may no longer output the projection image. If the output of the projection image is not finished (S3035-N), operations S3005 to S3035 may be repeatedly performed.

Figure 31:
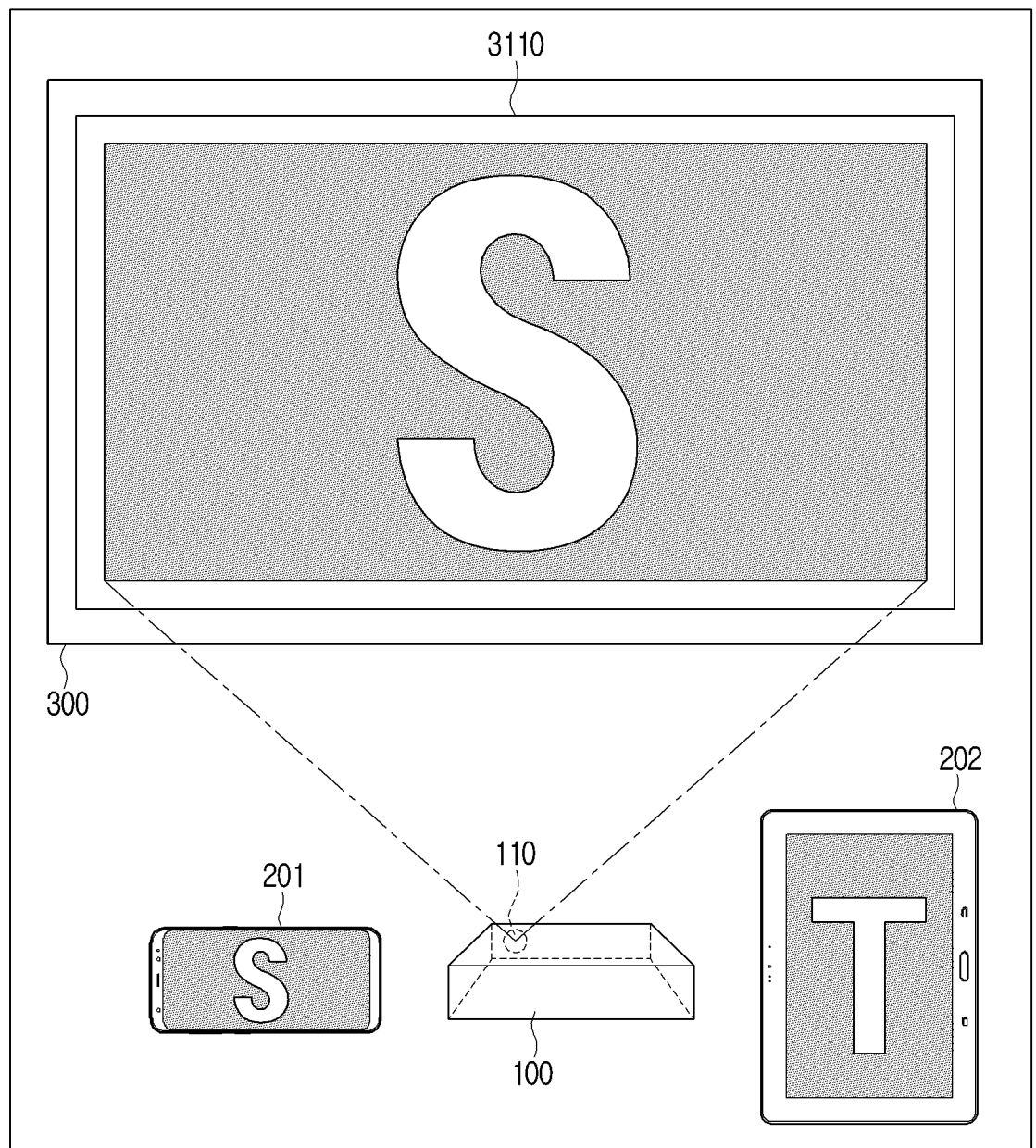
FIG. 31 is a diagram illustrating an example operation of outputting a projection image based on a projection direction of an electronic apparatus according to various embodiments.
Figure 31:
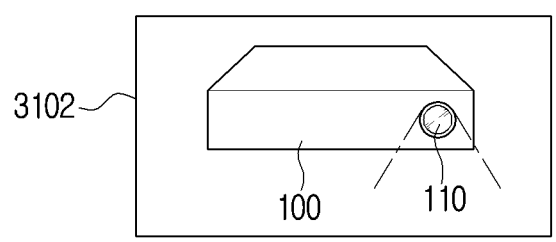
Figure 32:
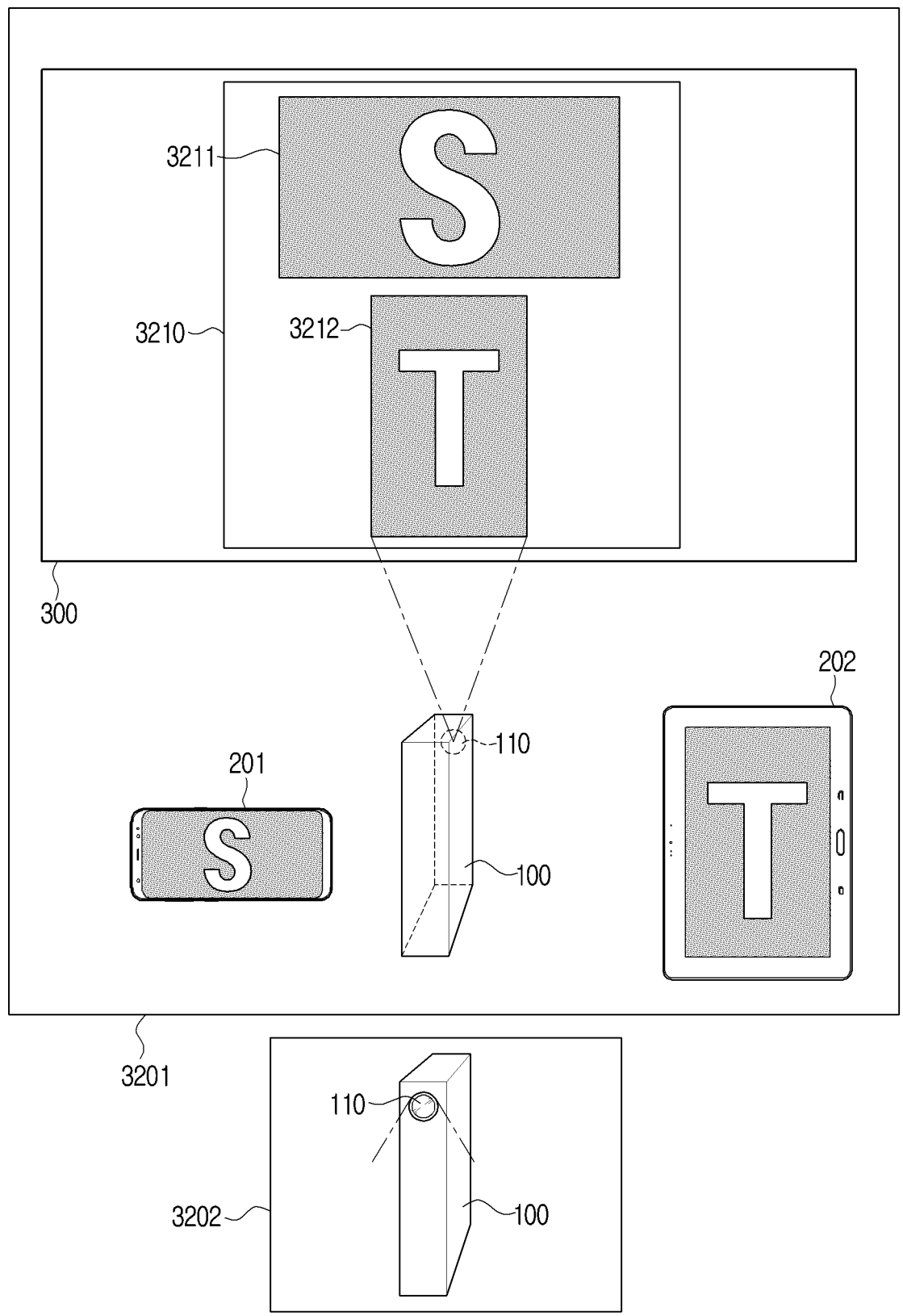
FIG. 32 is a diagram illustrating an example operation of outputting a projection image based on a projection direction of an electronic apparatus according to various embodiments.
Figure 33:
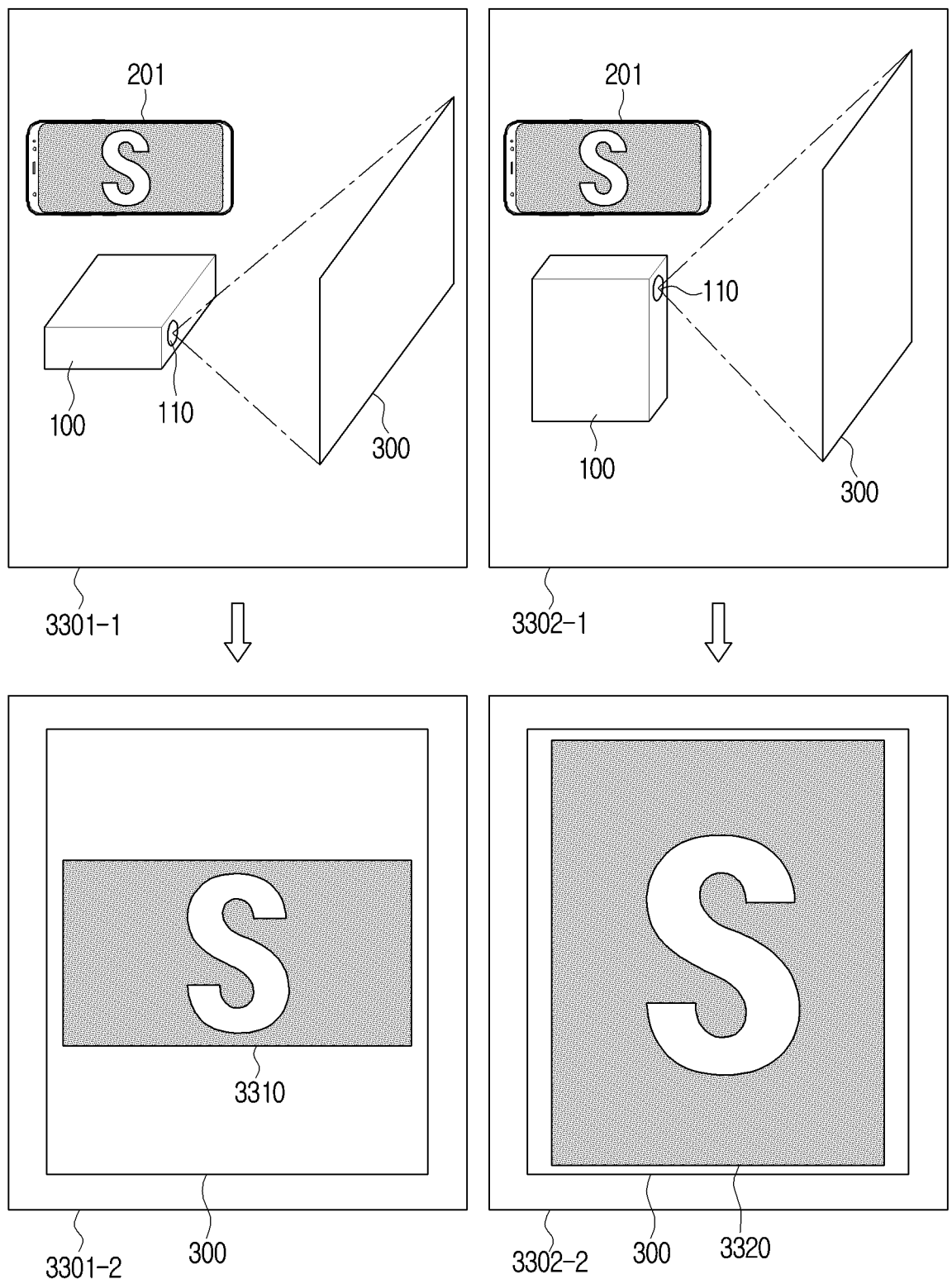
FIG. 33 is a diagram illustrating an example operation of outputting a projection image based on a projection direction of an electronic apparatus according to various embodiments.

In FIGS. 1 to 30, the cylindrical electronic apparatus 100 has been described. However, the electronic apparatus 100 may be implemented in a rectangular shape instead of a cylindrical shape. In case of the rectangular electronic apparatus 100, a projection image may be differently output according to a mounting direction. FIGS. 31, 32 and 33 are diagrams illustrating an example operation related to a method of outputting a projection image by the rectangular electronic apparatus 100.

FIG. 31 is a diagram illustrating an example operation of outputting a projection image based on a projection direction of the electronic apparatus 100 according to various embodiments.

Referring to FIG. 31, an example 3101 describes a situation in which the projection direction of the electronic apparatus is horizontal, and an example 3101 represents a front surface of the electronic apparatus 100. In addition, an example 3102 represents a situation in which the electronic apparatus 100 is viewed from the front.

When the projection direction is horizontal, the electronic apparatus 100 may output a wider image in the horizontal direction at a fixed position. When the projection direction is vertical, the electronic apparatus 100 may output a wider image in the vertical direction at a fixed position.

According to the example 3101, the electronic apparatus 100 may output the projection image 3110 to the projection surface 300 in a horizontally arranged state. The first external device 201 and the second external device 202 connected to the electronic apparatus 100 may exist. The electronic apparatus 100 may acquire the size of the projection surface 300. The electronic apparatus 100 may identify whether both the first image received from the first external device 201 and the second image received from the second external device 202 may be output based on the projection direction of the electronic apparatus 100.

As shown in FIG. 31, a rotation direction of the first external device 201 may be a horizontal direction and a rotation direction of the second external device 202 may be a vertical direction. The electronic apparatus 100 may identify an external device whose rotation direction is identical to the projection direction of the electronic apparatus 100. For example, in FIG. 31, the projection direction of the electronic apparatus 100 may be horizontal. Accordingly, the electronic apparatus 100 may identify the first external device 201 having a horizontal rotation direction among the external devices, and determine the first image received from the first external device 201 as the projection image 3110. In addition, the electronic apparatus 100 may output the projection image 3110 to the projection surface 300.

When the projection direction of the electronic apparatus 100 is changed to a vertical direction in the situation of the embodiment 3201 (referring to FIG. 32), the electronic apparatus 100 may identify the second external device 202 in which the rotation direction is the vertical direction, and determine second image received from the identified second external device 202 as the output image.

According to an embodiment, there may be a case where both the rotation direction of the first external device 201 and the rotation direction of the second external device 202 coincide with the projection direction of the electronic apparatus 100. The electronic apparatus 100 may give priority to each of the plurality of external devices and determine an image received from an external device having a higher priority, as a projection image. The priority may be one of a distance to the electronic apparatus 100, a connection order, and a communication connection strength. For example, when the priority is a distance to the electronic apparatus 100, the electronic apparatus 100 may identify an external device having a shorter distance, among a distance between the first external device 201 and the electronic apparatus 100 and a distance between the second external device 202 and the electronic apparatus 100, and determine an image received from the identified external device as a projection image.

Although FIG. 31 describes the rectangular electronic apparatus 100, the embodiment of FIG. 31 may also be applied to the cylindrical electronic apparatus 100. When the cylindrical electronic apparatus 100 outputs a projection image 3110 on the projection surface 300, the projection direction may be a horizontal direction. The cylindrical electronic apparatus 100 may also identify whether the projection direction is a horizontal direction or a vertical direction, and the embodiment of FIG. 31 may be applied to the cylindrical electronic apparatus 100 as it is.

FIG. 32 is a diagram illustrating an example operation of outputting a projection image based on the projection direction of the electronic apparatus 100 according to various embodiments.

Referring to FIG. 32, an example 3201 describes a situation in which the projection direction of the electronic apparatus is horizontal, and an example 3202 shows the front side of the electronic apparatus 100. In addition, the embodiment 3202 shows a situation in which the electronic apparatus 100 is viewed from the front.

In the example 3201, when the projection direction of the electronic apparatus 100 is vertical, the electronic apparatus 100 may determine a projection image 3210 based on a first image 3211 received from the first external device 201 and a second image 3212 received from the second external device 202. The electronic apparatus 100 may determine a size of the projection image 3210 based on a projection direction of the electronic apparatus 100. For example, when the projection direction of the electronic apparatus 100 is vertical, a vertical size of the projection image 3210 may be larger than a horizontal size. Conversely, when the projection direction of the electronic apparatus 100 is horizontal, the horizontal size of the electronic apparatus 100 may be larger than the vertical size.

In the example 3201, when the projection direction of the electronic apparatus 100 is vertical, the electronic apparatus 100 may acquire the projection image 3210 including the first image 3211 and the second image 3212 and output the acquired projection image 3210 to the projection surface 300.

Although FIG. 32 illustrates the rectangular electronic apparatus 100, the example of FIG. 32 may also be applied to the cylindrical electronic apparatus 100. When the cylindrical electronic apparatus 100 outputs the projection image 3110 on the projection surface 300, the projection direction may be a vertical direction. The cylindrical electronic apparatus 100 may also identify whether the projection direction is a horizontal direction or a vertical direction, and the embodiment of FIG. 32 may be applied to the cylindrical electronic apparatus 100 as it is.

FIG. 33 is a diagram illustrating an example operation of outputting a projection image based on a projection direction of the electronic apparatus 100 according to various embodiments.

Referring to FIG. 33, an example 3301-1 shows a situation in which the projection direction of the electronic apparatus 100 is a horizontal direction. In addition, example 3301-2 represents a projection image 3310 output in a situation where the projection direction of the electronic apparatus 100 is a horizontal direction. The electronic apparatus 100 may determine a first image received from the first external device 201 as a projection image 3310. A size of the projection image 3310 may be determined to match the projection direction of the electronic apparatus 100. For example, the electronic apparatus 100 may determine the size of the projection image 3310 received from the first external device 201 to correspond to the projection direction of the electronic apparatus 100. Since the projection direction of the electronic apparatus 100 is horizontal as in the embodiment 3301-1, the projection image 3310 may be generated so that a horizontal size is larger than a vertical size.

Meanwhile, example 3302-1 represents a situation in which the projection direction of the electronic apparatus 100 is a vertical direction. In addition, example 3302-2 shows a projection image 3320 output in a situation where the projection direction of the electronic apparatus 100 is a vertical direction. The electronic apparatus 100 may determine the first image received from the first external device 201 as the projection image 3320. The size of the projection image 3320 may be determined to match the projection direction of the electronic apparatus 100. For example, the electronic apparatus 100 may determine the size of the projection image 3320 received from the first external device 201 to correspond to the projection direction of the electronic apparatus 100. Since the projection direction of the electronic apparatus 100 is vertical as in the embodiment 3302-1, the projection image 3320 may be generated so that the vertical size is larger than the horizontal size.

Although FIG. 33 illustrates the rectangular electronic apparatus 100, the example of FIG. 33 may also be applied to the cylindrical electronic apparatus 100. When the cylindrical electronic apparatus 100 outputs the projection image 3110 on the projection surface 300, the projection direction may be a horizontal direction or a vertical direction. The cylindrical electronic apparatus 100 may also identify whether the projection direction is a horizontal direction or a vertical direction, and the embodiment of FIG. 33 may be applied to the cylindrical electronic apparatus 100 as it is. For example, it is assumed that the initial projection direction is the horizontal direction. When the cylindrical electronic apparatus 100 is rotated by 90 degrees based on the central axis of the projection lens 110, the projection direction of the cylindrical electronic apparatus 100 may be changed from the horizontal direction to the vertical direction. Although the embodiments 3301-1 and 3302-1 of FIG. 33 describe a situation in which the rectangular electronic apparatus 100 is output in a state in which the rectangular electronic apparatus 100 is lying horizontally or in a state in which it is erected vertically, the same operation may also be applied to the cylindrical electronic apparatus 100.

Figure 34:
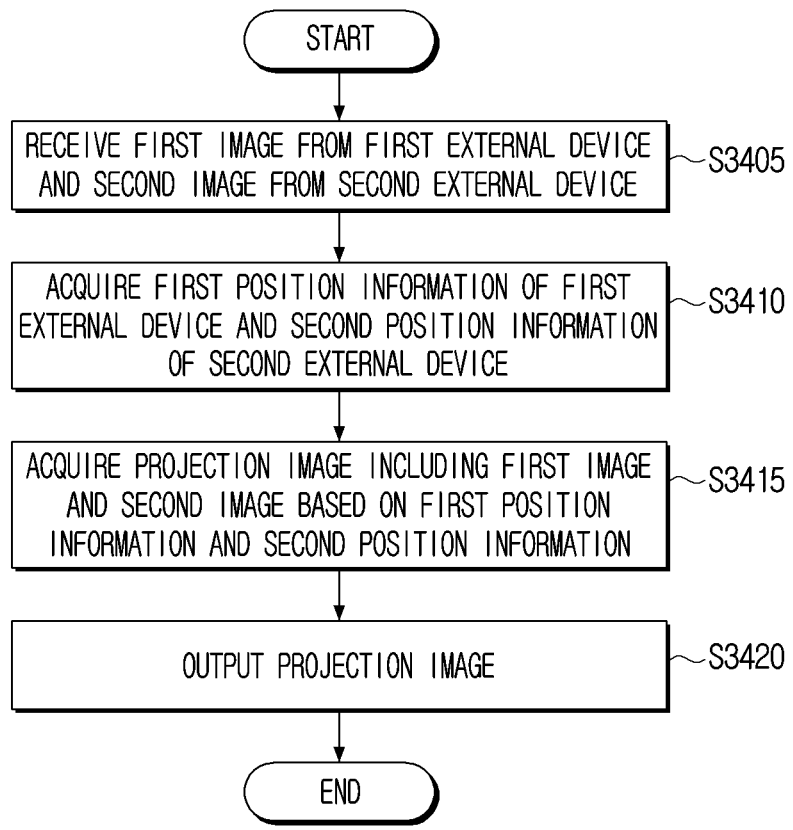
FIG. 34 is a flowchart illustrating an example method of controlling an electronic apparatus according to various embodiments.

FIG. 34 is a flowchart illustrating an example method of controlling the electronic apparatus 100 according to various embodiments.

Referring to FIG. 34, the controlling method of the electronic apparatus 100 capable of communicating with the first external device 201 and the second external device 202 and outputting an image on a projection surface includes receiving first data including a first image from the first external device 201 and receiving second data including a second image from the second external device 202 (S3405), acquiring first position information of the first external device 201 and second position information of the second external device 202 (S3410), acquiring a projection image including the first image and the second image based on the first position information and the second position information (S3415), and outputting the projection image (S3420).

The controlling method may further include determining projection positions of the first image and the second image included in the projection image based on the relative positions of the first external device 201 and the second external device 202 with respect to the position of the electronic apparatus 100.

In the determining of the projection positions of the first image and the second image, when both the first external device 201 and the second external device 202 are located on the left or right based on the position of the electronic apparatus 100, the projection positions of the first image and the second image included in the projection image may be determined based on the distances between the first external device 201 and the second external device 202 and the electronic apparatus 100.

In the acquiring of the projection image (S3415), when at least one of the first position information and the second position information is changed, the projection image may be acquired based on the at least one of position information.

The controlling method may further include outputting an icon corresponding to a third external device when the third external device is connected.

The controlling method may further include acquiring position information of the third external device and identifying at least one of a position, a shape, a size, or a color of the icon corresponding to the third external device based on a distance between the third external device and the electronic apparatus 100.

The controlling method may further include outputting the icon corresponding to the third external device in a blinking manner when the distance between the third external device and the electronic apparatus 100 decreases.

The controlling method may further include acquiring a first communication connection strength of the first external device 201 and a second communication connection strength of the second external device 202 and identifying an external device having a communication connection strength less than a threshold strength, when the first communication connection strength or the second communication connection strength is less than the threshold strength, and in the acquiring of the projection image (S3415), the projection image may be acquired not to include an image received from the identified external device.

The controlling method may further include acquiring a first communication connection strength of the first external device 201 and a second communication connection strength of the second external device 202, and in the acquiring of the projection image (S3415), a size of the first image and a size of the second image may be identified based on the first communication connection strength and the second communication connection strength.

The controlling method may further include acquiring first rotation information of the first external device 201 and second rotation information of the second external device 202, and in the acquiring of the projection image (S3415), the size of the first image and the size of the second image may be identified based on the first rotation information and the second rotation information.

The method of controlling the electronic apparatus as shown in FIG. 34 may be executed on the electronic apparatus having the configuration of FIG. 2A or 2B and may also be executed on an electronic apparatus having other configurations.

The methods according to the various embodiments of the disclosure described above may be implemented in the form of an application that can be installed in an existing electronic apparatus.

Further, the methods according to the various example embodiments of the disclosure described above may be implemented by simply upgrading software or hardware of an existing electronic apparatus.

In addition, the various example embodiments of the disclosure described above may be performed through an embedded server provided in an electronic apparatus or through an external server of at least one of an electronic apparatus or a display device.

According to an example embodiment of the disclosure, the various example embodiments described above may be implemented by software including instructions that are stored in a machine (e.g. a computer) readable storage medium. The machine, which is a device capable of calling instructions stored in the storage medium and operating according to the called instructions, may include an electronic apparatus according to the embodiments described above. In an example in which instructions are executed by a processor, a function corresponding to the instructions may be performed directly by the processor or using other components under the control of the processor. The instruction may include a code generated by a compiler or a code executable by an interpreter. The machine-readable storage medium may be provided in the form of a non-transitory storage medium. The 'non-transitory' storage medium is tangible, and it may not limit the storage medium to refer to data being stored semi-permanently or temporarily thereon.

According to an embodiment of the disclosure, the method according to the various embodiments described above may be included and provided in a computer program product. The computer program product may be traded as a product between a seller and a buyer. The computer program product may be distributed in the form of a machine-readable storage medium (e.g. a compact disc read only memory (CD-ROM)) or online via an application store (e.g. Play Store™). In case of on-line distribution, at least a part of the computer program product may be at least temporarily stored in a storage medium such as a memory of a server of a manufacturer, a server of an application store, or a relay server, or be temporarily generated.

Further, each of the components (e.g. module or program) according to the various embodiments described above may be comprised of a single entity or a plurality of entities, and some of the sub-components described above may be omitted or another sub-component may be additionally included to various embodiments. Generally or additionally, some of the components (e.g., module or program) may be integrated into one entity, and may perform functions performed by the respective corresponding components before being integrated in the same or similar manner. Operations performed by a module, a program, or other components according to various embodiments may be executed sequentially, in parallel, repeatedly, or in a heuristic manner. In addition, at least some operations may be executed in different sequences or may be omitted. Alternatively, other operations may be added.

While the disclosure has been described with reference to the embodiments, the disclosure is not limited to the above-described specific embodiments, and it will be understood by those skilled in the related art that various modifications and variations may be made without departing from the scope of the disclosure as defined by the appended claims, as well as these modifications and variations should not be understood separately from the technical spirit and prospect of the disclosure.

What is claimed is:

1. A projector device comprising
   a memory;
   a communication interface, comprising circuitry, configured to communicate with a first external device and a second external device;
   a projection part, comprising a projection lens, configured to output an image to a projection surface; and
   a processor, comprising processing circuitry, configured to:
   receive first data including a first image from the first external device,
   receive second data including a second image different from the first image from the second external device,
   acquire first position information of the first external device and second position information of the second external device,
   acquire relative positions of the first external device and the second external device from position of the projector device based on the first position information and the second position information,
   identify whether the first external device is located at a left side of the second external device with respect to the projector device based on the relative positions of the first external device and the second external device,
   based on the first external device being located at the left side of the second external device with respect to the projector device, acquire a first projection image including the first image which is positioned in a left portion of an entire portion of the first projection image and the second image which is positioned in a right portion of the entire portion of the first projection image,
   perform keystone correction on the first projection image, and
   control the projection part to output the keystone-corrected first projection image to the projection surface,
   based on a change of the relative positions of the first external device and the second external device from position of the projector device, acquire a second projection image based on the changed relative positions,
   perform keystone correction on the second projection image, and
   control the projection part to output the keystone-corrected second projection image to the projection surface.

2. The projector device as claimed in claim 1, wherein sizes of the first image and the second image are the same before and after the change in the position of the first image and the second image.

3. The projector device as claimed in claim 1, wherein the processor is configured to determine the projection positions of the first image and the second image included in the projection image based on distances between the first external device and the second external device and the projector device, based on both the first external device and the second external device being positioned on the left or right on the basis of the position of the projector device.

4. The projector device as claimed in claim 1, wherein the processor is configured to determine the projection positions of the first image and the second image included in the projection image based on distances between the first external device and the second external device and the projector device, based on both the first external device and the second external device being positioned on the left or right on the basis of the position of the projector device.

5. The projector device as claimed in claim 1, wherein the processor is configured to control the projection part to output an icon corresponding to a third external device, based on the third external device being connected through the communication interface.

6. The projector device as claimed in claim 5, wherein the processor is configured to acquire position information of the third external device and identify at least one of a position, a shape, a size, or a color of an icon corresponding to the third external device based on a distance between the third external device and the projector device.

7. The projector device as claimed in claim 6, wherein the processor is configured to control the projection part to blink and output the icon corresponding to the third external device, based on the distance between the third external device and the projector device decreasing.

8. The projector device as claimed in claim 1, wherein the processor is configured to
   acquire first communication connection strength of the first external device and second communication connection strength of the second external device,
   identify an external device having communication connection strength less than a threshold value strength based on the first communication connection strength or the second communication connection strength being less than the threshold value strength, and
   acquire the projection image so that an image received from the identified external device is not included.

9. The projector device as claimed in claim 1, wherein the processor is configured to
   acquire the first communication connection strength of the first external device and the second communication connection strength of the second external device,
   and identify a size of the first image and a size of the second image based on the first communication connection strength and the second communication connection strength.

10. The projector device as claimed in claim 1, wherein the processor is configured to
    acquire first rotation information of the first external device and second rotation information of the second external device, and
    identify a size of the first image and a size of the second image based on the first rotation information and the second rotation information.

11. A method of controlling a projector device communicating with a first external device and a second external device and outputting an image on a projection surface, the method comprising:
    receiving first data including a first image from the first external device and receiving second data including a second image different from the first image from the second external device;

acquiring first position information of the first external device and second position information of the second external device;

acquiring relative positions of the first external device and the second external device from position of the projector device based on the first position information and the second position information;

identifying whether the first external device is located at a left side of the second external device with respect to the projector device based on the relative positions of the first external device and the second external device;

based on the first external device being located at the left side of the second external device with respect to the projector device, acquiring a first projection image including the first image which is positioned in a left portion of an entire portion of the first projection image and the second image which is positioned in a right portion of the entire portion of the first projection image;

performing keystone correction on the first projection image;

outputting the keystone-corrected first projection image to the projection surface;

based on a change of the relative positions of the first external device and the second external device from position of the projector device, acquiring a second projection image based on the changed relative positions;

performing keystone correction on the second projection image; and outputting the keystone-corrected second projection image to the projection surface.

12. The method as claimed in claim 11, wherein sizes of the first image and the second image are the same before and after the change in the projection positions of the first image and the second image.

13. The method as claimed in claim 11, wherein, in the determining of the projection positions of the first image and the second image, the projection positions of the first image and the second image included in the projection image are determined based on distances between the first external device and the second external device and the projector device, based on both the first external device and the second external device being positioned on the left or right on the basis of the position of the projector device.

14. The method as claimed in claim 11, wherein, in the acquiring of the projection image, the projection image is acquired according to the at least one position information, based on position information of at least one of the first position information and the second position information being changed.

15. The method as claimed in claim 11, further comprising:
outputting an icon corresponding to a third external device, based on the third external device being connected through the communication interface.

16. The method as claimed in claim 15, further comprising
acquiring position information of the third external device, and
identifying at least one of a position, a shape, a size, or a color of an icon corresponding to the third external device based on a distance between the third external device and the projector device.

17. The method as claimed in claim 16, further comprising
blinking and outputting the icon corresponding to the third external device, based on the distance between the third external device and the projector device decreasing.

18. The method as claimed in claim 11, further comprising:
acquiring first communication connection strength of the first external device and second communication connection strength of the second external device, and
identifying an external device having communication connection strength less than a threshold value strength based on the first communication connection strength or the second communication connection strength being less than the threshold value strength, and
wherein, in the acquiring of the projection image, the projection image is acquired so that an image received from the identified external device is not included.

19. The method as claimed in claim 11, further comprising:
acquiring a first communication connection strength of the first external device and a second communication connection strength of the second external device,
wherein, in the acquiring of the projection image, a size of the first image and a size of the second image is identified based on the first communication connection strength and the second communication connection strength.

20. The method as claimed in claim 11, further comprising:
acquiring first rotation information of the first external device and second rotation information of the second external device,
wherein, in the acquiring of the projection image, a size of the first image and a size of the second image is identified based on the first rotation information and the second rotation information.

* * * * *